United States Patent [19]

Kregness et al.

[11] Patent Number: 4,595,911
[45] Date of Patent: Jun. 17, 1986

[54] PROGRAMMABLE DATA REFORMAT SYSTEM

[75] Inventors: Glen R. Kregness, Minnetonka; Clarence W. Dekarske, St. Paul Park; Peter B. Criswell, Bethel, all of Minn.

[73] Assignee: Sperry Corporation, New York, N.Y.

[21] Appl. No.: 514,208

[22] Filed: Jul. 14, 1983

[51] Int. Cl.$^4$ .............................................. G06F 5/00
[52] U.S. Cl. .............................. 340/347 DD; 364/200
[58] Field of Search ............... 340/347 DD; 235/310; 364/200, 900; 371/49, 50, 51

[56] References Cited

U.S. PATENT DOCUMENTS

| | | | |
|---|---|---|---|
| 3,389,379 | 6/1968 | Erickson | 235/310 |
| 3,930,232 | 12/1975 | Wallach | 235/310 |
| 4,141,005 | 2/1979 | Bonner | 364/200 |
| 4,364,025 | 12/1982 | Dalton | 340/347 DD |
| 4,433,327 | 2/1984 | Vallet | 340/347 DD |

Primary Examiner—Charles D. Miller
Attorney, Agent, or Firm—Charles A. Johnson; Kenneth T. Grace; Marshall M. Truex

[57] ABSTRACT

A high speed system utilizing programmably controlled ranks of multiplexers for reformatting data from programmably selected first formats to second formats is described. Interleaved input data is utilized to optimize reformatting rates. The reformatting system provides field selection and justification together with the capability of complementing and magnitude generation of the selected fields. Floating-point operands in two different floating-point formats can be unpacked, that is the characteristic separated from the mantissa and properly aligned, and can be packed by positioning and recombining the characteristic with that associated mantissa. Throughout the entire reformatting process, parity for selected bit groupings is maintained, thereby allowing through checking of reformatting operations. The reformatting system includes programmably selectable constant generation.

25 Claims, 140 Drawing Figures

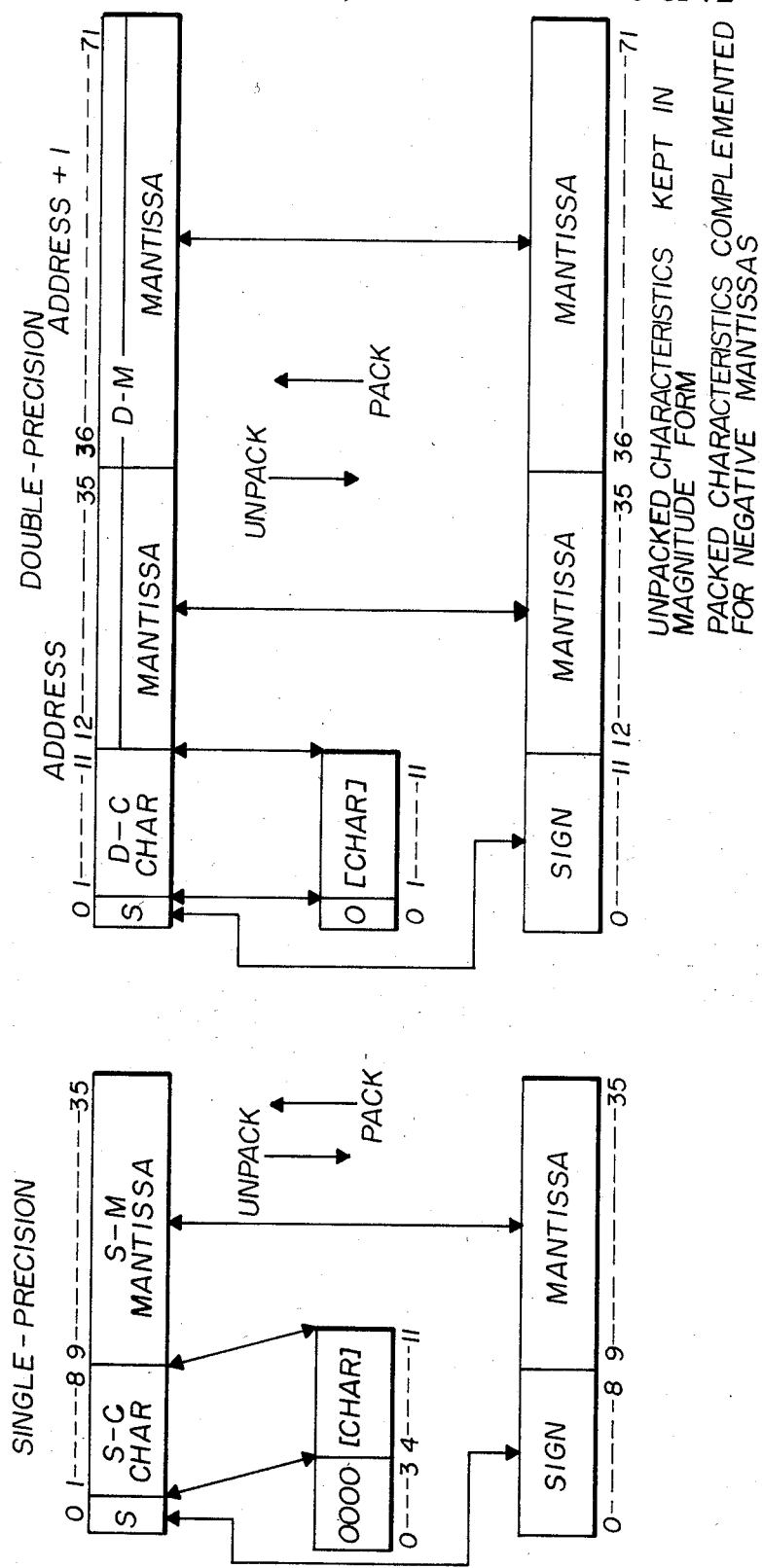

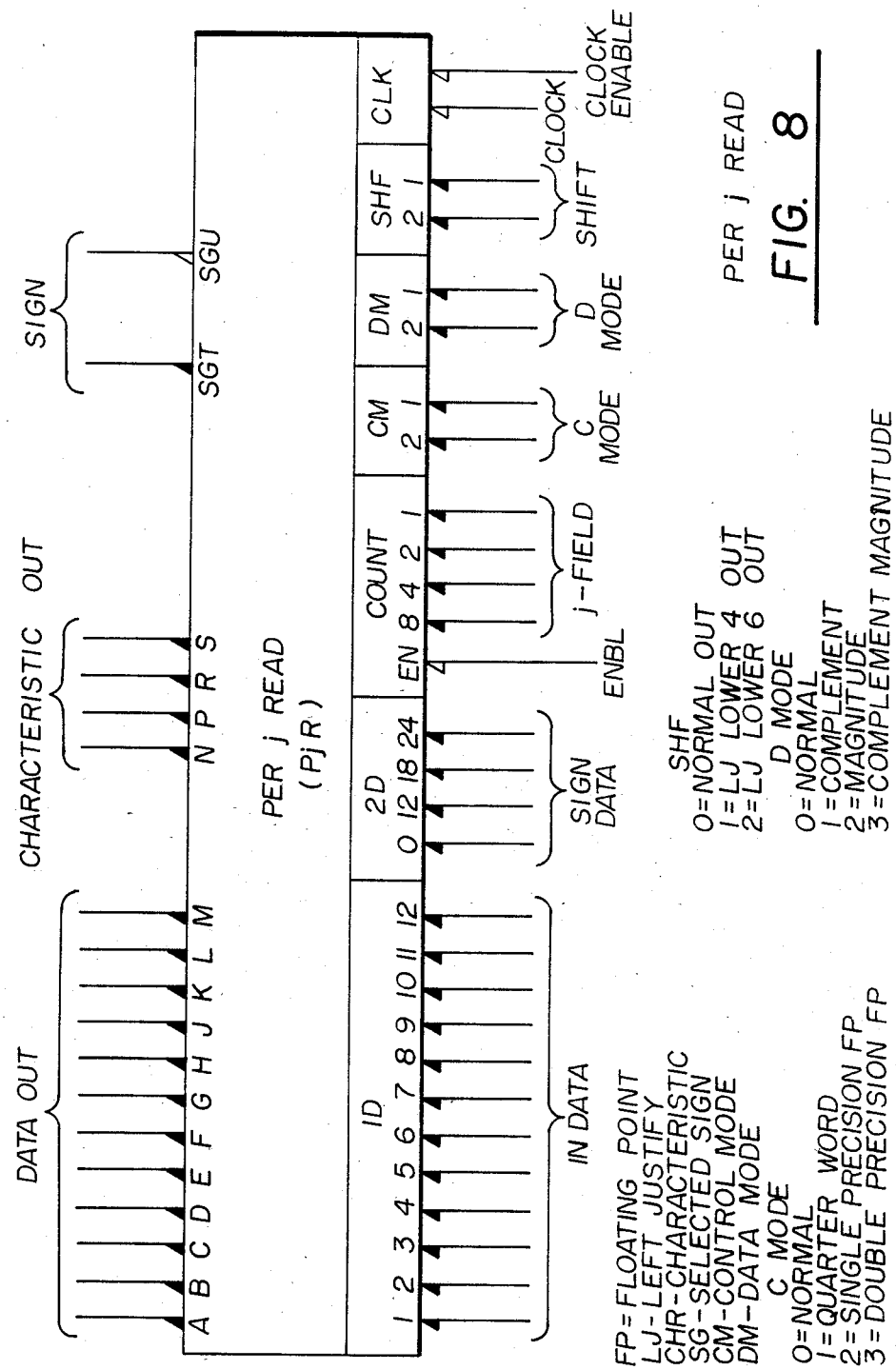

FIG. 10a

PER J READ TRUTH TABLE

| J-FIELD CNT | | CMODE | DMODE | SHF | CLK | DATA OUT | | | | | | | | | | | |
|---|---|---|---|---|---|---|---|---|---|---|---|---|---|---|---|---|---|
| COUNT 8421 | EN | 21 | 21 | 21 | EN | A | B | C | D | E | F | G | H | J | K | L | M |
| XXXX | H | LX | * | LL | L | D1 | D2 | D3 | D4 | D5 | D6 | D7 | D8 | D9 | D10 | D11 | D12 |
| XXXX | L | LX | * | HH | L | X | X | X | X | Z | Z | Z | Z | Z | Z | Z | Z |
| LLLL | L | LX | * | LL | L | D1 | D2 | D3 | D4 | D5 | D6 | D7 | D8 | D9 | D10 | D11 | D12 |
| LLLH | L | LX | * | LH | L | L | L | L | L | L | L | L | L | L | L | L | L |
| LLLX | L | LX | * | HL | L | D9 | D8 | D11 | D10 | D5 | D12 | Z | Z | Z | Z | Z | Z |
| LLHL | L | LX | * | LL | L | D7 | D8 | D9 | D10 | D11 | D12 | Z | Z | Z | Z | Z | Z |
| LLHL | L | LX | * | HL | L | L | L | L | L | L | L | L | L | L | L | L | L |
| LLHL | L | LX | * | LH | L | D3 | D4 | D5 | D6 | D11 | D12 | D1 | D2 | D3 | D4 | D5 | D6 |
| LLHL | L | LX | * | HL | L | D1 | D2 | D3 | D4 | D5 | D6 | Z | Z | Z | Z | Z | Z |
| LLHH | L | LX | * | LL | L | 2D18 | 2D18 | 2D18 | 2D18 | 2D18 | 2D18 | 2D18 | Z | Z | Z | Z | Z |
| LLHH | L | LX | * | LH | L | D9 | D10 | D11 | D12 | Z | Z | Z | Z | Z | Z | Z | Z |
| LHLL | L | LX | * | HL | L | D7 | D8 | D9 | D10 | D11 | D12 | Z | Z | D4 | D5 | D6 | Z |
| LHLL | L | LX | * | LL | L | 2D0 | 2D0 | 2D0 | 2D0 | 2D0 | 2D0 | D1 | D2 | D3 | D4 | D5 | D6 |
| LHLL | L | LL | * | LH | L | D3 | D4 | D5 | D6 | Z | Z | Z | Z | Z | Z | Z | Z |
| LHLL | L | LL | * | HL | L | D1 | D2 | D3 | D$ | D5 | D6 | D1 | D2 | D3 | D4 | D5 | D6 |
| LHLL | L | LH | * | LL | L | L | L | L | L | L | L | L | L | L | L | L | L |
| LHLL | L | LH | * | LH | L | L | L | L | D4 | D5 | D6 | D1 | D2 | D3 | D4 | D5 | D6 |
| LHLL | L | LL | * | HL | L | L | L | L | L | L | L | L | L | L | L | L | L |
| LHLH | L | LL | * | LL | L | 2D24 | 2D24 | 2D24 | 2D24 | 2D24 | 2D24 | 2D24 | 2D24 | D9 | D10 | D11 | D12 |
| LHLH | L | LL | * | LH | L | D9 | D10 | D11 | D12 | Z | Z | Z | Z | Z | Z | Z | Z |

| J-FIELD CNT COUNT 8421 | EN | CMODE 21 | DMODE 21 | SHF 21 | CLK EN | A | B | C | D | E | F | G | DATA OUT H | J | K | L | M |
|---|---|---|---|---|---|---|---|---|---|---|---|---|---|---|---|---|---|
| LHLH | L | LL | * | HL | L | 2D24 | 2D24 | D9 | D10 | D11 | D12 | N | N | N | N | N | N |
| LHLH | L | LH | * | LL | L | L | L | L | L | L | L | L | L | L | D10 | D11 | D12 |
| LHLH | L | LH | * | LH | L | L | L | D10 | D11 | D12 | N | N | N | N | N | N | N |
| LHLH | L | LH | * | HL | L | L | L | L | D10 | D11 | D12 | N | N | N | N | N | N |
| LHHL | L | LL | * | LL | L | 2D12 | 2D12 | 2D12 | 2D12 | 2D12 | 2D12 | 2D12 | 2D12 | N | N | N | N |
| LHHL | L | LH | * | LH | L | D5 | D6 | D7 | D8 | N | N | N | N | D5 | D6 | D7 | D8 |
| LHHL | L | LL | * | LL | L | 2D12 | 2D12 | D5 | D6 | D7 | D8 | N | N | N | N | N | N |
| LHHL | L | LH | * | LH | L | L | D7 | D8 | D9 | N | N | N | N | D7 | D8 | D9 | N |
| LHHH | L | LH | * | HL | L | L | L | L | D7 | D8 | D9 | N | N | N | N | N | N |
| LHHH | L | LL | * | LL | L | 2D0 | 2D0 | 2D0 | 2D0 | 2D0 | 2D0 | 2D0 | 2D0 | N | N | N | N |
| LHHH | L | LH | * | LH | L | D1 | D2 | D3 | D4 | N | N | N | N | D1 | D2 | D3 | D4 |
| LHHH | L | LL | * | LL | L | 2D0 | 2D0 | D0 | D2 | D3 | D4 | N | N | N | N | N | N |
| LHHH | L | LH | * | LH | L | L | D1 | D2 | D3 | N | N | N | N | D1 | D2 | D3 | N |
| LHHH | L | LH | * | HL | L | L | L | L | D1 | D2 | D3 | N | N | N | N | N | N |
| HLLL | L | LX | * | LL | L | L | L | L | L | L | L | L | L | L | L | L | D12 |
| HLLL | L | LX | * | LH | L | L | L | L | L | D11 | D12 | N | N | N | N | D11 | N |
| HLLL | L | LX | * | HL | L | L | L | L | D11 | D12 | N | N | N | N | D11 | N | N |
| HLLH | L | LX | * | LL | L | L | L | L | L | L | L | L | L | L | L | D9 | D10 |
| HLLH | L | LX | * | LH | L | L | D9 | D10 | N | N | N | N | N | N | D9 | N | N |

| J-FIELD CNT COUNT 8421 | EN | CMODE 21 | DMODE 21 | SHF 21 | CLK EN | A | B | C | D | E | F | G | H | J | K | L | M |
|---|---|---|---|---|---|---|---|---|---|---|---|---|---|---|---|---|---|
| | | | | | | | | | | | | | DATA OUT | | | | |
| HLLH | L | LX | * | HL | L | L | L | L | L | D9 | D10 | N | N | N | N | N | N |
| HLHL | L | LX | * | LL | L | L | L | L | L | L | L | L | L | L | L | L | L |
| HLHH | L | LX | * | LH | L | L | L | D7 | D8 | N | N | N | N | N | N | D7 | D8 |
| HHLL | L | LX | * | LL | L | L | L | L | L | L | L | L | L | L | L | L | L |
| HHLH | L | LX | * | LH | L | L | L | D5 | D6 | N | N | N | N | N | N | D5 | D6 |
| HHHL | L | LX | * | LL | L | L | L | L | L | L | L | L | L | L | L | L | L |
| HHHH | L | LX | * | LH | L | L | L | D3 | D4 | N | N | N | N | N | N | D3 | D4 |
| HLLL | L | LX | * | LL | L | L | L | L | L | L | L | L | L | L | L | L | L |
| HHLL | L | LX | * | LH | L | L | L | D1 | D2 | N | N | N | N | N | N | D1 | D2 |
| HHLL | L | LX | * | LL | L | L | L | L | L | L | L | L | L | L | L | L | L |
| HHLH | L | LX | * | LH | L | L | L | L | L | N | N | N | N | N | N | N | N |
| HHLL | L | LX | * | LL | L | L | L | L | L | L | L | L | L | L | L | L | L |
| HHLH | L | LX | * | LH | L | L | L | L | L | N | N | N | N | N | N | N | N |

| J-FIELD CNT | | | | CLK | | | | | | DATA OUT | | | | | |
| COUNT EN | CMODE | DMODE | SHF | EN | A | B | C | D | E | F | G | H | J | K | L | M |
| 8421 | 21 | 21 | 21 | | | | | | | | | | | | | |
| HHHL L | LX | * | LL | L | L | L | L | L | L | L | D7 | D8 | D9 | D10 | D11 | D12 |
| HHHX L | LX | * | LH | L | D9 | D10 | D11 | D12 | Z | Z | Z | Z | Z | Z | Z | Z |
| HHHX L | LX | * | HL | L | D7 | D8 | D9 | D10 | D11 | D12 | Z | Z | Z | Z | Z | Z |
| HHHH L | LX | * | LL | L | 2D18 | 2D18 | 2D18 | 2D18 | 2D18 | 2D18 | D7 | D8 | D9 | D10 | D11 | D12 |

*DMODE

21 = (Z OUTPUTS LOW REGARDLESS OF DMODE)
LL = NORMAL OUTPUT
LH = COMPLEMENT OUTPUT (ALL EXCEPT Z)
HL = COMPLEMENT OUTPUT IF 2D$_N$ IS NEGATIVE (ALL EXCEPT Z)
HH = COMPLEMENT OUTPUT IF 2D$_N$ IS POSITIVE (ALL EXCEPT Z)

PER J READ
FLOATING POINT MODE TRUTH TABLE

| J-FIELD COUNT | CNT EN | CMODE | DMODE | SHF | CLK EN | DATA OUT | | | | | | | | | | | | |
|---|---|---|---|---|---|---|---|---|---|---|---|---|---|---|---|---|---|---|
| 8421 | | 21 | 21 | 21 | | A | B | C | D | E | F | G | H | J | K | L | M |
| XXXX | H | HL | * | LL | L | 2D1 | 2D1 | 2D1 | D4 | D5 | D6 | D7 | D8 | D9 | D10 | D11 | D12 |
| XXXX | H | HH | * | LL | L | 2D1 | 2D1 | 2D1 | 2D1 | D5 | D6 | D7 | D8 | D9 | D10 | D11 | D12 |
| XXXX | H | HL | * | LL | H | D1 | D2 | D3 | D4 | D5 | D6 | D7 | D8 | D9 | D10 | D11 | D12 |
| XXXX | H | HH | * | LL | H | D1 | D1 | D3 | D4 | D5 | D6 | D7 | D8 | D9 | D10 | D11 | D12 |

| J-FIELD COUNT | CNT EN | CMODE | DMODE | SHF | CLK EN | CHR OUT | | | |
|---|---|---|---|---|---|---|---|---|---|
| 8421 | | 21 | 21 | 21 | | N | P | R | S |
| XXXX | H | HL | * | LL | L | L | D1 | D2 | D3 |
| XXXX | H | HH | * | LL | L | D1 | D2 | D3 | D4 |
| XXXX | H | HL | * | LL | H | L | D1 | D2 | D3 |
| XXXX | H | HH | * | LL | H | D1 | D2 | D3 | D4 |

* DMODE
21
LL = NORMAL OUTPUT
LH = COMPLEMENT DATA OUT
HL = COMPLEMENT DATA OUT IF 2D1 IS NEGATIVE (HIGH)
HH = COMPLEMENT DATA OUT IF 2D1 IS POSITIVE (LOW)

COMPLEMENT CHR OUT IF 2D1 NEGATIVE

PER J READ SELECTOR CONTROL

SEL 1
 0=(CNT≠2+4+7+(13-15))+ $\overline{CNT\ EN}$
 1=(CNT=2+4+7+(13-15))(CNT EN)
SEL 2A
 0=(CNT≠(5-7)($\overline{1CM}$)+(4-7)(1CM)+(10-15))+ $\overline{CNT\ EN}$
 1=(CNT=(5-7)($\overline{1CM}$)+(4-7)(1CM)+(10-15))(CNT EN)
SEL 2B
 0=(CNT≠(4-5)(1CM)+6+7+(10-15))+ $\overline{(CNT\ EN)}$
 1=(CNT=7($\overline{1CM}$))(CNT EN)
 2=(CNT=6($\overline{1CM}$))(CNT EN)
 3=(CNT=(4-7)(1CM)+(10-15))(CNT EN)
SEL 2C
 0=(CNT≠6+7($\overline{1CM}$))+$\overline{(CNT\ EN)}$+(CNT≠10-15)
 1=(CNT=7($\overline{1CM}$))(CNT EN)
 2=(CNT=6(1CM))(CNT EN)
 3=(CNT=6($\overline{1CM}$))(CNT EN)
 4=(CNT=10-15)(CNT EN)
SEL 2D
 0=(CNT≠6+11)+$\overline{(CNT\ EN)}$
 1=(CNT=(7($\overline{1CM}$)+11+14)CNT EN
 2=(CNT=(6+7)(CM1)) CNT EN
 3=(CNT=6($\overline{1CM}$)+12+15) CNT EN
SEL 3A
 0=$\overline{(1SHF)}$ $\overline{(2SHF)}$((CNT=0)+$\overline{(CNT\ EN)}$)($\overline{(2CM)}$+$\overline{(CLK\ EN)}$)
 1=2SHF
 2=1SHF
 3=((CNT≠0)CNT EN+2CM)$\overline{(2SHF)}$$\overline{(1SHF)}$CLK EN
SEL 3B
 0=$\overline{(1SHF)}$$\overline{(2SHF)}$((CNT=0)+$\overline{(CNT\ EN)}$)($\overline{(2CM)}$+$\overline{(CLK\ EN)}$)
 1=2SHF
 2=1SHF
 3=((CNT≠0)CNT EN+(2CM)(1CM))$\overline{(1SHF)}$$\overline{(2SHF)}$CLK EN
SEL 3C
 0=((CNT=0)+$\overline{(CNT\ EN)}$+$\overline{(CLK\ EN)}$)$\overline{(2SHF)}$
 1=2SHF
 2=(CNT≠0)$\overline{(2SHF)}$(CNT EN)(CLK EN)

FIG. 12c

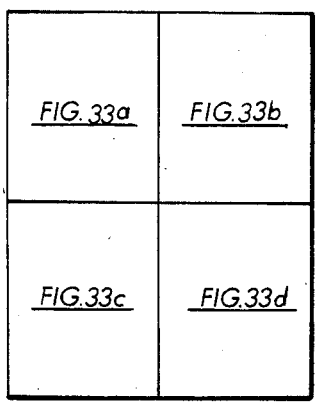

FIG. 33

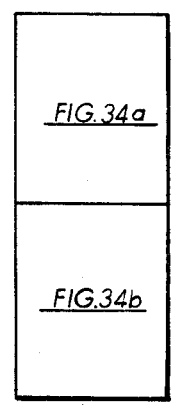

FIG. 34

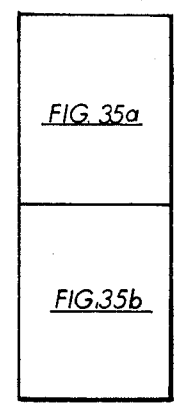

FIG. 35

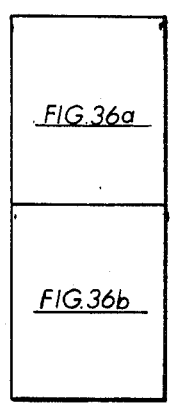

FIG. 36

PER J READ

CHRS SEL
0 = (1CM)
1 = ($\overline{1CM}$)

SIGN SEL
0 = (CNT≠(5+6)($\overline{1CM}$)+3+17) + $\overline{CNT\ EN}$
1 = (CNT = 6($\overline{1CM}$))(CNT EN)
2 = (CNT = 3+17)(CNT EN)
3 = (CNT = 5($\overline{1CM}$))(CNT EN)

SG SEL
0 = (CLK EN)(CNT≠0,3+(4-7)($\overline{1CM}$)+17)($\overline{2CM}$)
1 = (CLK EN)(CNT = 0,3+(4-7)($\overline{1CM}$)+17)+(CLK EN)(2CM)
2 = ($\overline{CLK\ EN}$)

CMPLM = ($\overline{2DM}$)(1DM) + 2DM(1DM⊕SIGN SEL)

CHRS OUT SEL
0 = 1CM
1 = ($\overline{1CM}$)

OUT SEL
0 = (2SHF)($\overline{1SHF}$)
1 = 2SHF
2 = 1SHF

FIG. 12d

PER J WRITE
SELECTOR ENABLE CONDITIONS

SEL 1
00 = (CNT = 0+4) + ($\overline{CNT\ EN}$)
01 = (CNT = 2CNT)(CNT EN)($\overline{CONST\ EN}$)
10 = (CNT = 0+4)(CONST EN) + (CONST EN)(CNT EN)

SEL 2
00 = (CNT≠3-7) + ($\overline{CNT\ EN}$)
01 = (CNT = 3)($\overline{1\ CMODE}$)(CNT EN)
10 = (CNT = 3)(1 CMODE)(CNT EN)
11 = (CNT = 4-7)(CNT EN)

SEL 3
00 = ($\overline{2\ CMODE}$) + (1F)
01 = (2 CMODE)(1 CMODE)($\overline{1F}$)
10 = (2 CMODE)(1 CMODE)(CLK EN)($\overline{1F}$)

SIGN SEL
00 = (1F)($\overline{2F}$)
01 = ($\overline{1F}$)(2F)
1X = 2F

PK SEL 1
0 = (GP≠0)
1 = (GP=0)

CHR OUT SEL 1
00 = (SIGN)(1 CMODE)($\overline{2F}$)
01 = ($\overline{SIGN}$)(1 CMODE)($\overline{2F}$)
10 = 2F($\overline{1\ CMODE}$)
11 = ($\overline{1\ CMODE}$)2F CHR SEL
0 = ($\overline{1\ CMODE}$)
1 = (1 CMODE)

PK SEL 2
0 = (GP≠0) + (1 CMODE)
1 = (GP=0)($\overline{1\ CMODE}$)

CHR OUT SEL 2
00 = (SIGN)$\overline{2F}$
01 = ($\overline{SIGN}$)2F
10 = 2F

FIG. 30

$A \oplus B = C$  $E = (A+C) \oplus (B+D)$

EXCLUSIVE OR

GATED EXCLUSIVE OR

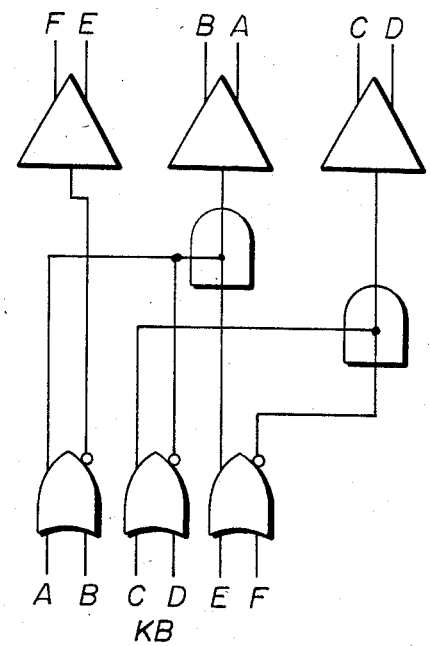
FIG. 13l
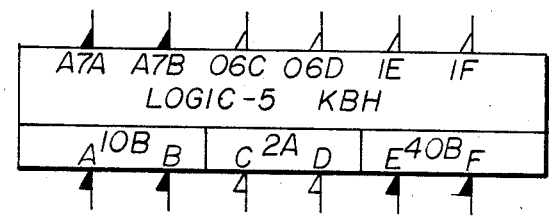
FIG. 13m
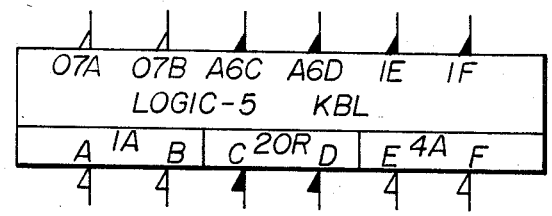
FIG. 13n
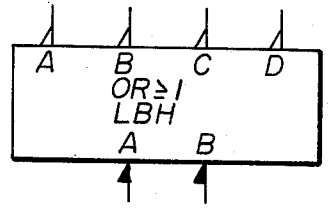
FIG. 13p
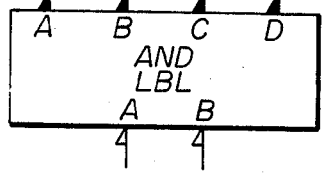
FIG. 13q
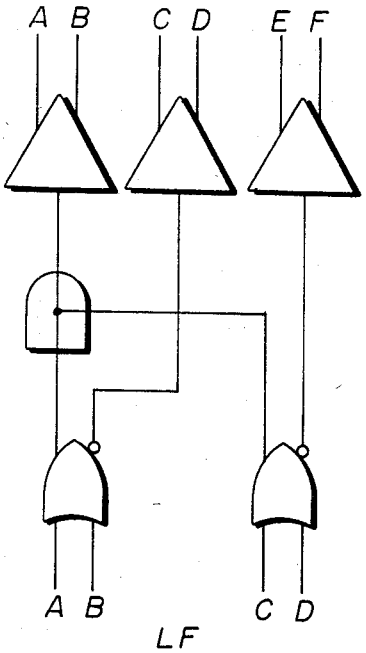
FIG. 13r
FIG. 13o

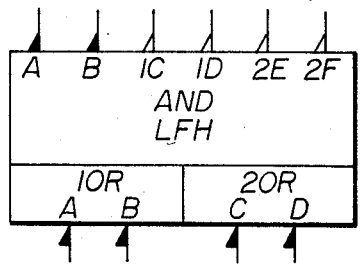
FIG. 13s
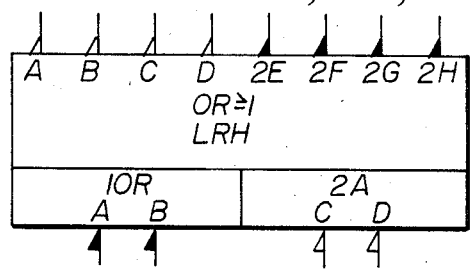
FIG. 13v
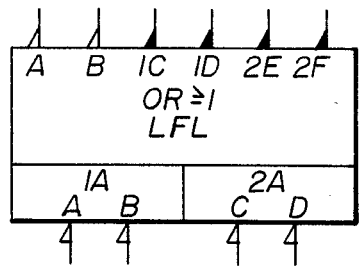
FIG. 13t
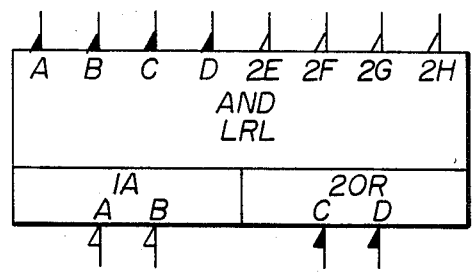
FIG. 13w
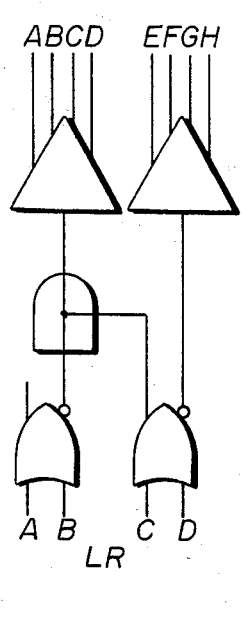
FIG. 13u
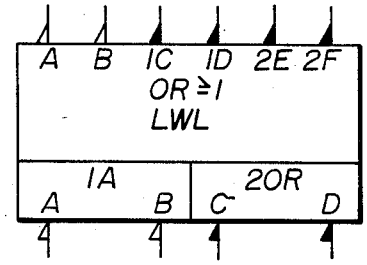
FIG. 13y
FIG. 13z
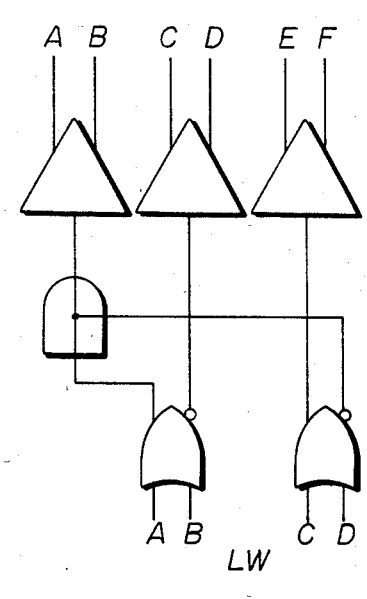
FIG. 13x

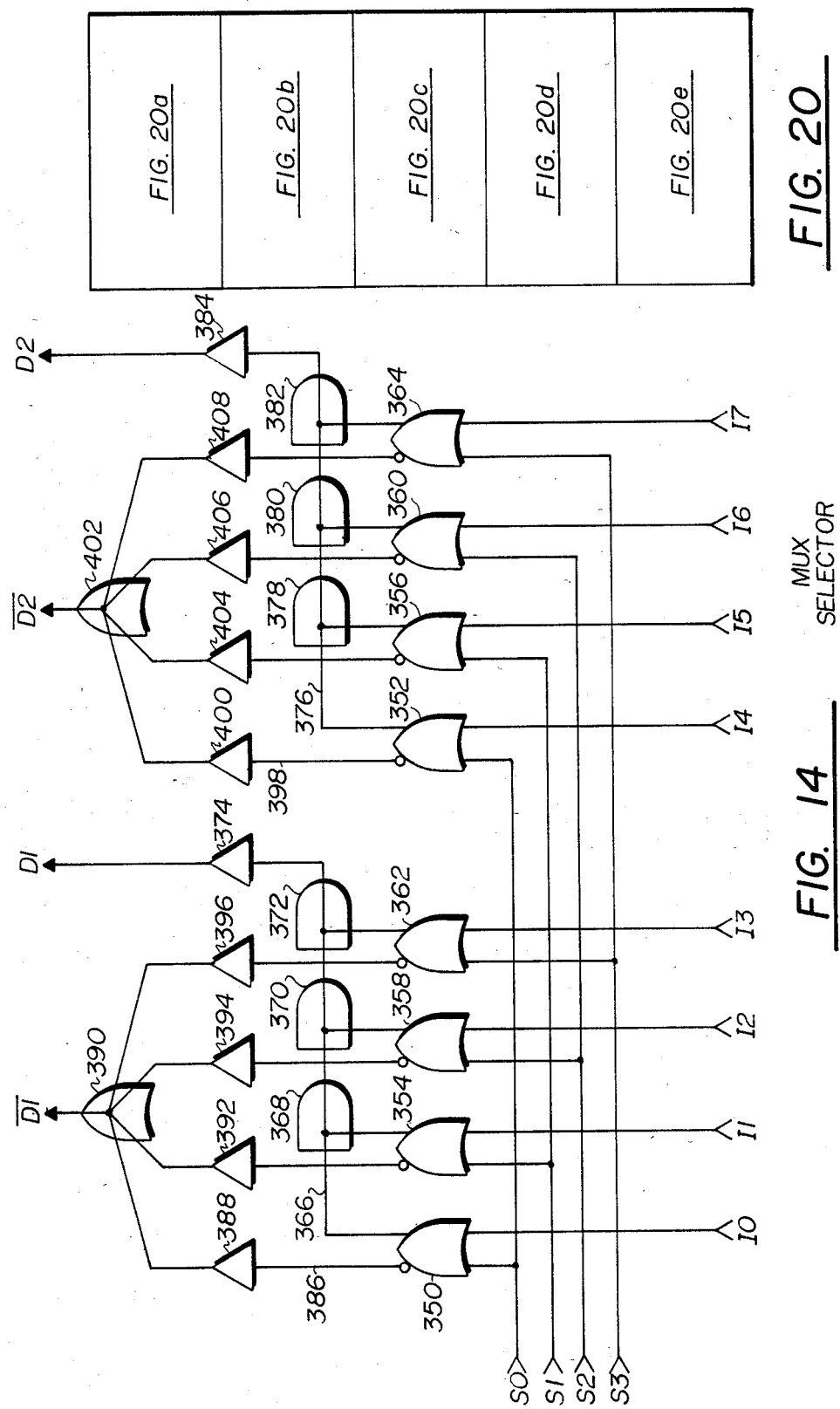

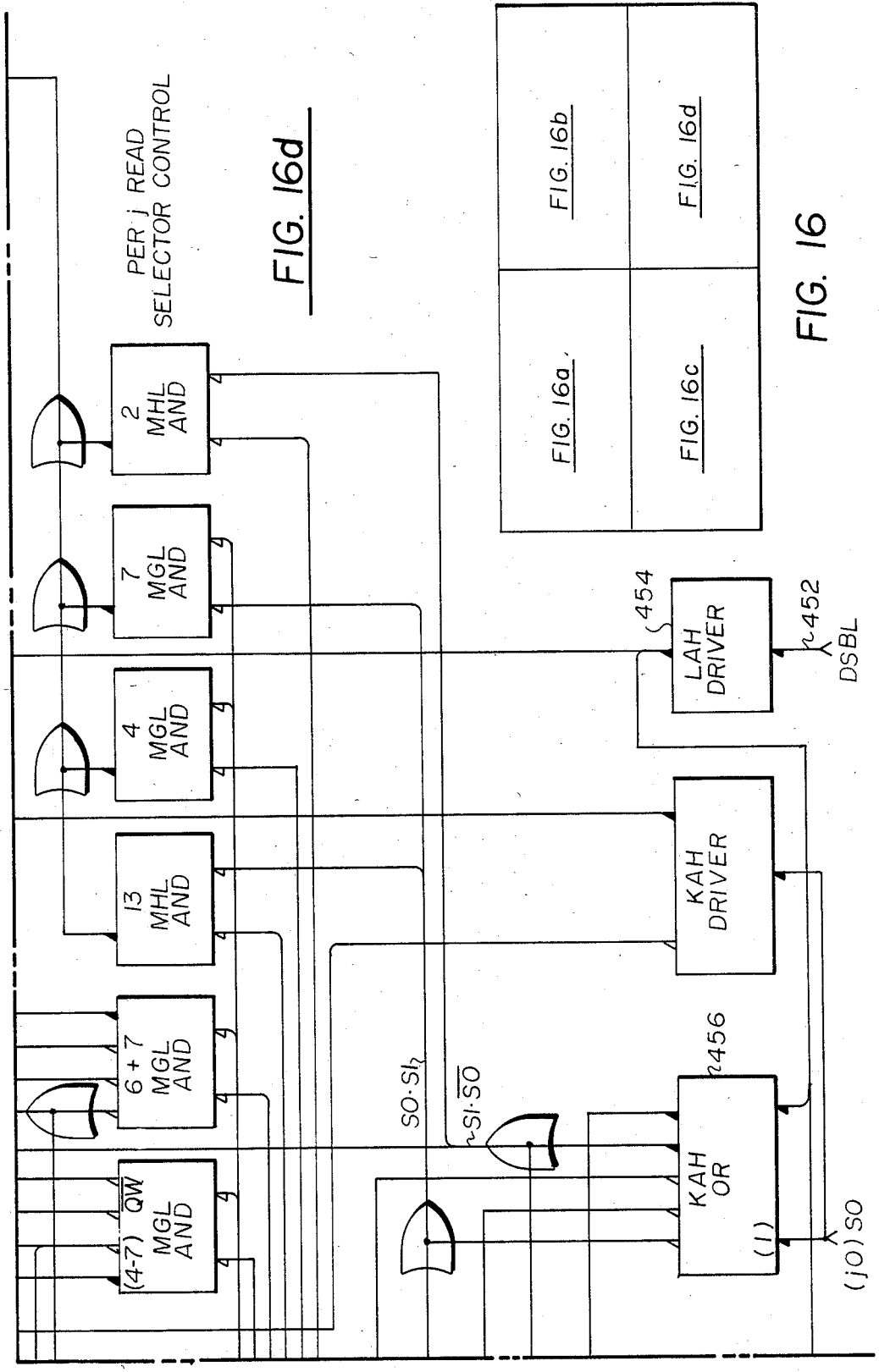

FIG. 19b

PER J READ BIT MATRIX

| J-FIELD (OCTAL) | CNT (OCTAL) | QTR WD DES/ C MODE | OUTPUT DATA | | | | | | | | | | | | |
|---|---|---|---|---|---|---|---|---|---|---|---|---|---|---|---|
| | | | A | B | C | D | E | F | G | H | J | K | L | M |
| 0 | 0 OR NOT CNT EN | 0 OR 1 | 0 | 3 | 6 | 9 | 12 | 15 | 18 | 21 | 24 | 27 | 30 | 33 |
| | | | 1 | 4 | 7 | 10 | 13 | 16 | 19 | 22 | 25 | 28 | 31 | 34 |
| | | | 2 | 5 | 8 | 11 | 14 | 17 | 20 | 23 | 26 | 29 | 32 | 35 |
| | | | P0 | P1 | P2 | P3 | P4 | P5 | P6 | P7 | P8 | P9 | P10 | P11 |
| 1 | 1 | 0 OR 1 | L | L | L | L | L | L | 18 | 21 | 24 | 27 | 30 | 33 |
| | | | L | L | L | L | L | L | 19 | 22 | 25 | 28 | 31 | 34 |
| | | | L | L | L | L | L | L | 20 | 23 | 26 | 29 | 32 | 35 |
| | | | L | L | L | L | L | L | P6 | P7 | P8 | P9 | P10 | P11 |
| 2 | 2 | 0 OR 1 | L | L | L | L | L | L | 0 | 3 | 6 | 9 | 12 | 15 |
| | | | L | L | L | L | L | L | 1 | 4 | 7 | 10 | 13 | 16 |
| | | | L | L | L | L | L | L | 2 | 5 | 8 | 11 | 14 | 17 |
| | | | L | L | L | L | L | L | P0 | P1 | P2 | P3 | P4 | P5 |
| 3 | 3 | 0 OR 1 | 2D18 | 2D18 | 2D18 | 2D18 | 2D18 | 2D18 | 18 | 21 | 24 | 27 | 30 | 33 |
| | | | 2D18 | 2D18 | 2D18 | 2D18 | 2D18 | 2D18 | 19 | 22 | 25 | 28 | 31 | 34 |
| | | | 2D18 | 2D18 | 2D18 | 2D18 | 2D18 | 2D18 | 20 | 23 | 26 | 29 | 32 | 35 |
| | | | 2D18 | 2D18 | 2D18 | 2D18 | 2D18 | 2D18 | P6 | P7 | P8 | P9 | P10 | P11 |

PER J READ BIT MATRIX

| J-FIELD (OCTAL) | CNT (OCTAL) | QTR WD DES/ C MODE | OUTPUT DATA | | | | | | | | | | | | |
|---|---|---|---|---|---|---|---|---|---|---|---|---|---|---|---|
| | | | A | B | C | D | E | F | G | H | J | K | L | M |
| 4 | 4 | 0 | 2D0 | 2D0 | 2D0 | 2D0 | 2D0 | 2D0 | 0 | 3 | 6 | 9 | 12 | 15 |
| | | | 2D0 | 2D0 | 2D0 | 2D0 | 2D0 | 2D0 | 1 | 4 | 7 | 10 | 13 | 16 |
| | | | 2D0 | 2D0 | 2D0 | 2D0 | 2D0 | 2D0 | 2 | 5 | 8 | 11 | 14 | 17 |
| | | | 2D0 | 2D0 | 2D0 | 2D0 | 2D0 | 2D0 | P0 | P1 | P2 | P3 | P4 | P5 |
| 5 | 5 | 0 | 2D24 | 2D24 | 2D24 | 2D24 | 2D24 | 2D24 | 2D24 | 2D24 | 24 | 27 | 30 | 33 |
| | | | 2D24 | 2D24 | 2D24 | 2D24 | 2D24 | 2D24 | 2D24 | 2D24 | 25 | 28 | 31 | 34 |
| | | | 2D24 | 2D24 | 2D24 | 2D24 | 2D24 | 2D24 | 2D24 | 2D24 | 26 | 29 | 32 | 35 |
| | | | 2D24 | 2D24 | 2D24 | 2D24 | 2D24 | 2D24 | 2D24 | 2D24 | P8 | P9 | P10 | P11 |
| 6 | 6 | 0 | 2D12 | 2D12 | 2D12 | 2D12 | 2D12 | 2D12 | 2D12 | 2D12 | 12 | 15 | 18 | 21 |
| | | | 2D12 | 2D12 | 2D12 | 2D12 | 2D12 | 2D12 | 2D12 | 2D12 | 13 | 16 | 19 | 22 |
| | | | 2D12 | 2D12 | 2D12 | 2D12 | 2D12 | 2D12 | 2D12 | 2D12 | 14 | 17 | 20 | 23 |
| | | | 2D12 | 2D12 | 2D12 | 2D12 | 2D12 | 2D12 | 2D12 | 2D12 | P4 | P5 | P6 | P7 |
| 7 | 7 | 0 | 2D0 | 2D0 | 2D0 | 2D0 | 2D0 | 2D0 | 2D0 | 2D0 | 0 | 3 | 6 | 9 |
| | | | 2D0 | 2D0 | 2D0 | 2D0 | 2D0 | 2D0 | 2D0 | 2D0 | 1 | 4 | 7 | 10 |
| | | | 2D0 | 2D0 | 2D0 | 2D0 | 2D0 | 2D0 | 2D0 | 2D0 | 2 | 5 | 8 | 11 |
| | | | 2D0 | 2D0 | 2D0 | 2D0 | 2D0 | 2D0 | 2D0 | 2D0 | P0 | P1 | P2 | P3 |

PER J READ BIT MATRIX

| J-FIELD (OCTAL) | CNT (OCTAL) | QTR WD DES/ C MODE | OUTPUT DATA | | | | | | | | | K | L | M |
|---|---|---|---|---|---|---|---|---|---|---|---|---|---|---|
| | | | A | B | C | D | E | F | G | H | J | | | |
| 4 | 4 | | L | L | L | L | L | L | L | L | L | 0 | 3 | 6 |
| | | | L | L | L | L | L | L | L | L | L | 1 | 4 | 7 |
| | | | L | L | L | L | L | L | L | L | L | 2 | 5 | 8 |
| | | 1 | L | L | L | L | L | L | L | L | L | P0 | P1 | P2 |
| 5 | 5 | | L | L | L | L | L | L | L | L | L | 27 | 30 | 33 |
| | | | L | L | L | L | L | L | L | L | L | 28 | 31 | 34 |
| | | | L | L | L | L | L | L | L | L | L | 29 | 32 | 35 |
| | | 1 | L | L | L | L | L | L | L | L | L | P9 | P10 | P11 |
| 6 | 6 | | L | L | L | L | L | L | L | L | L | 9 | 12 | 15 |
| | | | L | L | L | L | L | L | L | L | L | 10 | 13 | 16 |
| | | | L | L | L | L | L | L | L | L | L | 11 | 14 | 17 |
| | | 1 | L | L | L | L | L | L | L | L | L | P3 | P4 | P5 |
| 7 | 7 | | L | L | L | L | L | L | L | L | L | L | 30 | 33 |
| | | | L | L | L | L | L | L | L | L | L | L | 31 | 34 |
| | | | L | L | L | L | L | L | L | L | L | L | 32 | 35 |
| | | 1 | L | L | L | L | L | L | L | L | L | L | P10 | P11 |

PER J READ BIT MATRIX

| J-FIELD (OCTAL) | CNT (OCTAL) | QTR WD DES/C MODE | OUTPUT DATA | | | | | | | | | | | |
|---|---|---|---|---|---|---|---|---|---|---|---|---|---|---|
| | | | A | B | C | D | E | F | G | H | J | K | L | M |
| 14 | 14 | 0 OR 1 | L | L | L | L | L | L | L | L | L | L | 6 | 9 |
| | | | L | L | L | L | L | L | L | L | L | L | 7 | 10 |
| | | | L | L | L | L | L | L | L | L | L | L | 8 | 11 |
| | | | L | L | L | L | L | L | L | L | L | L | P2 | P3 |
| 15 | 15 | 0 OR 1 | L | L | L | L | L | L | L | L | L | L | 0 | 3 |
| | | | L | L | L | L | L | L | L | L | L | L | 1 | 4 |
| | | | L | L | L | L | L | L | L | L | L | L | 2 | 5 |
| | | | L | L | L | L | L | L | L | L | L | L | P0 | P1 |
| 16 | 16 | 0 OR 1 | L | L | L | L | L | L | 18 | 21 | 24 | 27 | 30 | 33 |
| | | | L | L | L | L | L | L | 19 | 22 | 25 | 28 | 31 | 34 |
| | | | L | L | L | L | L | L | 20 | 23 | 26 | 29 | 32 | 35 |
| | | | L | L | L | L | L | L | P6 | P7 | P8 | P9 | P10 | P11 |
| 17 | 17 | 0 OR 1 | 2D18 | 2D18 | 2D18 | 2D18 | 2D18 | 2D18 | 18 | 21 | 24 | 27 | 30 | 33 |
| | | | 2D18 | 2D18 | 2D18 | 2D18 | 2D18 | 2D18 | 19 | 22 | 25 | 28 | 31 | 34 |
| | | | 2D18 | 2D18 | 2D18 | 2D18 | 2D18 | 2D18 | 20 | 23 | 26 | 29 | 32 | 35 |
| | | | 2D18 | 2D18 | 2D18 | 2D18 | 2D18 | 2D18 | P6 | P7 | P8 | P9 | P10 | P11 |

FIG. 20e

FIG. 21
PER J READ (FLOATING POINT MODE)

| J-FIELD (OCTAL) | CNT | CMODE | A | B | C | D | E | F | G | H | J | K | L | M | N | P | R | S |
|---|---|---|---|---|---|---|---|---|---|---|---|---|---|---|---|---|---|---|
| 0 | 0 OR 2 | | L | L | L | 9 | 12 | 15 | 18 | 21 | 24 | 27 | 30 | 33 | L | 0 | 3 | 6 |
| | | | L | L | L | 10 | 13 | 16 | 19 | 22 | 25 | 28 | 31 | 34 | L | 1 | 4 | 7 |
| | | | L | L | L | 11 | 14 | 17 | 20 | 23 | 26 | 29 | 32 | 35 | L | 2 | 5 | 8 |
| | NOT CNT EN | | L | L | L | P3 | P4 | P5 | P6 | P7 | P8 | P9 | P10 | P11 | L | P0 | P1 | P2 |
| 0 | 0 OR 3 | | L | L | L | L | 12 | 15 | 18 | 21 | 24 | 27 | 30 | 33 | 0 | 3 | 6 | 9 |
| | | | L | L | L | L | 13 | 16 | 19 | 22 | 25 | 28 | 31 | 34 | 1 | 4 | 7 | 10 |
| | | | L | L | L | L | 14 | 17 | 20 | 23 | 26 | 29 | 32 | 35 | 2 | 5 | 8 | 11 |
| | NOT CNT EN | | L | L | L | L | P4 | P5 | P6 | P7 | P8 | P9 | P10 | P11 | P0 | P1 | P2 | P3 |

FIG. 25
PER J WRITE
TRUTH TABLE - OUTPUT DATA

| CONTROL SIGNALS | | | | | | | OUTPUT DATA | | | | | | | | | | | | |
|---|---|---|---|---|---|---|---|---|---|---|---|---|---|---|---|---|---|---|---|
| COUNT 4 2 1 | CNT EN | CMODE 2 1 | DMODE 2 1 | A | B | C | D | E | F | G | H | J | K | L | M |
| L L L | L | L X | * * | 1 | 2 | 3 | 4 | 5 | 6 | 7 | 8 | 9 | 10 | 11 | 12 |
| L L H | L | L X | * * | 7 | 8 | 9 | 10 | 11 | 12 | 7 | 8 | 9 | 10 | 11 | 12 |
| L H L | L | L X | * * | 7 | 8 | 11 | 10 | 11 | 12 | 7 | 8 | 11 | 10 | 11 | 12 |
| L H H | L | L X | * * | 9 | 10 | 12 | 12 | 9 | 10 | 11 | 12 | 12 | 9 | 11 | 9 |
| H L L | L | L L | * * | 10 | 11 | 5 | 9 | 5 | 12 | 10 | 11 | 5 | 9 | 5 | 12 |
| H L H | L | L H | * * | 5 | 9 | 11 | 12 | 11 | 12 | 5 | 9 | 11 | 12 | 11 | 12 |
| H H L | L | L X | * * | 11 | 12 | 11 | 12 | 11 | 12 | 11 | 12 | 11 | 12 | 11 | 12 |
| H H X | L | L X | * * | 11 | 12 | 11 | 12 | 11 | 12 | 11 | 12 | 11 | 12 | 11 | 12 |
| X X X | H | L X | * * | 1 | 2 | 3 | 4 | 5 | 6 | 7 | 8 | 9 | 10 | 11 | 12 |

* D MODE
LL = NORMAL OUTPUT DATA
LH = COMPLEMENT OUTPUT DATA
HL = COMPLEMENT OUTPUT DATA IF SELECTED SIGN IS NEGATIVE
HH = COMPLEMENT OUTPUT DATA IF SELECTED SIGN IS POSITIVE
F(0) = 2D1 SIGN VALUE
(1) = 2D2 SIGN VALUE
(2,3) = POSITIVE SIGN VALUE

THE NUMBERS IN THE OUTPUT COLUMNS ARE INPUT PIN NUMBERS FOR EACH CONDITION

WORD FIELDS

READ OPERATION = j SELECTED FIELD RIGHT JUSTIFIED AND SIGN FILL (J=3 OR 4-7 $\overline{QTR\ WD}$ OR 17) OR ZERO FILL ON LEFT.

WRITE OPERATION = RIGHT JUSTIFIED FIELD LEFT SHIFTED TO FIELD SELECTED BY j.

j = 16 OR 17 ARE SPECIAL CASES THAT USE THE IMMEDIATE DATA. (X=0 USE BITS 18-35 OF INSTRUCTION WORD. X≠0 USE 20-35+($X_M$))

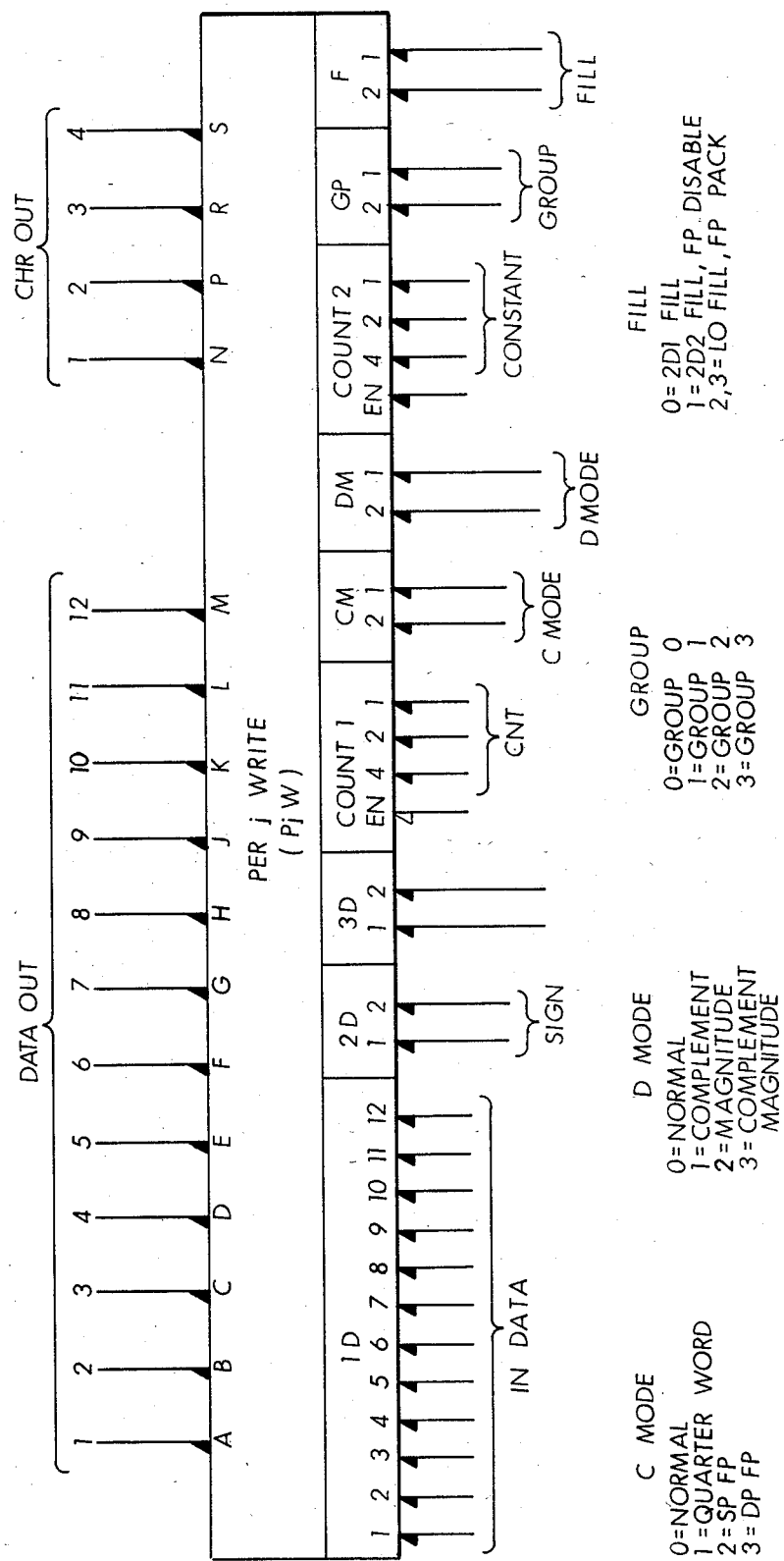

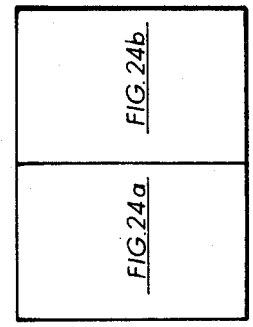
FIG. 26
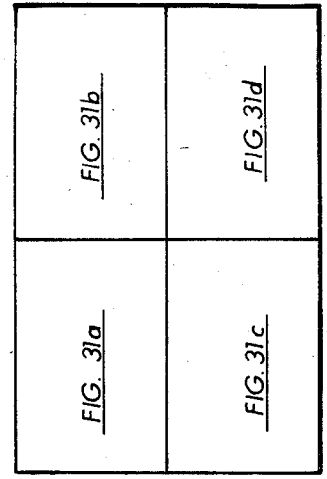
FIG. 24
FIG. 31

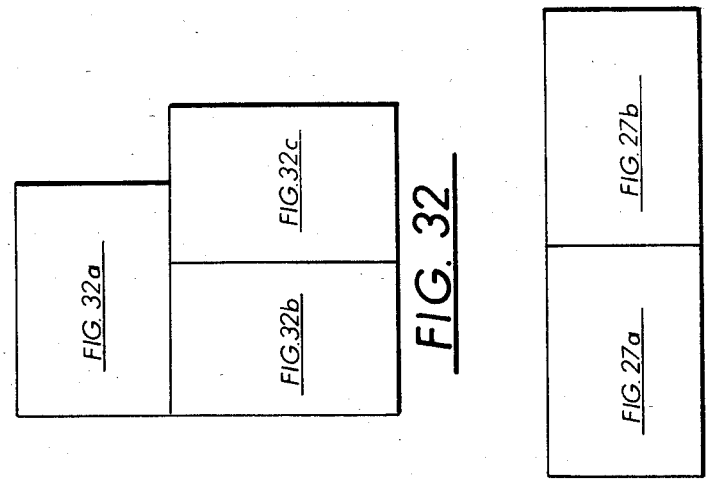
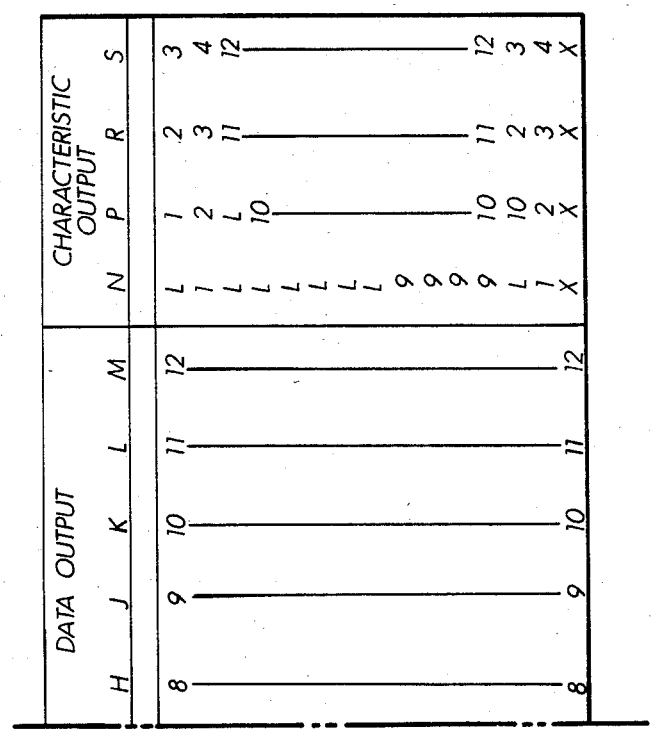

FIG. 27a

PER J WRITE

TRUTH TABLE — FLOATING POINT MODE

| COUNT | | | CNT | CONTROL SIGNALS | | | | | | | | | | DATA OUTPUT | | | | | | |
|---|---|---|---|---|---|---|---|---|---|---|---|---|---|---|---|---|---|---|---|---|
| | | | | CMODE | | DMODE | | 2F2 | 3D | | 2F1 | 2D | CONST | GMODE | | | | | | | | |
| 4 | 2 | 1 | EN | 2 | 1 | 2 | 1 | | 1 | 2 | | | EN | 2 | 1 | A | B | C | D | E | F | G |
| L | L | L | L | H | L | * | * | L | X | X | L | SIGN | L | X | X | 2D | 2D | 2D | 4 | 5 | 6 | 7 |
| L | L | L | L | H | H | | | L | X | X | L | SIGN | L | X | X | 2D | 2D | 2D | 2D | | | |
| L | L | L | L | H | L | | | H | X | L | L | SIGN | L | L | L | L | L | L | 4 | | | |
| L | L | L | L | H | H | | | H | X | L | L | SIGN | L | L | H | L | L | L | L | | | |
| L | L | L | L | H | L | | | H | L | H | L | SIGN | L | H | L | L | L | L | L | | | |
| L | L | L | L | H | H | | | H | L | L | L | SIGN | L | H | H | L | L | L | L | | | |
| L | L | L | L | H | L | | | H | L | L | L | SIGN | L | L | H | L | L | L | L | | | |
| L | L | L | L | H | H | | | H | L | L | L | SIGN | L | H | L | L | L | L | L | | | |
| L | L | L | L | H | L | | | H | L | L | L | SIGN | L | H | H | L | L | L | L | | | |
| L | L | L | L | H | H | | | H | L | L | L | SIGN | L | H | H | L | L | L | L | | | |
| L | L | L | L | H | L | | | L | H | L | L | SIGN | L | X | X | L | L | L | L | | | |
| L | L | L | L | H | H | * | * | L | X | X | H | SIGN | L | X | X | 2D | 2D | 2D | 4 | | | |
| X | X | X | H | X | X | | | L | X | X | L | X | L | X | X | 2D | 2D | 2D | 2D | 5 | 6 | 7 |
| X | X | X | L | X | X | | | L | X | X | L | SIGN | L | X | X | 2D | 2D | 2D | 2D | | | |
| | | | | | | | | | | | | | | | | 1 | 2 | 3 | 4 | | | |

\* DMODE
   2 1
   L L = NORMAL DATA OUTPUT
   L H = COMPLEMENT DATA OUTPUT SELECTED
   H L = COMPLEMENT DATA OUTPUT IF SELECTED IS SIGN NEGATIVE
   H H = COMPLEMENT DATA OUTPUT IF SELECTED IS SIGN POSITIVE

COMPLEMENT CHARACTERISTIC OUTPUT IF SELECTED SIGN IS NEGATIVE
THE NUMBERS IN THE OUTPUT COLUMNS ARE INPUT PIN NUMBERS FOR EACH CONDITION.

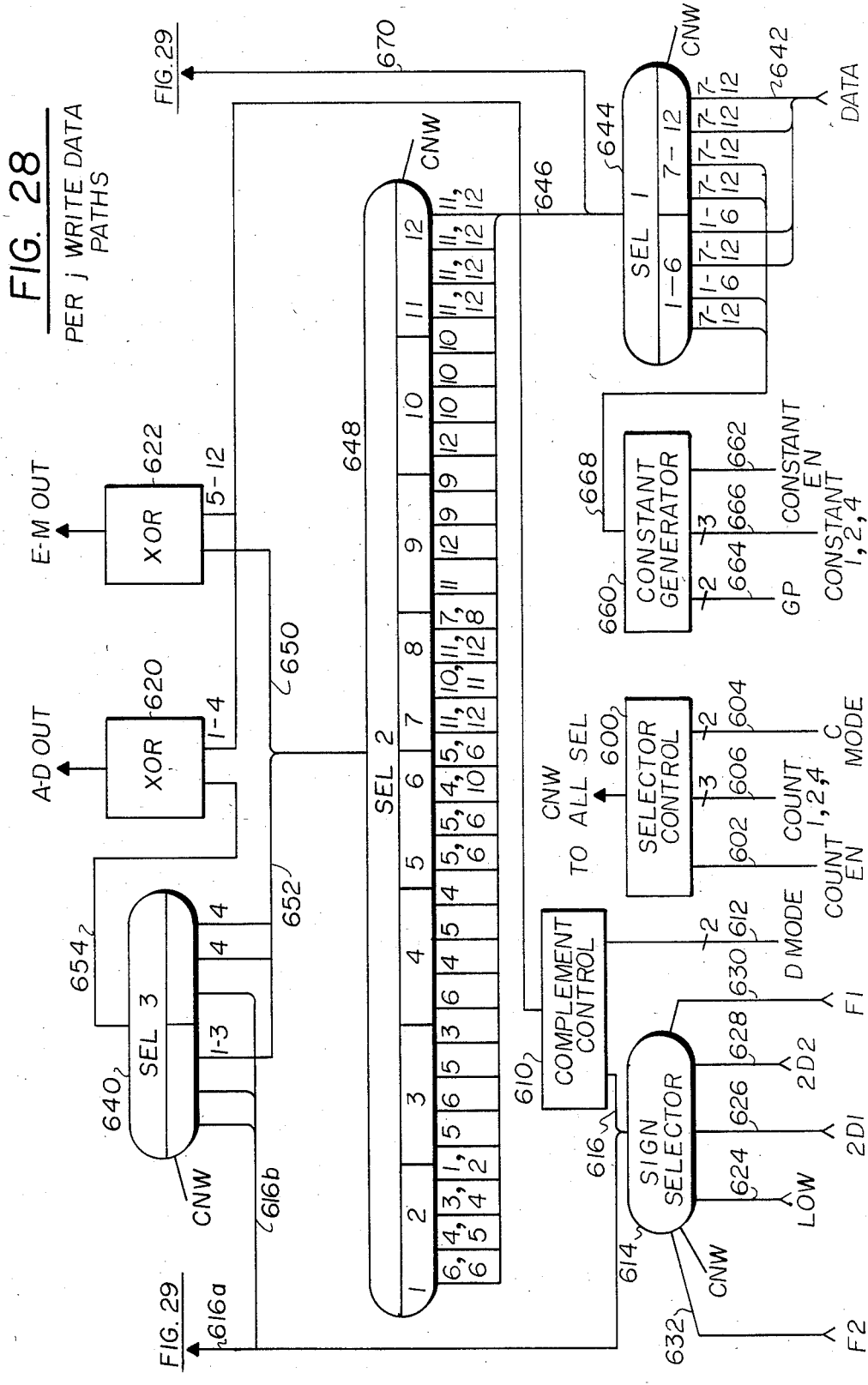
FIG. 28 PER J WRITE DATA PATHS

PER j WRITE CHARACTERISTIC PATH

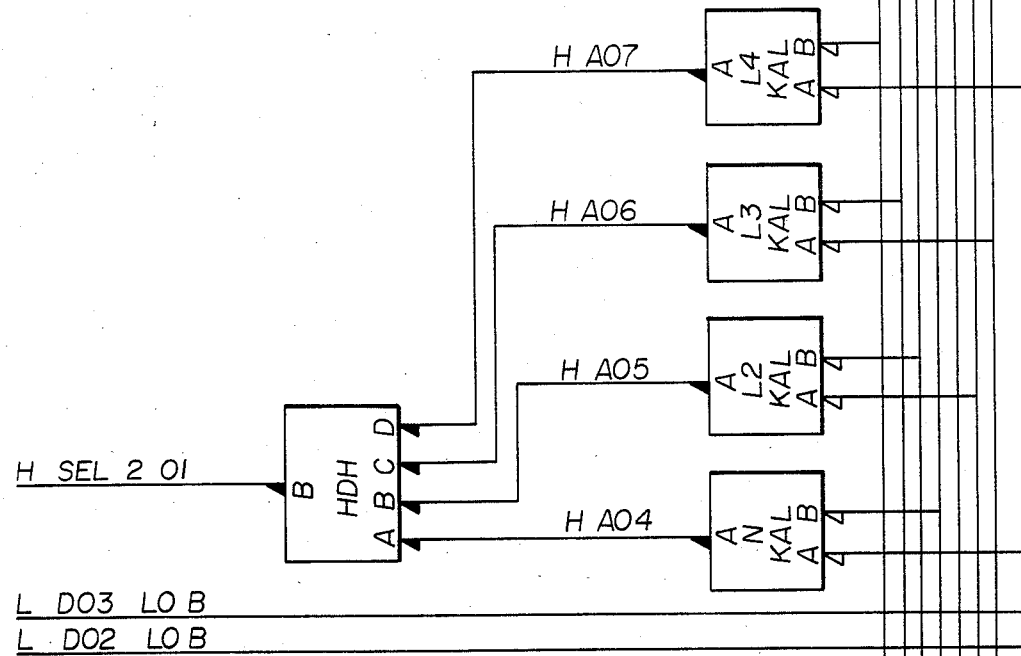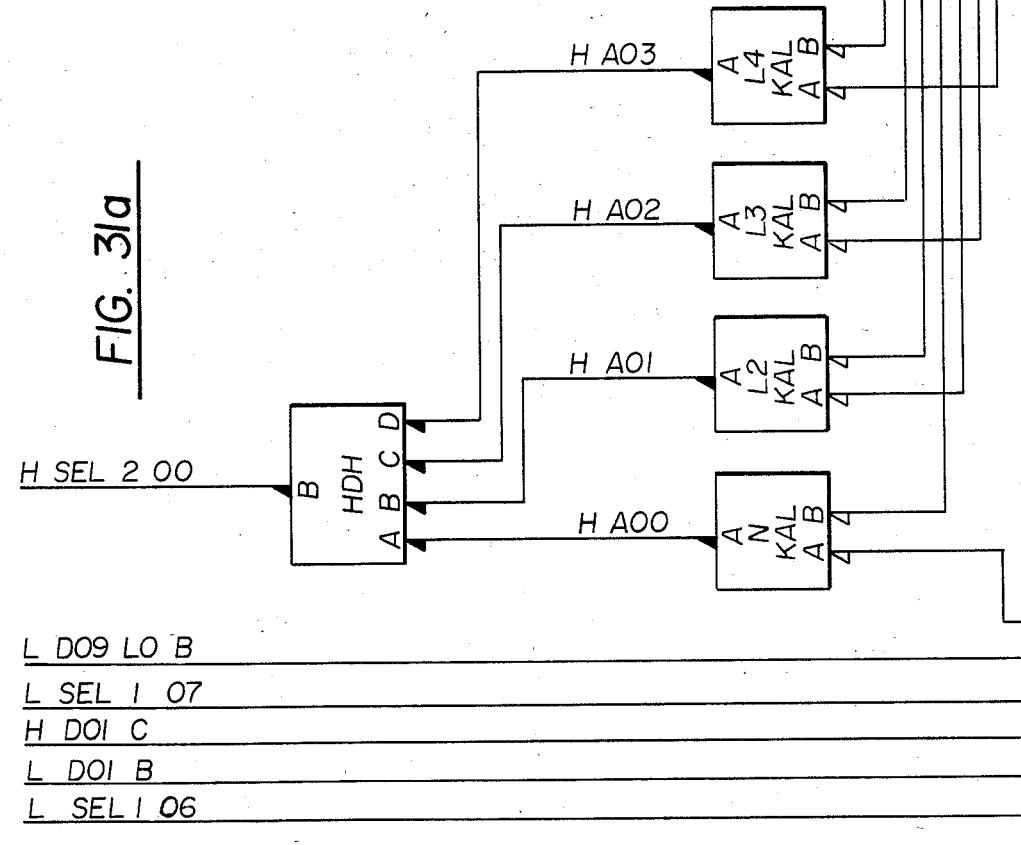
FIG. 3Ia

FIG. 31b

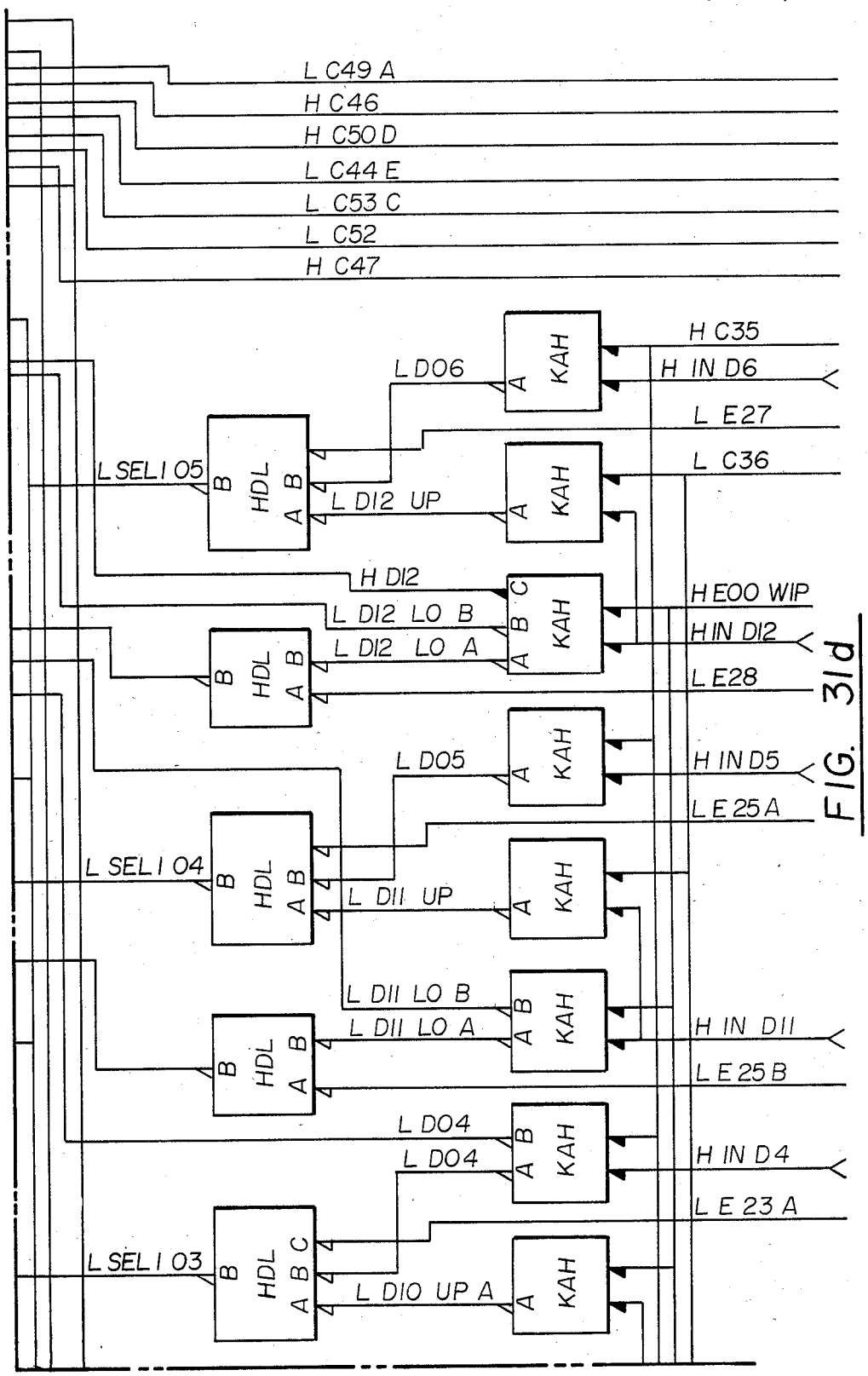

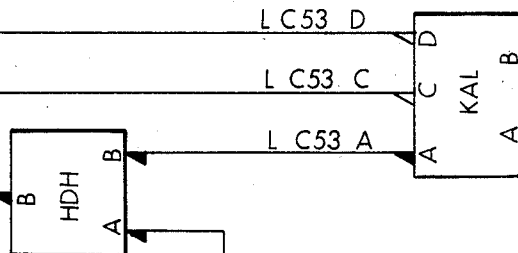
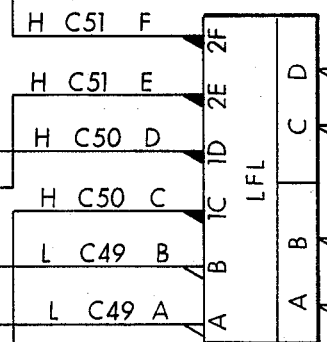
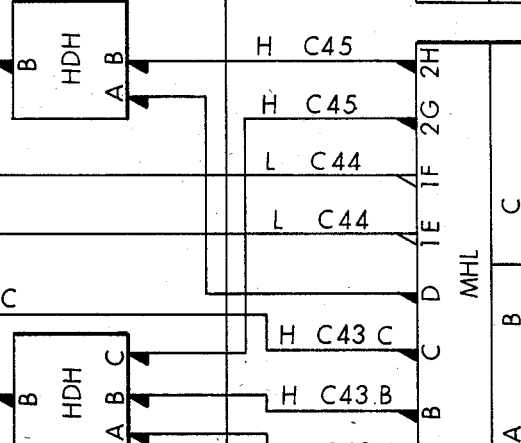
FIG. 37a

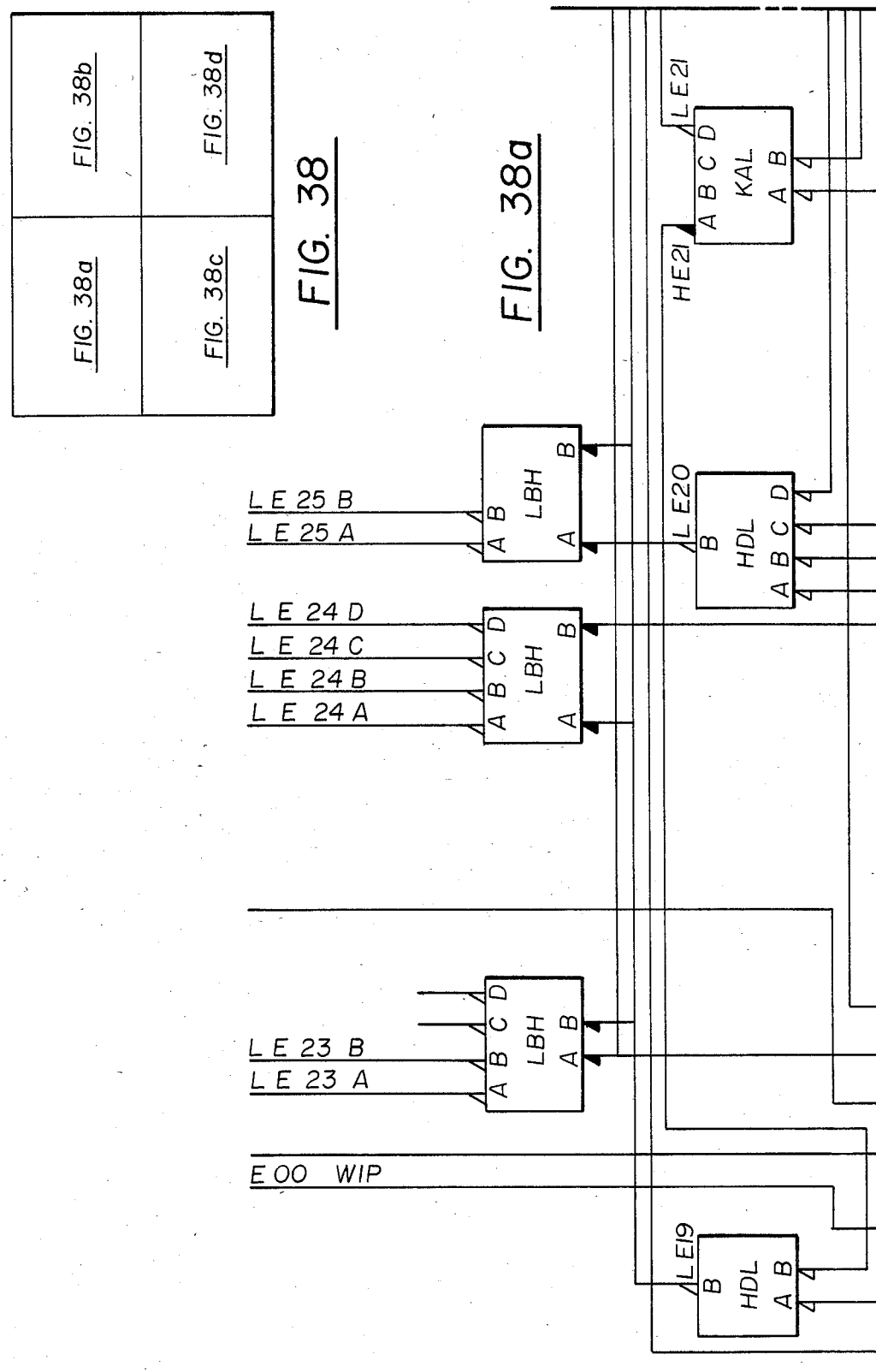

FIG.39a

PER J WRITE

| J (OCTAL) | QUARTER WD DES |
|---|---|
| 0 | 0 OR 1 |
| 1 | 0 OR 1 |
| 2 | 0 OR 1 |
| 3 | 0 OR 1 |
| 4 | 0 |
| 5 | 0 |
| 6 | 0 |
| 7 | 0 |
| 4 | 1 |
| 5 | 1 |
| 6 | 1 |
| 7 | 1 |
| 10 | 0 OR 1 |
| 11 | 0 OR 1 |
| 12 | 0 OR 1 |

PROGRAMMABLE DATA REFORMAT SYSTEM

BACKGROUND OF THE INVENTION

1. Field of the Invention

This invention relates to data processing systems which include computing devices, and more particularly to an improved arithmetic system for providing programmable data reformatting in both fixed and float-point computations.

2. Description of the Prior Art

Many data processing systems provide systems that allow field selection within data words. The operands that result from the field selection are often a fixed fraction of the number of bits that comprise a full data word. For example, in one rather early binary data processing system having a 36-bit data word capacity, the system was arranged for functioning with the full data word, the lower order 18-bits, or the higher ordered 18-bits. More contemporary systems have been designed to function with operands comprising bit fields selected from the data word that, in addition to the one-half word fields, include one-third word selection, and one-quarter word selection. In the prior art data processing systems, these fields of data bits selected from within a particular data word are addressed in a variety of ways for the bit field selection.

In addition to selecting the bit field for use, it is also known to be desirable to position the selected bit field to some predetermined position with respect to the binary point. For example it is common to reposition selected bit fields so that the least significant bit in the selected bit field is aligned with the least significant bit position in a holding register, or as it is applied to an arithmetic operation. In written notation, it is common for the least significant digit to be positioned at the right, with higher ordered significant digits progressing to the left. This system of notation carried over into the arrangement of computing devices. It is common for the least significant digit to be positioned at the right with higher ordered digit positions progressing to the left. For binary data processing systems, this results in the binary point for fixed point arithmetic being considered to be to the right of the least significant digit. In fractional machines, or in floating-point calculation where the mantissa operand is treated as a fraction, it is common for the bit position order to progress from least significant at the right, to most significant at the left, but to provide that the binary point is to the left of the most significant fractional digit. As a part of the field selection process, then, it was recognized to be necessary to align the selected field in some predetermined manner with relationship to the binary point.

Various computational requirements have given rise to the option of sign filling up to a specified word size when fractional word fields are selected. This involves testing the appropriate sign bit position, and filling all unselected bit positions with the representation of the tested sign.

Many computational sequences have the need for presenting various operands in magnitude form. The magnitude is determined by testing the sign of the operand, and if found to be negative, complementing the operand. If the sign indicates the magnitude is positive, it represents the magnitude and is utilized unaltered.

In systems that provide floating-point arithmetic computations, the system must provide the capability of unpacking the floating-point operands, that is, separating the charateristic portion from the mantissa portion. The charateristic is the exponent, and the mantissa is the fractional operand. In the various floating-point operations, at various times it is necessary to provide the capability of sign filling the mantissa, in conjunction with the alignment of the operands. It is also necessary to have the capability of presenting the operands in magnitude form for processing. Of course when the computations are completed, it is necessary to again align and repack the characteristic and mantissa to form the floating-point resultant operand.

The bit capacity of registers in the data processing system often relate to the number of bit positions in the memory registers. Operands in the floating-point format that are contained within the number of bit positions of a memory register capacity are often referred to as single precision floating-point operands. The limitation of the number of bit positions to a single register obviously places limitations on the capacity and precision of the arithmetic manipulations. In order to increase the capacity of the floating-point operands, systems have been developed that utilize two full operands to comprise a single floating-point operand. This effectively doubles the bit capacity, and is commonly referred to as double precision floating-point operation. In the double precision format, the characteristic often times utilizes more bit positions than would be utilized for the single precision format. In computing systems that utilize both single precision and double precision format, systems have been devised for converting floating-point operands between the two systems of representation. For those systems that utilize a different number of bit positions to represent the characteristics between single precision and double precision, it is necessary that the conversion between formats provide for adjustment of the characteristic representation. Further, it is necessary that there be adjustments of the mantissa when the conversion is from double precision to single precision format. It is common to require that the number of characteristic bits be reduced, and that certain bit positions in the mantissa be dropped. During the converse conversion, the number of bit positions of the characteristic is increased, and the additional number of bit positions of the mantissa is made available.

Both the characteristic and mantissa for floating-point arithmetic operations, whether they be single or double precision, may represent positive or negative values. The sign bit referenced represents the sign of the mantissa. To avoid using two separate sign designations, that is, one for the characteristic and one for the mantissa, within the same operand, a system of characteristic biasing has been developed to indicate the sign of the characteristic. For example, a single precision floating-point operand that provides for an 8-bit characteristic, can express numerical values ranging from 0 through octal 377. By arbitrarily applying a bias of octal 200 to the actual characteristic, the zero point is effectively shifted and permits the numerical representation of minus octal 200 through octal 177. In this manner, the value of the characteristic indicates whether it is positive or negative, with those characteristic values having a numerical value of octal 200 or less, representing negative characteristic values. A similar biasing system is applied to double precision characteristics, with the same purpose. For example if an 11-bit characteristic is utilized, a bias of octal 2000 establishes a mid-point with numerical values of octal 2000 or less being of a negative value and characteristic values of more than octal 2000 being a positive value. It can be seen, of course, that when converting between a single and double precision format, the biasing as well as the bit capacity must be adjusted.

In performing conversion from double precision floating-point to single precision floating-point, care must be taken to establish that the magnitude of the double precision characteristic can be expressed in a number of bit positions available in the single precision format. In the event that a double precision floating-point characteristic has a numerical value greater than the upper positive range of the single precision floating-point characteristic, an overflow fault will occur, and an indication of this failure should be provided. Similarly, a double precision floating-point characteristic on the lower extremity of the range that extends beyond the bit capacity of the single precision floating-point operand cannot be accurately converted, and will cause an underflow fault to occur. The characteristic biasing system, the conversion from double precision floating-point to single precision floating-point and for conversion from single precision floating-point to double precision floating-point is described in detail in U.S. Pat. No. 3,389,379 to G. J. Erickson, et al.

It is often necessary to provide constant operands and to select the required format. This can be considered as a part of operand formatting and has usually been accomplished with specialized circuitry.

Prior art systems do not uniformly provide for through checking of accuracy.

The data formatting functions must occur before the actual arithmetic operations can proceed. Accordingly, the data formatting is very time critical, and must be accomplished at the highest rates possible while maintaining accuracy, so that the rate of throughput of data will not be unnecessarily decreased.

The various data formatting operations described have been accomplished by separate circuits and control arrangements with corresponding duplication of circuits in many instances. This has the attendant increase in cost. The separate approaches do not necessarily minimize time of formatting and in many cases do not provide for optimum throughput. The separate circuits used in prior art formatting systems are subject to failure, and the large number of such circuits are a source of degradation of system reliability.

OBJECTS

A primary object of the invention is to provide a high speed programmable data reformatting system for reformatting data presented in one of a plurality of formats to a programmably selected format.

Yet another object of the invention is to provide a data reformatting system utilizing a plurality of multiplexing selectors for reformatting data.

Still another object of the invention is to provide a data reformatting system that will selectively provide data field extraction, and provide complementing, magnitude and negative magnitude generation of reformatted data.

Yet a further object of the invention is to provide a data reformatting system that will unpack floating-point operands by separating the characteristics from the mantissa and having the capability of presenting the characteristic in magnitude form.

Still a further object of the invention is to provide a data reformatting system that automatically adjusts the parity signals for the reformatted data.

Another object of the invention is to provide a data reformatting system for selectively extracting and shifting to designated positions extracted data fields.

Still a further object of the invention is to provide an improved data reformatting system that generates and programmably selects a predetermined set of constants.

Another object of the invention is to provide a high speed data reformatting system having the data signals interleaved to enhance the speed of the reformatting process.

Still another object is to provide a high speed data reformatting system that is advantageously suited to large scale integration manufacturing techniques for economically providing the programmable data reformatting functions.

SUMMARY OF THE INVENTION

The invention comprises a high speed data reformat system that utilizes a plurality of ranks of multiplexing selectors to reformat data from one of a plurality of data formats into programmably selected ones of other data formats. The structure is partitioned into arrays of selectors suitable for fabrication by large scale integration processes. The partitioning is such that when the applied data bits are interleaved in a predetermined manner, each of the arrays of selectors is involved in the reformatting process, and the reformatting time is thereby minimized. Parity bits are associated with bit groupings that match the interleave of data bits to the data reformatter, and through the use of an array of multiplexing selectors similar to that utilized for the data bits, the parity of the re-formatted data is automatically adjusted to be proper.

The data reformatting is accomplished under control of fields specified in the instruction word, where the translation of the instruction function will result in the generation of mode signals, and shifting control signals. The translation of a control field in the instruction word specifies the control signals to be utilized in selecting the fields of data to be extracted or packed, and whether there will be sign filling or zero filling. A second control field is translated for selected instructions to define a constant selected for generation.

The system provides for the extraction of predetermined bit fields, usually in fractions of the data word, and right justifies the extracted field while filling the remaining portion of the output word with zero or sign bits depending upon the instruction. It also allows for extracting a low ordered predetermined field and shifting the extracted field to the corresponding high ordered bit positions and filling all low ordered bit positions withi zeros. Further it provides for extracting the characteristic from a floating-point operand in either of two floating-point formats, together with transferring the mantissa portion of the floating-point operand to output lines with the bit positions formerly occupied by the characteristic bits filled with sign bits. The invention provides all of the foregoing functions but with the resultant bit arrangements complemented at the output.

The invention provides for extraction of a right-justified field from the input data and insertion in a specified field in the output data word. Another function is to extract characteristic bits in either of two possible formats from incoming data and providing them on characteristic output line. The invention also provides of binary zeros, binary ones, plus one, minus one, FIELDATA spaces, FIELDATA zeros, and ASCH spaces and zeros.

BRIEF DESCRIPTION OF THE DRAWINGS

In view of the foregoing described prior art and the summary of the invention, the stated objectives and other more detailed objectives of the invention, will be described and shown in the drawings, and described in the description of a preferred embodiment, when read in conjunction with the accompanying drawings in which:

FIG. 4 illustrates the format of the single precision operand for the embodiment of the subject invention.

FIG. 5 illustrates the format of a double precision operand.

FIG. 8 is a block diagram symbol for the Per j Read LSI chip for handling a 12-bit portion of the input operand.

FIG. 11a is the Per j Read floating-point mode Truth Table illustrating the data output configuration under control of C Mode 2;

FIG. 11b is the Per j Read floating-point mode Truth Table illustrating the characteristic output combinations;

FIG. 12c defines the selector control conditions for Per j Read data selector;

FIG. 12d defines the control conditions utilized for the Characteristic Selector, the Sign Selector, the control of Complementing and the Characteristic Output and Data Output Selectors for Per j Read;

FIG. 14 is an illustrative logic program of a multiplexing selector;

FIG. 16a through FIG. 16d, when arranged as shown in FIG. 16, is a logic diagram of the Per j Read Selector Control;

FIG. 20a through FIG. 20e, when arranged as shown in FIG. 20, is the Per j Read Bit Matrix illustrating the bit output configuration for each of the four LSI chips for the j-field and C Mode selection;

FIG. 21 is a matrix representation of the bit output configuration for the Per j Read Network in the floating-point mode for the C Mode selections;

FIG. 23 is a block diagram symbol for the Per j Write for handling a 12-bit portion of the input operand;

FIG. 25 is a Truth Table that illustrates the data reformatting configurations for the combinations of the j-field count, the C Mode selections, the D Mode selections, and the Count Enable for the Per j Write Network;

FIG. 26 is a Truth Table for the Constant Generator utilized in the Per j Write Network;

FIG. 27 is the Truth Table illustrating the functioning of the Per j Write Network in the floating-point mode;

FIG. 28 is a logic diagram of the data selection paths of the Per j Write circuit illustrated in FIG. 23;

FIG. 30 defines the input conditions for selection enable conditions to the selector control circuitry for the Per j Write circuit.

Figure 36:
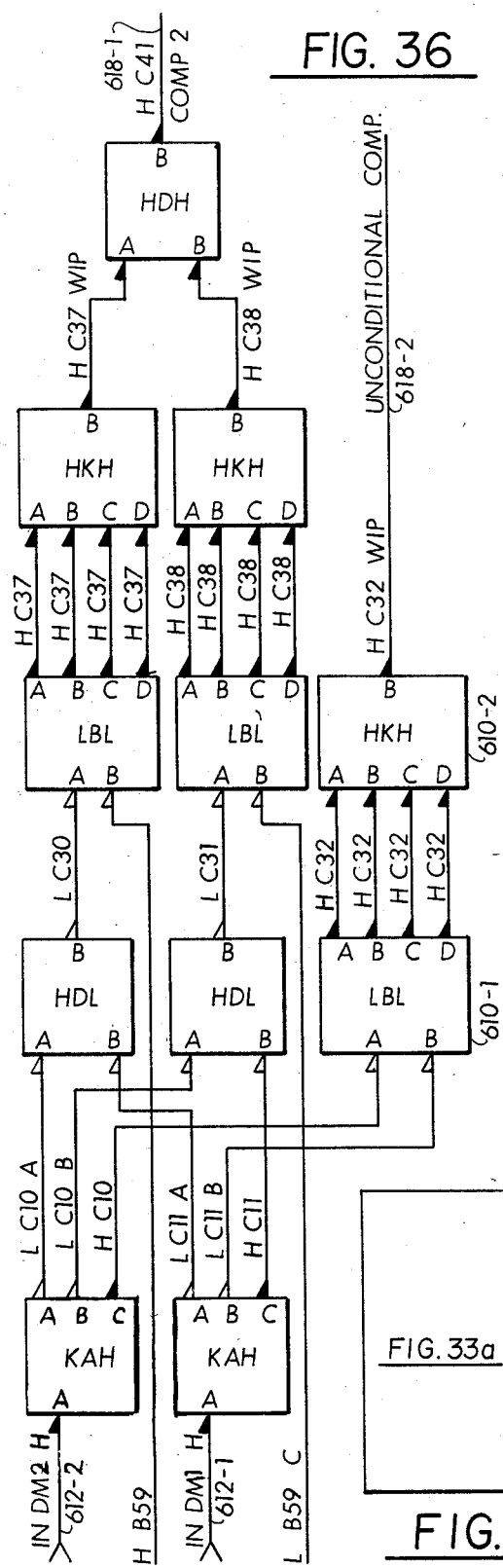
Figure 39:
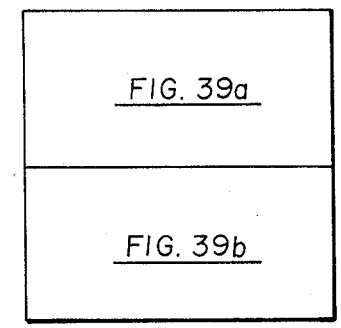
Figure 37:
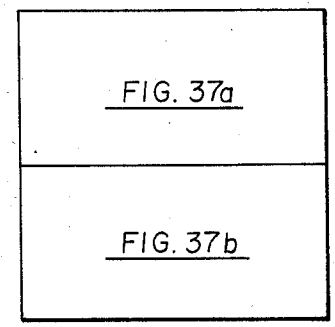
Figure 33:
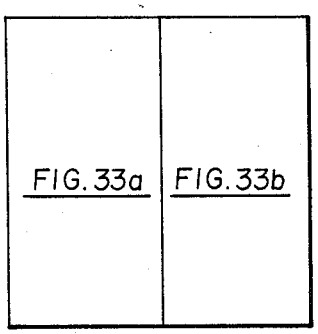
Figures 19A, 39B:
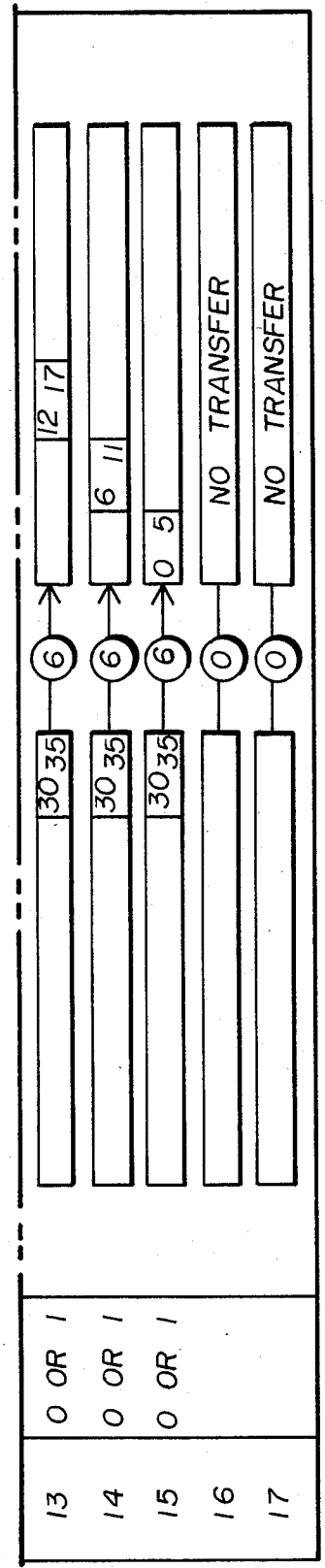
Figure 31:
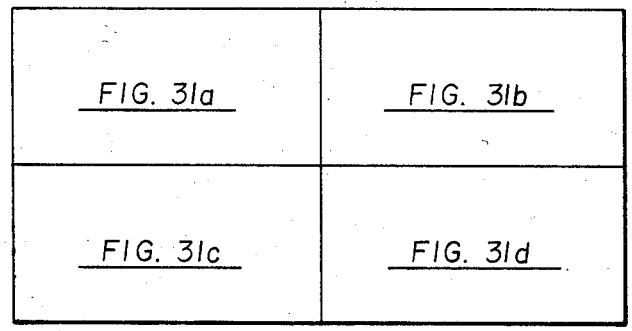
Figure 31B:
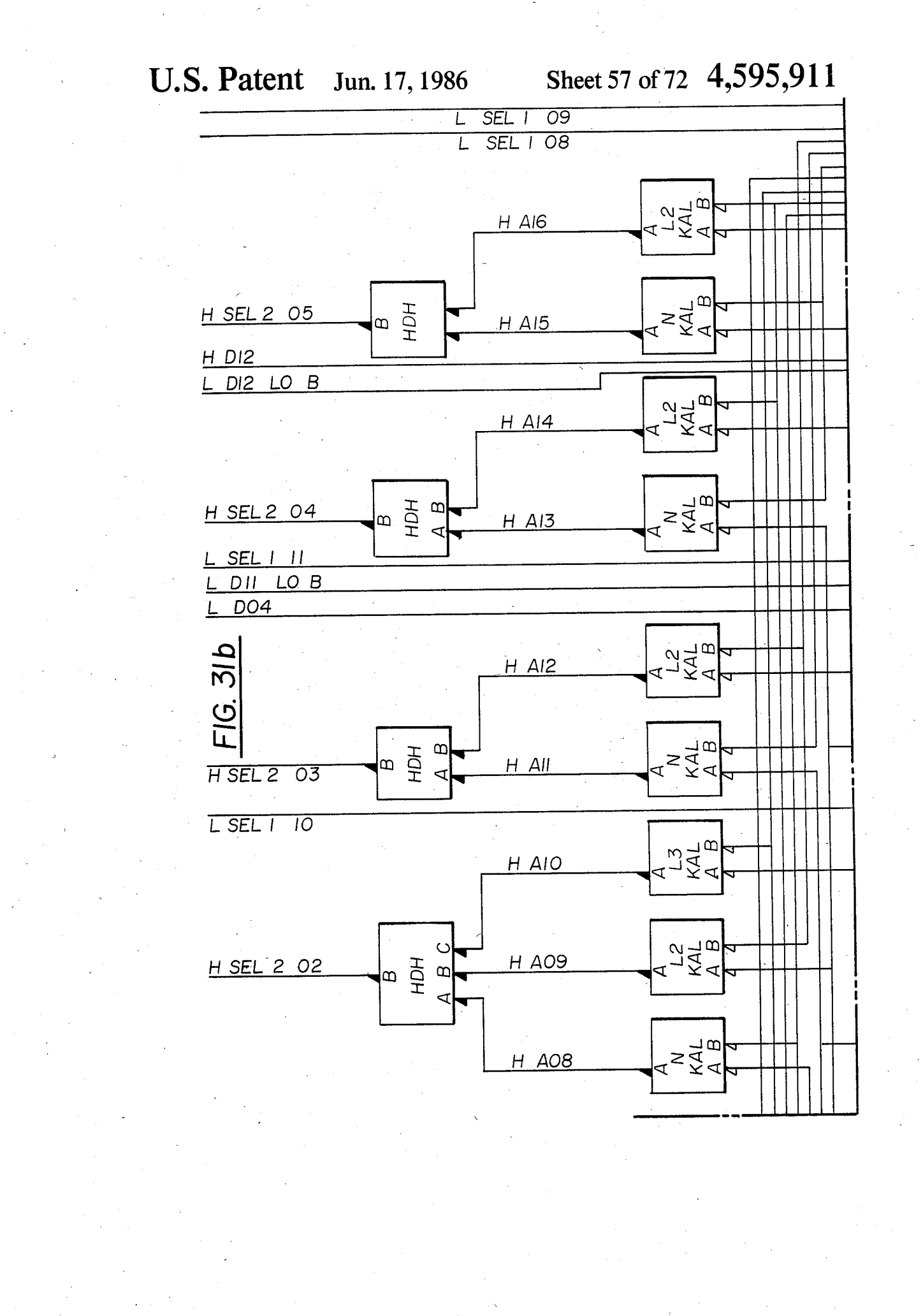
Figures 32, 32B:
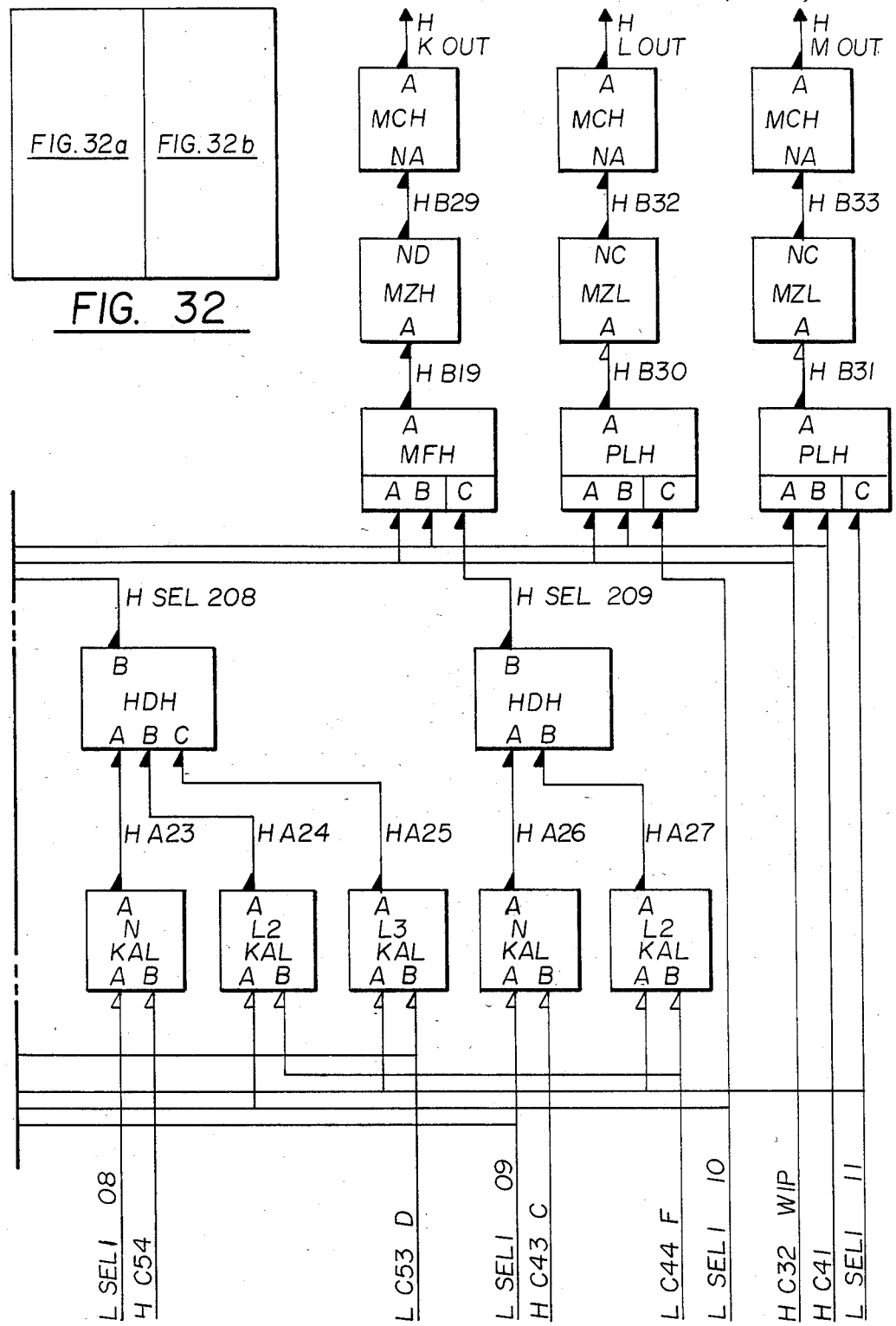
Figure 34:
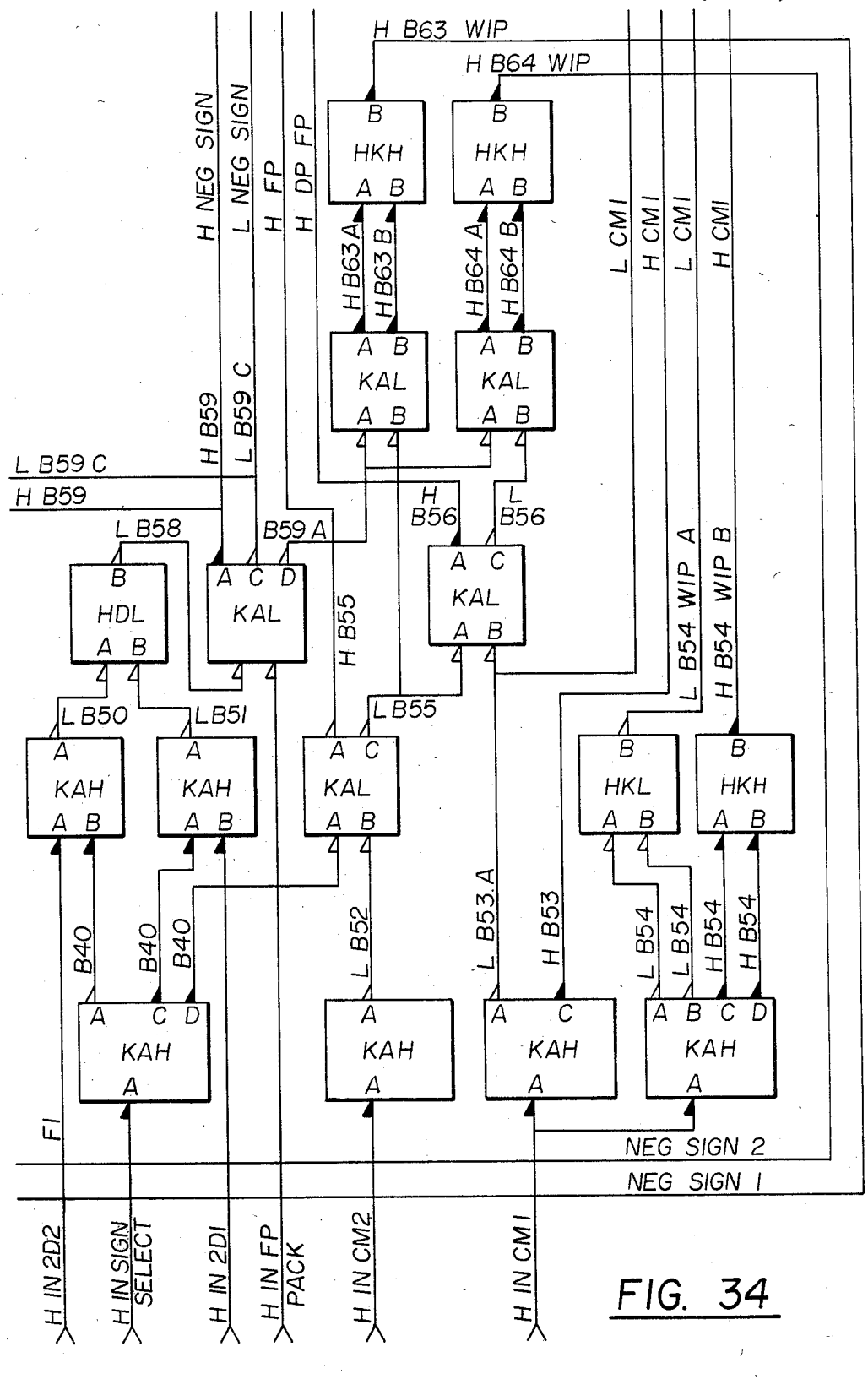
Figure 35:
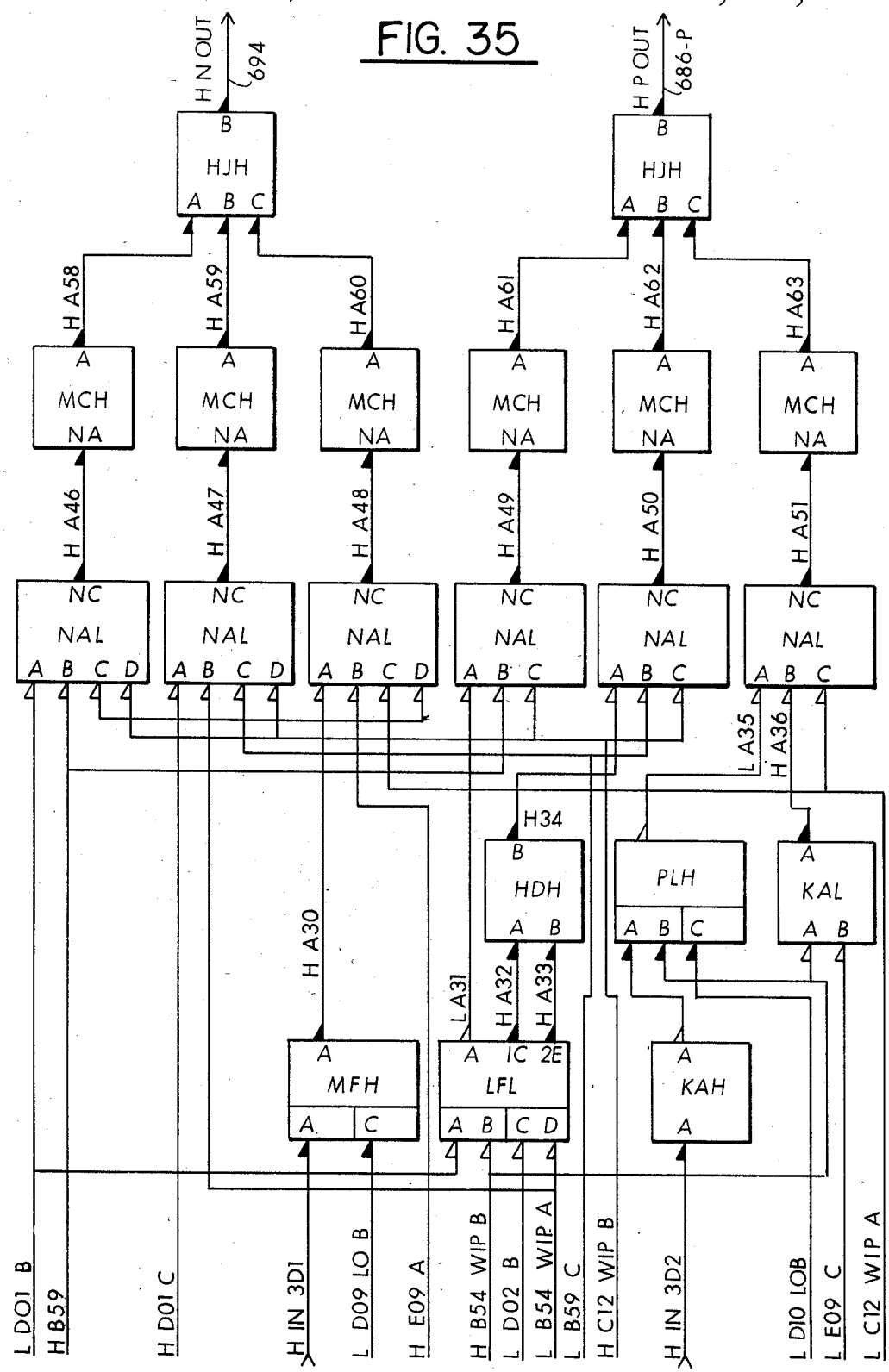
Figure 37B:
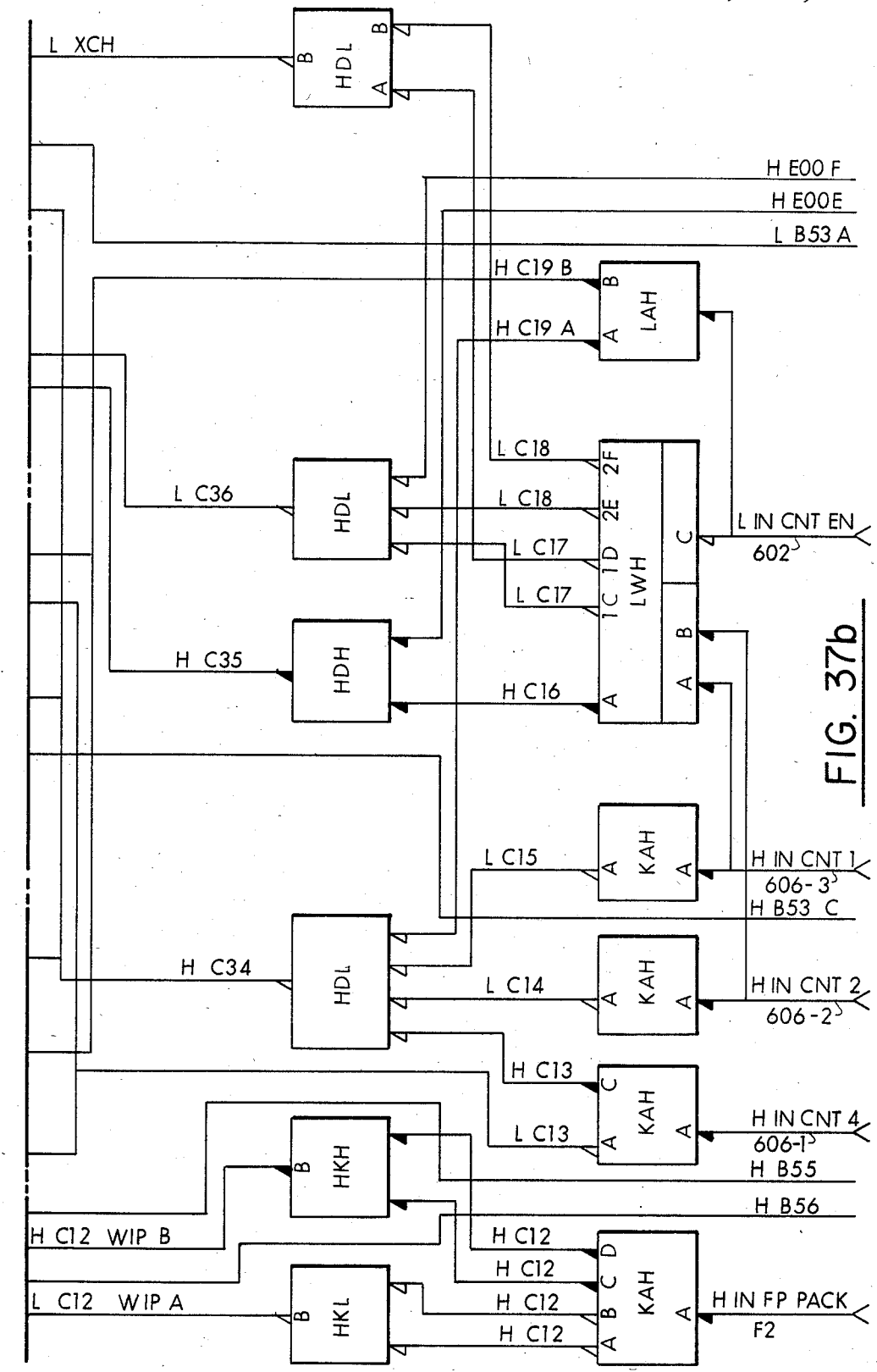
Figure 38B:
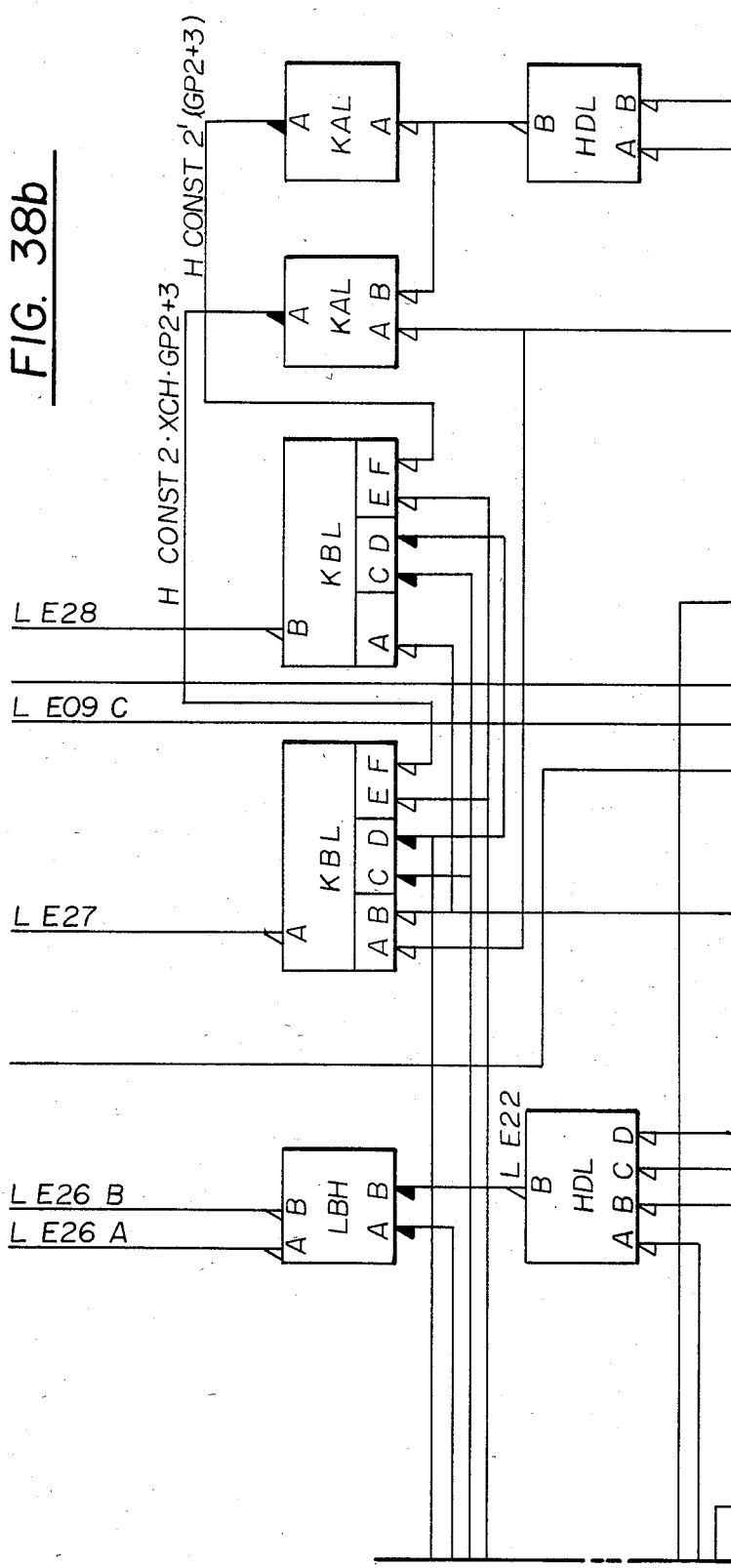
Figure 38C:
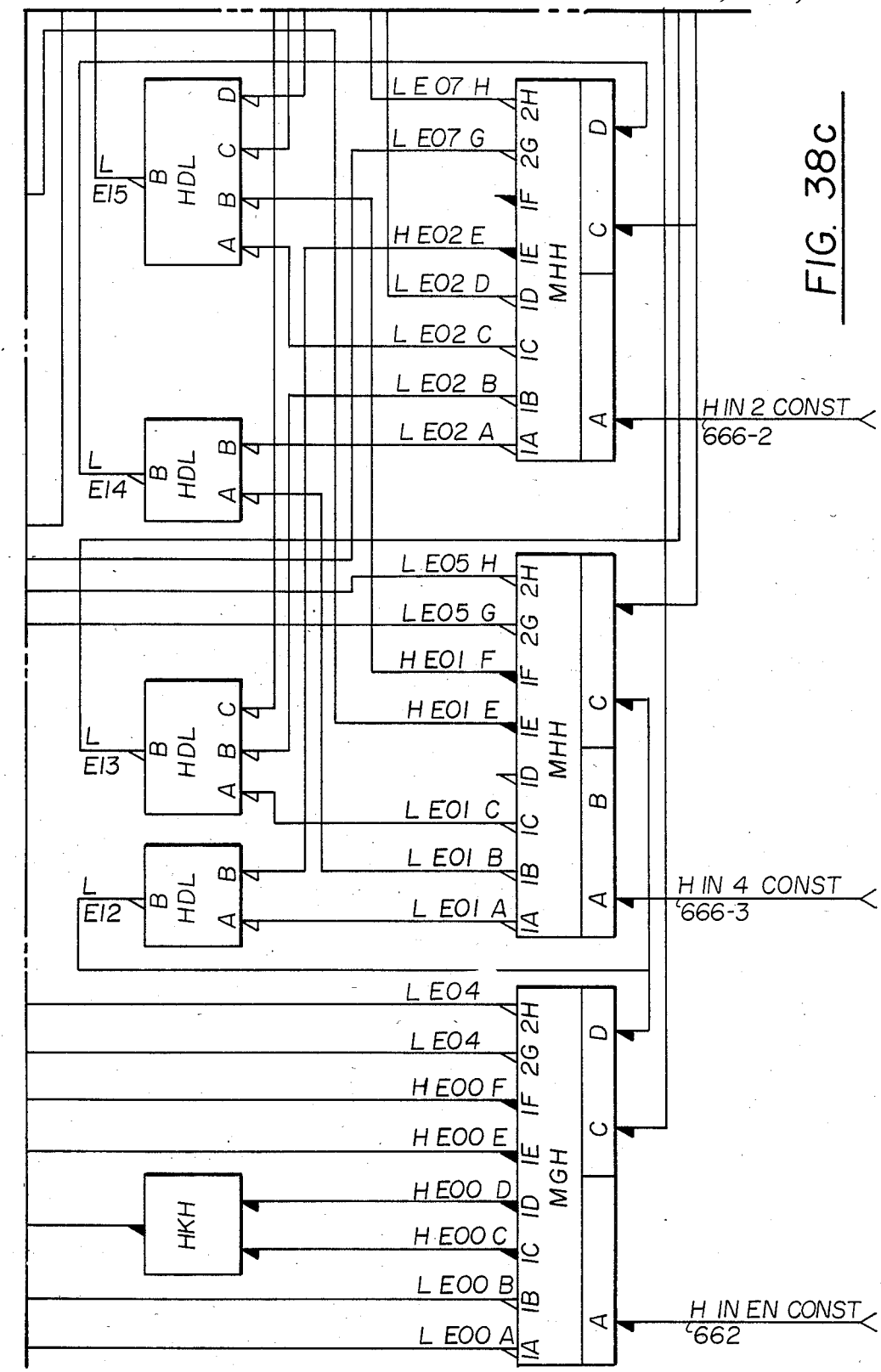
Figure 38D:
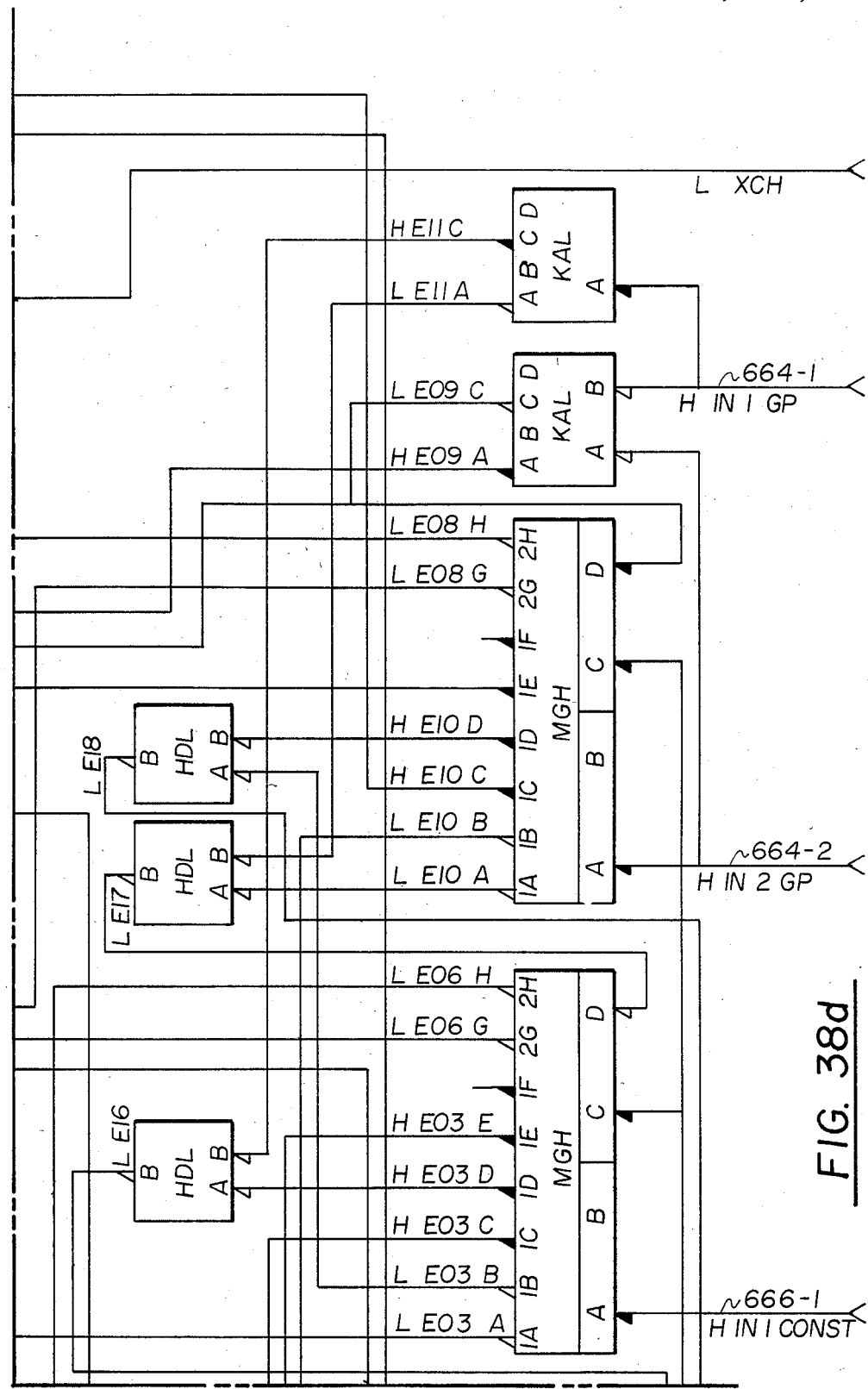

The detail logical arrangement of the Per j Write Network is illustrated in FIGS. 31 through 38 collectively, which must be considered together for a complete understanding of the circuit operations, in which FIG. 31a through FIG. 31d, when the arranged as shown in FIG. 31, is a logic circuit diagram of the SEL 1 and a portion of SEL 2 illustrated in FIG. 28, FIG. 32a through FIG. 32c, when arranged as shown in FIG. 32, is a logic circuit diagram of a portion of the SEL 2 circuitry and illustrates output terminal selections for a portion of the data terminals, FIG. 33a through FIG. 33d, when arranged as shown in FIG. 33, is a logic circuit diagram of the SEL 3 circuitry, and illustrates the selection of four specified output terminals, FIG. 34a and FIG. 34b, when arranged as shown in FIG. 34, is a logic circuit diagram of a sign selector for the Per j Write circuit, FIG. 35a and FIG. 35b, when arranged as shown in FIG. 35, is a logic circuit diagram of combinatorial logic circuits and illustrates output determination for specified output terminals, FIG. 36a and FIG. 36b, when arranged as shown in FIG. 36, is a logic block diagram of the complement control circuitry, FIG. 37a and FIG. 37b, when arranged as shown in FIG. 37, is a logic block diagram of the circuitry that translates the j-field count and the floating-point packing operation, and FIG. 38a through FIG. 38d, when arranged as shown in FIG. 38, is a logic block diagram of the constant generator;

FIG. 39 illustrates the plurality of arithmetic register fields of data signals that are right justified and reformatted by the indicated j-field count and the described control signals;

FIG. 40a and FIG. 40b are Per j Write Matrix layouts illustrating the bit output configuration for each of the four LSI circuits for the j-field and the C Mode selections.

DESCRIPTION OF THE PREFFERED EMBODIMENT

DATA PROCESSING SYSTEM

Figure 1:
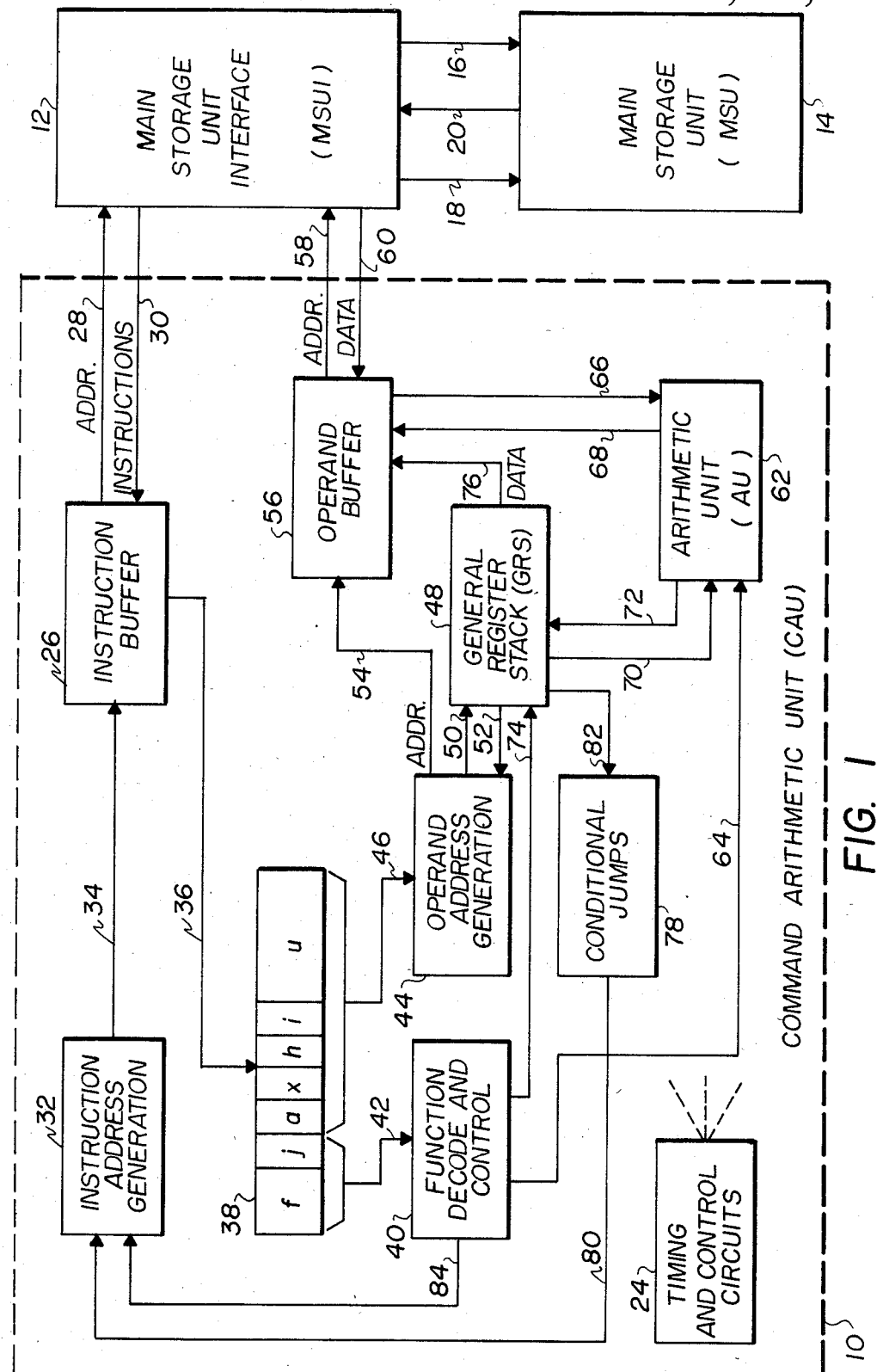
FIG. 1 is a simplified functional diagram of a data processing system which incorporates the subject invention and illustrates the functional relationship of the various data processing components and controls.

FIG. 1 is a simplified functional diagram of a data processing system which incorporates the subject invention and illustrates the functional relationship of the various data processing components and controls. The system utilizes a Command Arithmetic Unit 10, hereinafter referred to as CAU, and Main Storage United Interface 12, hereinafter referred to as MSUI, and a Main Storage Unit 14, hereinafter referred to MSU. The lines with arrowheads indicate direction of flow of data or flow of control. MSU 14 is a large scale memory having addressable memory registers in which data words can be stored and from which data words can be read. The MSU 14 stores instruction words which are utilized to direct and control the operation of the data processing system, and data words which are the subject of or result of operations of the data processing system, both of which are referred to as operands. MSU 14 can be selected from any of the types of addressable storage devices available commercially, it being understood that the requirement be that the specification of an Address and a Write control on line 16 will result in addressing the specified memory address and providing the recording of the operand received on line 18. The specification of a memory Address and a Read function on line 16 will result in the contents of the specified memory register being read and supplied on line 20. The MSUI 12 operates as the clearing house for all data transfers to and from MSU 14. The system illustrated is shown in simplified form, it being understood that MSUI 12 can accommodate more than one CAU 10, as well as various other input/output devices not shown. The memory referencing is such that instructions and data words are both capable of being stored in MSU and referenced therefrom. The actual memory addressing and accessing systems do not aid in an understanding of the invention, and are described in general terms only to provide an environment in which the invention functions. Similarly, the MSUI detailed functioning and handling of requests and responses is not deemed necessary to an understanding of the invention.

The Command Arithmetic Unit 10 includes a Timing and Control 24 that operates to direct all functional sections, including interpreting instructions and directing the various computational tasks to be performed by the directed functional units. Instructions are stored in the Instruction Buffer 26 where a plurality of individual instructions are stored for sequential or directed execution. Instructions are obtained from the MSU via MSUI by sending an address on line 28 which results in a grouping of instructions to be read from the MSU and returned to the Instruction Buffer over line 30. The address of instructions to be generated are derived through the Instruction Address Generation circuitry 32 which includes a register for storing the next instruction address. The address of the instruction is directed on line 34 to the Instruction Buffer 26 where it is translated and the selected instruction is read on line 36 to the Instruction Register 38. The Instruction Address Generation circuitry 32 includes a means for automatically advancing the address of the instruction to the next seqential address which will be operative. The next instruction will be selected upon completion of the present instruction provided there are no jump conditions that occur during the execution of the present instruction. Function Decode and Control 40 utilizes a portion of the signals stored in the Instruction Register 38, as received on line 42, and operates to generate the signals necessary to properly execute the instruction. The Operand Address Generation circuitry 44 is coupled to a portion of the Instruction Register 38 by line 46, and operates to form an absolute address of the operand from the address designation, and address indexing designations specified in the instruction. The General Register Stack (GRS) 48 consists of a plurality of multiple-bit registers to provide fast internal storage to the CAU, and is divided into an odd address and even address structure to allow simultaneous referencing of double word lengths to provide for the accommodation of double precision instructions. The Operand Address Generation circuitry 44 directs requests to the GRS over line 50, and receives information on line 52. Once the absolute address is generated, it is transmitted on line 54 Operand Buffer 56. The Address is transmitted on line 58 to the MSUI for obtaining the requested operand from the MSU, which in turn transmits it back over line 60 to the Operand Buffer 56. It should be noted, that the Operand Buffer 56 operates to transfer blocks of data to minimize the needs of number of access to the MSU, the details of the block transfers not being set forth since they do not add to an understanding of the invention. The Arithmetic Unit (AU) 62 functions to perform the various arithmetic operations specified by the instructions. The system for handling of floating-point calculations and the improved data reformatting system are encompassed within the AU. The Function Decode and Control 40 provides control signals on line 64 to the AU, and the operands are provided from the Operand Buffer 56 on line 66. Results of the arithmetic operations are transmitted on line 68 to the Operand Buffer. The AU also receives input data from the GRS 48 on line 70, and provides selection signals on line 74 to the GRS. The GRS 48 also is capable of transmitting data on line 76 to the Operand Buffer 56 where it is available for storage in the MSU. The CAU also functions to test for jump conditions through the use of Conditional Jumps circuitry 78, which provides signals on line 80 for altering the instruction address sequence in response to the satisfaction of tested jump conditions. The Conditional Jump circuitry 78 receives input signals from GRS on line 82 which are utilized in the jump evaluation. Once an arithmetic operation has been completed, and in the absence of a conditional jump situation, the Function Decode and Control 40 provides signals on line 84 indicating the completion of the instruction and generating the initiation of the next instruction address.

The Arithmetic Unit 62 includes a one's complement subtractive adder that is capable of segmented adds, a plurality of addressable Accumulators for storing operands and intermediate results of arithmetic computation, a high speed shift matrix, a multiplier for fixed or floating-point multiplication, and circuitry for performing single or double precision floating-point arithmetic.

INSTRUCTION WORD FIELDS

Figure 2:
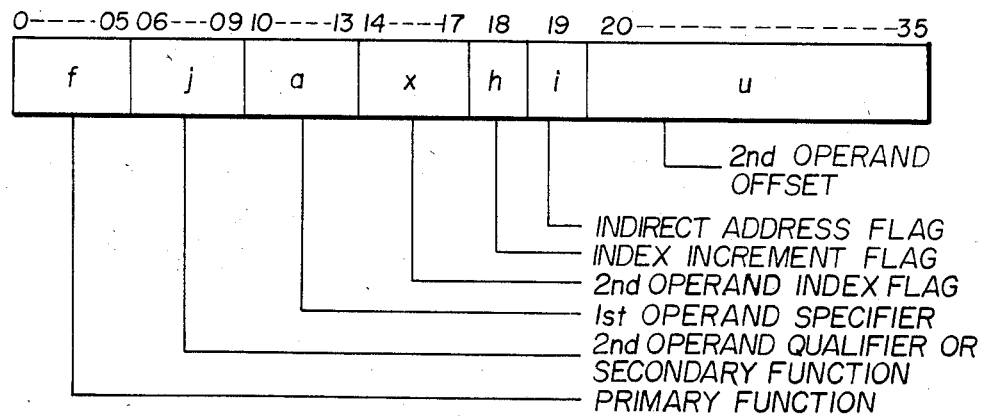
FIG. 2 illustrates the format of the instruction word for the embodiment of the data processing system which incorporates the subject invention.

FIG. 2 illustrates the format of the instruction word for the embodiment of the data processing system which incorporates the subject invention. The instruction word utilizes 36-bits organized into several distinct parts of designators. The various field and designators will be discussed in order starting from the left and proceeding to the right-most end of the instruction word. The f-field represents the function code of the command operation to be performed by the computer. Illustratively, the f-field may hold the bit combination for dictating that the computer should perform an add operation, a jump operation, a floating-point instruction, and the like. The function code for the most instructions utilizes 6-bits; however, for certain operations, the j-field is also combined as part of the function code. This expands the capacity to distinquish between the specific operations.

The j-field is 4-bits and it utilizes this control as the partial word transfer designator, and functions as a primary control for the subject invention. In its normal operation, the j-field determines whether an entire data word or only a specified part of the data word is to be transferred to or from the CAU. As previously mentioned, in certain instructions, the j-field serves as an additional part of the function code designator. When the j-field is utilized in its normal function, it specifies which half-word, third-word, quarter word or sixth-word is to be used. When reading from the MSU, the transfer is always into the least significant position of the register in the CAU. In transfers from the CAU, the j-field specifies to which word, half-word, third-word, quarter-word, or sixth-word, the least significant portion of the word to be transferred from the CAU will be made. Bit positions within the specified address in MSU which are not involved in the transfer are not changed. For various combinations of sign extension or lack of the j-field, the u-field of the instruction becomes the effective operand rather than the address of the operand as is the normal case.

The a-field is 4-bits and is termed the A register designator. These special registers are addressable locations within the CAU in the GRS. Other operations concerned with the a-field are not relevant to the subject invention except for the Store Constant instruction where the a-field specifies a Constant Value.

The x-field is 4-bits and is used to reference any one of the index registers that are contained in the GRS. When the modification of the u-field is specified, the index registers are referred to as X registers. When the x-field is set to zero, modification to the u-field will not take place. If the x-field is coded with a numerical value, the corresponding Register is referenced and its contents are added to the u-field to form the effective address. The formation of the absolute address may also involve the use of further base address addressing, and will not be described in detail.

The h-field is 1-bit and is termed the incrementation designator.

The i-field is 1-bit and is used for indirect addressing.

The u-field is 18-bits and is used in operand addressing, or as an operand, depending on the selections made in the other fields.

OPERAND FORMAT

Figure 3:
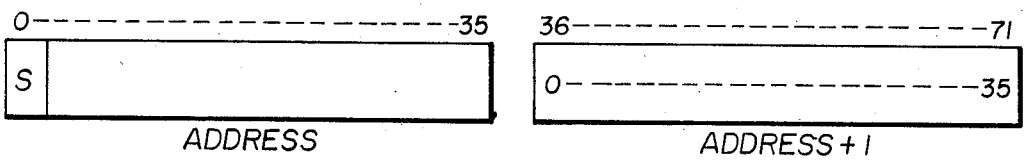
FIG. 3 represents the form of operands used in full-word arithmetic operations.

FIG. 3 represents the form of operands used in full-word arithmetic operations. For this embodiment, the single precision data operand is comprised of 36-bits, numbered 00 through 35 commencing from the most significant bit position and progressing to the least significant bit position. The 0-bit position is a sign of the data word, with a zero representing a positive value, and a one representing a negative value. For positive values, one's in the remaining bit positions are significant in the determination of the numerical value. If the sign bit contains a one, the negative word exists, and zeros in the remaining bit positions represent significant data. The preferred embodiment that incorporates the subject invention utilizes a one's complement for performing binary arithmetic. As is well-known, the one's complement of a binary number is formed by changing all ones in the word to zeros and changing all zeros in the word to ones. An arithmetic data word of positive value when complemented, becomes the negative value of the word; and, a negative value when complemented, becomes the positive value of the word. The absolute value of an arithmetic number is the numerical value of the number regardless of sign. A double precision data word is generated by considering two words of 36-bits each as a single operand. The most significant portion of the double precision word is located at an address, and the least significant half of the data word is located at the address plus one. When operating as double precision operands, the bits are considered sequentially from 00 to 71.

In the processor illustrated and described in FIG. 1, a positive mantissa, that is the numerical value of the data, is always considered to be a fraction. When normalized, the leading bit of the mantissa is equal to one and the value of a positive mantissa will always fall between one and one-half inclusive. A negative mantissa is normalized when the leading bit is equal to zero, and the value of a negative mantissa will always fall between the value of one and one-half inclusive. As mentioned above, the arithmetic system is capable of operating on two forms of floating-point operands, that is, single precision and double precision. Single precision instructions produce double precision results, i.e., an operand of twice the capacity of the standard AU register length. Double precision arithmetic instructions also produce double precision or double length results.

FIG. 4 illustrates the format of the single precision operand for the embodiment of the subject invention. The single precision mantissa S-M is 27-bits and is stored in register bit position 9 through 35. The single precision characteristic S-C is 8-bits and resides in a storage register bits 1 through 9. The sign S resides in bit position zero. The mantissa S-M is the numerical value of the data, and is always considered to be a fraction. The characteristic S-C is not the exponent of the mantissa; but, instead, is the exponent of the numerical base.

FIG. 5 illustrates the format of a double precision operation. Two full registers are utilized to store the double precision operand. A single precision operand is illustratively shown as 36-bits and the double precision operand requires 72-bits to completely define it. The least significant portion of the double precision mantissa D-M is stored in the 36-bits which are designated as the address +1. The most significant portion of double precision mantissa D-M are stored in the twenty-four lower ordered bit positions of the designated address. The composite portion of the address and the entire address +1 results in a 60-bit double precision mantissa. The double precision characteristic D-C is 11-bits in capacity and resides in bit positions 1 through 11 of the address. The sign of the mantissa S is located in the highest ordered bit position of the address.

Both the characteristic and mantissa for floating-point arithmetic operations, whether they be single or double precision, may represent positive or negative values. The sign bit S denotes the sign of the mantissa, and will be described in more detail below. To avoid using two separate signs, that is, one for the characteristics and one for the mantissa, within the same word, a system of characteristic biasing is employed to indicate the sign of the characteristic.

For single precision, this consists of adding to the true or unbiased characteristic the bias value of 128 ($200_8$). The 8-bit characteristic permits a range of $-128$ to $+127$ ($-200_8$ to $+177_8$). To illustrate the principles involved, the value $0.75_{10} \times 2^3$ is presented with all possible combination of signs.

| Single Precision: | | | | | |
|---|---|---|---|---|---|
| 1. | $.75 \times 2^3$ | $.75 \times 2^3$ (unbiased) | = | 003 | 600 000 000$_8$ |
|   |   | Bias | = | 200 |   |
| 2. | $-.75 \times 2^3$ | $.75 \times 2^3$ | = | 203 | 600 000 000$_8$ |
|   |   | $.75 \times 2^3$ (unbiased) | = | 003 | 600 000 000$_8$ |
|   |   | Bias | = | 200 |   |
| 3. | $.75 \times 2^{-3}$ | $.75 \times 2^3$ | = | 203 | 600 000 000$_8$ |
|   |   | One's Complement |   |   |   |
|   |   | $-.75 \times 2^3$ | = | 574 | 177 777 777$_8$ |
|   |   | $.75 \times 2^{-3}$ (unbiased) | = | (−3) | 600 000 000$_8$ |
|   |   | Bias | = | 200 |   |
| 4. | $-.75 \times 2^{-3}$ | $.75 \times 2^{-3}$ | = | 175 | 600 000 000$_8$ |
|   |   | $.75 \times 2^{-3}$ (unbiased) | = | (−3) | 600 000 000$_8$ |
|   |   | Bias | = | 200 |   |
|   |   | $.75 \times 2^3$ | = | 175 | 600 000 000$_8$ |
|   |   | One's Complement |   |   |   |
|   |   | $.75 \times 2^3$ | = | 602 | 177 777 777$_8$ |

For double precision, the true or unbiased characteristic is added to a bias value of 1024, ($2000_8$). The 11-bit characteristic permits range of values of $0000_8$ to $3777_8$.

The double precision examples of the sign combinations for $0.75 \times 2^3$ with bias added are as follows:

| Double precision: | | | | | | | | | |
|---|---|---|---|---|---|---|---|---|---|
| 1. | $.75 \times 2^3$ | | = | 2003 | 60 | 000 | 000 | 000 | 000 000 000$_8$ |
| 2. | $-.75 \times 2^3$ | | | 2003 | 60 | 000 | 000 | 000 | 000 000 000$_8$ |
|   | | One's Complement | | | | | | | |
|   | | $-.75 \times 2^3$ | = | 5774 | 17 | 777 | 777 | 777 | 777 777 777$_8$ |
| 3. | $.75 \times 2^{-3}$ | | = | 1775 | 60 | 000 | 000 | 000 | 000 000 000$_8$ |
| 4. | $-.75 \times 2^{-3}$ | | | 1775 | 60 | 000 | 000 | 000 | 000 000 000$_8$ |
|   | | One's Complement | | | | | | | |
|   | | $-.75 \times 2^{-3}$ | = | 6002 | 17 | 777 | 777 | 777 | 777 777 777$_8$ |

The foregoing illustrated biasing of the single precision and double precision characteristics allows negative or positive excursions from the median bias value. This biasing system permits the direct addition or subtraction of the mantissa and characteristics of two floating-point operands and permits the negative of a given positive value to be formed by calculating the one's complement value for the positive operand.

When the single precision operand is unpacked for manipulation, the characteristic S-C is taken in its magnitude form and shifted right three places so that it can be manipulated in the 12-bit characteristic adder. In this shifting process, bit positions 0 through 3 are filled to zeros. The sign of S of the single precision word is filled into bit positions 0 through 8 and combined with the mantissa S-M as an operand ready for consideration by the AU. When a single precision operand is to be packed, that is to be recombined, after a floating-point operation, the 8-bit characteristic is utlized in its magnitude form for positive mantissas, and is left-shifted three places to bit positions 1 through 8 of the resultant of floating-point word. The sign S of the resultant calculation is transmitted to the 0-bit position, and the bit positions 9 through 35 of the result of the calculation are packed into bit positions 9 through 35 of the resultant floating-point word. If the sign S of the resultant mantissa is negative, the characteristic is subjected to a one's complement operation before being shifted and packed into the resultant floating-point word. Referring again to FIG. 5, the double precision floating-point operand is unpacked by transferring the magnitude value of the characteristic D-C in direct alignment for use with the characteristic adder. The sign S is filled in bit positions 0 through 11 and combined with bit positions 12 through 35 of the address word. The least significant half of the double precision operand is derived from the address +1 and is transferred directly as bit positions 36 through 71. The packing process proceeds similarly to that described with regard to the single precision floating-point operands, with the characteristic being transferred in magnitude form to bit positions 1 through 11 for positive mantissa values. Again, if the mantissa has a negative value, the characteristic is subjected to a one's complement operation prior to being transmitted to bit positions 1 through 11. The sign S of the mantissa is transferred to bit position 0, and the values of bit positions 12 through 35 are transferred directly to bit positions 12 through 35 of the address word. Bit positions 36 through 71 are transferred to the address +1 word.

ARITHMETIC UNIT

Figure 6:
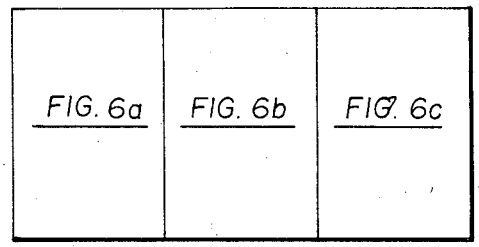
FIG. 6a through FIG. 6c, when arranged as shown in FIG. 6, comprise a block diagram of the portion of the Arithmetic Unit that is utilized in the floating-point arithmetic operations.
Figure 6A:
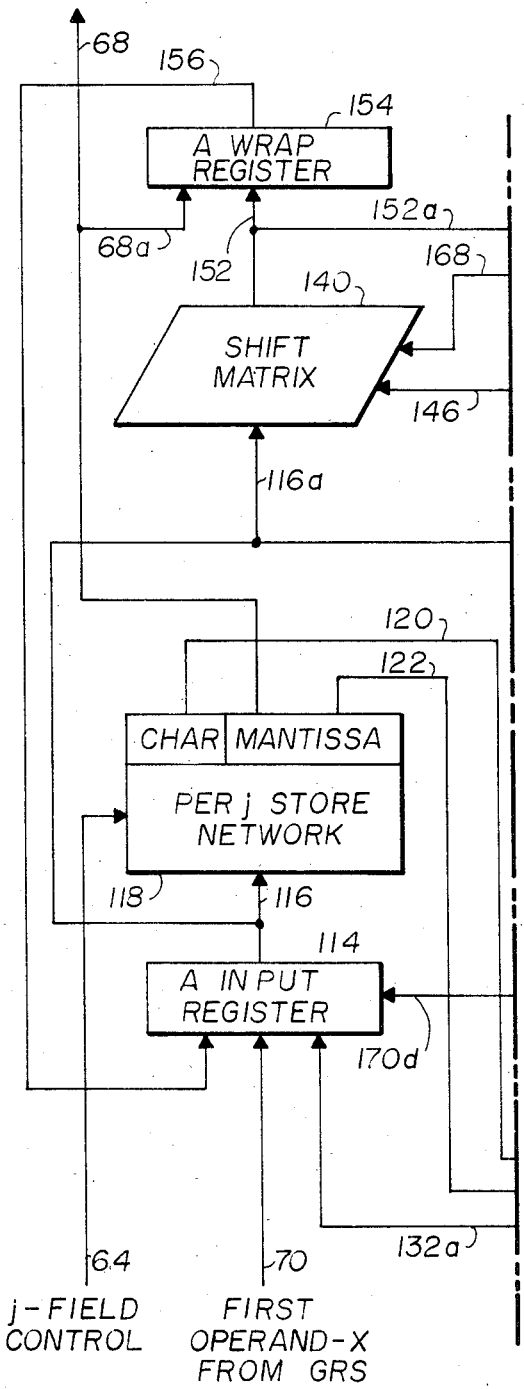
Figure 6B:
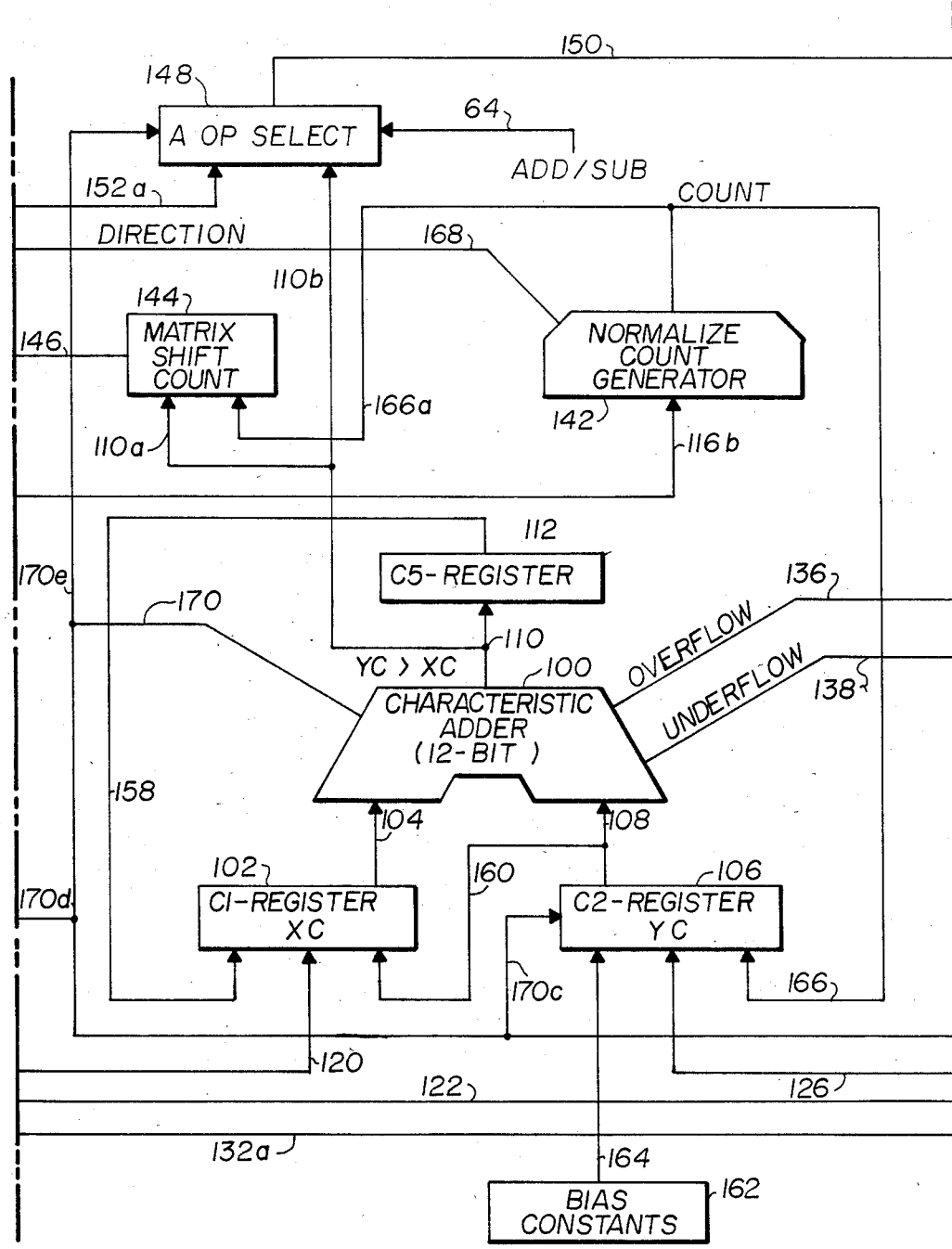
Figure 6C:
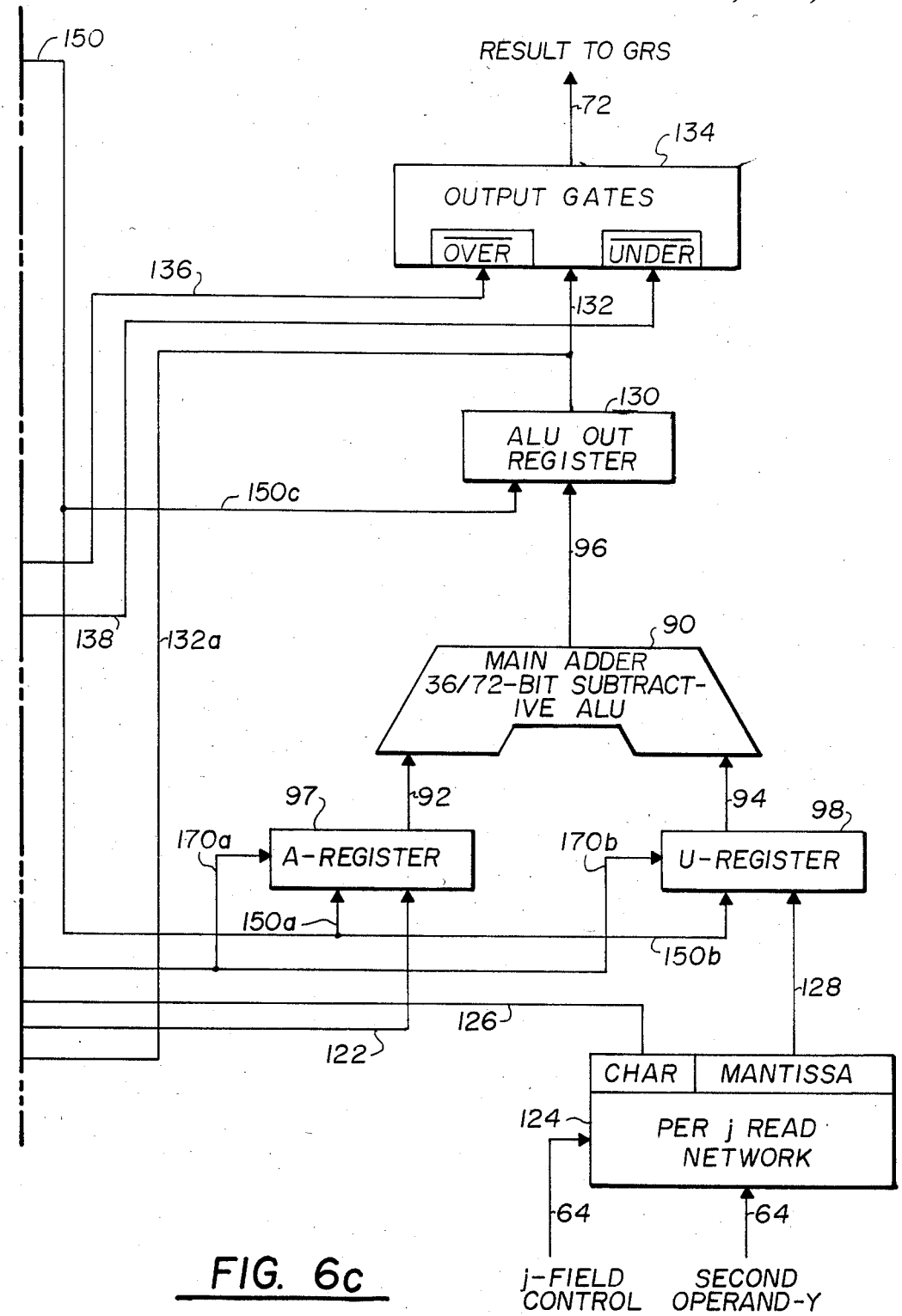

FIG. 6a through FIG. 6c, when arranged as shown in FIG. 6, comprise a block diagram of the portion of the Arithmetic Unit 62 that is utilized in the floating-point arithmetic operations. The system utilized a Main Adder 90, referred to as ALU, which is capable of performing addition of operands received in parallel on lines 92 and 94, and forming the sum output on line 96. The ALU is a subtractive adder of a type known in the art, capable of performing single precision addition of two 36-bit operands, double precision addition of two 72-bit operands, as well as capable of performing simultaneous additions or subtractions of operands partitioned as half-words, or third-words. The ALU is utilized in floating-point arithmetic operations to form the sum or difference of the mantissa portions of the floating-point operands. One set of inputs is applied from the A Register 97 and the other operand is provided by the U Register 98. It is understood that 36-bit portions of the A Register and U Register and utilized for the single precision operation, while each of these registers is comprised of 72-bits for the double precision calculations. The Characteristic Adder 100 comprises a 12-bit subtractive adder, and receives a 12-bit set of input signals from the C1 Register 102 on line 104, and the other 12-bit operand from the C2 Register 106 on line 108. The sum is provided on line 110 and is utilized as an input to the C5 Register 112.

The first operand, designated X, is received from GRS on line 70, and is applied as an input to the A Input Register 114, whose output is applied on line 116 as an input to the Per j Store Network 118. In response to the j-field Control received on line 64, this network unpacks the floating-point operand, as previously described, with the unpacked characteristic being directed on line 120 as an input to the C1 Register 102. The appropriately unpacked mantissa is directed on line 122 as a set of input signals to the A Register 97. The second operand, designated Y, is received on line 66, and is unpacked by the Per j Read Network 124 in accordance with the dictates of the j-field Control received on line 64. The unpacked characteristic is directed on line 126 as one set of input signals to the C2 Register 106, and the unpacked mantissa is directed on line 128 as one set of input signals to the U Register 98.

The sum or difference output signals from ALU 90 transferred on line 96 is stored in the ALU Out Register 130, and are available on line 132 to the Output Gates 134, and on line 132a as a second set of input signals to the A Input Register 114.

Characteristic Adder 100 provides Overflow signals on line 136 to the Output Gates and an Underflow signal on line 138 to the Output Gates 143. When there is neither an Overflow or Underflow condition, the Output Gates will be satisfied, and the signal received on line 132 will be passed out to GRS on line 72.

The output signals from the A Input Register 114 are provided on line 116a as one set of input signals to the Shift Matrix 140, and on line 116b to the Normalize Count Generator 142. The Shift Matrix is utilized in aligning the matissa portions of the floating-point operands prior to execution of the arithmetic operations, and is further utilized in the normalization of the resultant floating-point mantissa. The output signal from the Characteristic Adder 100 is provided on line 110a as one set of input signals to the Matrix Shift Count circuitry 144, which provides shift count control signals on line 146 to control the functioning of the Shift Matrix. The Characteristic Adder output signals are also applied on line 110b as input signals to the A OP Select circuitry 148. The output of this circuitry is provided on line 150, and is directed on line 150a as one set of input signals to the A Register 97, and on line 150b as one set of input signals to the U Register 98, and on lines 150c as one set of input signals to the ALU Out Register 130. The control signals received on line 64 will determine whether or not the output signals on line 150 will be transmitted as true or complement, dependent upon whether the selection is for addition or subtraction.

The output of the Shift Matrix 140 is provided on line 152 to the A Wrap Register 154 and on line 152a to the A OP Select circuitry 148. The output signals from the Per j Store Network 118 provided on line 68a as an input to the A Wrap Register 154. The output provided therefrom on line 156 is directed as another set of input signals to the A Input Register 114.

The output signals from the C5 Register 112 are directed on line 158 as a set of input signals to the C1 Register 102. The output signals from the C2 Register 106 are directed as yet another set of input signals to the C1 Register 102 on line 160. The C2 Register 106 is adapted to receive the Bias Constants 162 on line 164, and receives the output signals from the Normalize Count Generator 142 on line 166. This count signal is also applied on line 166a as one set of input signals to the Matrix Shift Count circuitry 144.

The Normalize Count Generator 142 provides a signal as to whether the shift is right or left for normalization on line 168 to control the operation of the Shift Matrix 140 during the normalization process.

The Characteristic Adder 100 provides a signal on line 170 that determines whether the characteristic XC of the first operand is greater or smaller than the characteristic YC of the second operand. This control signal is utilized as a control signal on line 170a to the A Register 97, on line 170b as a control to the U Register 98, as a control on line 170c to control the operation of the C2 Register 106, as a control on line 170d to the A Input Register 114, and as a control on line 170e to the A OP Select circuitry 148.

Figure 7:
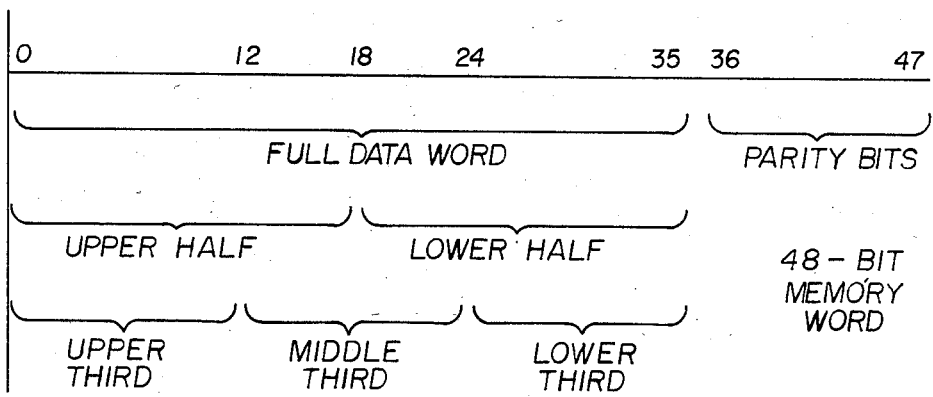
FIG. 7 illustrates a format for a data word having thirty-six data bits and twelve parity bits, thereby yielding a total of forty-eight bits.

FIG. 7 illustrates a format for a data word having thirty-six data bits and twelve parity bits, thereby yielding a total of forty-eight bits. The functioning of the parity bits is to provide for checking of accuracy of data transmissions, and will be handled through the subject invention. Each 3-bit segment has an associated parity bit. For example the 0-bit, 1-bit and 2-bit positions have their parity shown in the 36-bit position. The data word is arranged such that 36-bits can be treated as a single word, in which case the sign is in the 0-bit position. The order of significance is for the 35-bit to be the least significant and the 0-bit to be the most significant with increasing order of significance ranging from the 35-bit to the 0-bit. The system also accommodates half-word configurations which provide that the 0-bit is the sign for the upper half-word and the 18-bit is the sign for the lower half-word. In a similar manner, the system can accommodate third-word configurations, in which case the 0-bit is the sign for the upper third-word, the 12-bit is then for the middle third-word, and the 24-bit is the sign for the lower third-word. There are other bit configurations available, but do not carry sign bits along. The handling of sign bits for floating-point operands is as previously described.

The data reformatting system of the subject invention involves reformatting when data is read and is to be manipulated in the Arithmetic Unit 62, and the reformatting of data that has been generated by the Arithmetic Unit 62 and is ready for transmission for storage. The reading reformatting is accomplished by the Per j Read Network 124, and the writing reformatting is accomplished in the Per j Store Network 118. Each of these Networks is architecturally similar in that each is comprised of four integrated circuit arrangements, each of which is adapted for handling 12-bit portions of the bit groupings being reformatted. Further, each of the Network utilizes one of the 12-bit integrated circuits for handling the parity bits. Each of the Networks has the 36-bit data bits interleaved with every third bit in the sequence being handled on one of the LSI chips, thereby optimizing the shift time in that the shift of any given bit is accomplished on a given LSI chip, and minimizes the associated pin requirements. Each of the Networks is responsive to externally supplied control signals, the exact function of each being defined by the type of instruction being executed, the state of the j-field and Control signals. During any memory accessing cycle, the data reformatting involves formatting of the data as it is read, as indicated by the Per j Read Network 124, and reformatting as the data is made available for storage after manipulation, as indicated by Per j Store Network 118. Both Networks are necessary for the complete reformatting, and are each subject to the same design criteria, although the specific Networks are not identical. Each will be described in detail. In the following discussion the Per j Read Function hereinafter referred to as PjR, and the Per j Store Function, also called Per j Write, hereinafter referred to as PjW, will each be described as to the general function, the control signals required, the block diagram symbology, associated truth-tables, and detailed logic drawings.

PjR—GENERAL DESCRIPTION

The PjR is a special purpose scaler designed to be used in an interleave of three configuration. This basically specialized shift function is utilized for alignment with a masking operation for zero or sign filling to the proper field size, and for unpacking floating-point numbers. It is also utilized to generate complement and magnitude functions. Field sizes of 6-bits, 9-bits, 12-bits, 18-bits, and 36-bits, are possible for this configuration. The largest common denominator for these field sizes is three. Shifts of zero, six, nine, twelve, eighteen, twenty-four, twenty-seven, and thirty are required for alignment with masking of all but the 6-bit, 9-bit, 12-bit, or 18-bit fields. The 48-bit Memory Word includes a 12-bit Parity field, together with the 36-bit data field. The PjR is partitioned for LSI implementation so that each LSI chip handles a 12-bit portion of the input operand, and each chip is identical. The Parity field is handled by one PjR chip. The arrangement is such that each chip receives every third bit of 36-bit data field from the source data. In this manner, all shift paths may be implemented internal to the chip, thereby ensuring maximum speed and efficiency for the reformatting network.

Data extracted may be the characteristic of a floating-point number or a selected field of the incoming operand. In most cases the data field extracted is right-justified in the output format, and the remaining portion filled with zero or sign bits, depending upon the instruction being processed and the control signals applied. In orde to appropriately sign fill, four sign bit positions must be monitored for sign extension and magnitude determination. The monitored sign positions are the 0-bit, 12-bit, 18-bit, and 24-bit positions, each of which are directed to each LSI chip. There are two special cases where the extracted data is left-justified, in which cases the remaining lower ordered bits are filled with zeros.

When the control indicates that the function is to unpack floating-point numbers, the characteristic bits are provided on special characteristic output terminals, and the mantissa portion of the word is transferred to the output with the portion of the data word formerly occupied by the characteristic being filled with sign bits.

PjR—FUNCTIONAL DESCRIPTION

The various functions are determined by the control signals provided from the Function Decode and control 40, which identify the type of instruction being interpreted and provides appropriate control signals, together with the status of the j-field for the instruction being executed. In this way, all of the shifting, extraction, sign filling, zero filling, and floating-point unpacking circuits that were separately required in prior art systems are accomplished at a faster rate by the PjR Network.

FIG. 8 is a block diagram symbol for the Per j Read LSI chip for handling a 12-bit portion of the input operand. It illustrates input including a 12-bit input data field selected from the input operand, collectively identified as 1D. The sign data bits are applied to the 2D field. The remainder of the input is control and includes the Enable (ENA) that enables operation; the j-field; the C Mode indicative of the Control Mode; the D Mode indicative of the Data Mode; Shift Enable (SHF) for controlling right and left justification; and the Clock (CLK). The output has a 12-bit data field, a 4-bit Characteristic field, (CHR), and the selected Sign. The various control functions will be described below.

Figure 9:
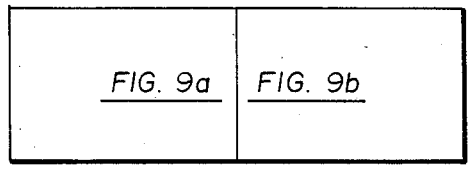
FIG. 9a and FIG. 9b when arranged as shown in FIG. 9, are a logical block diagram of the Per j Read Network, and illustrates the interconnection of four identical LSI chips to accomplish the data reformatting when reading.
Figure 9A:
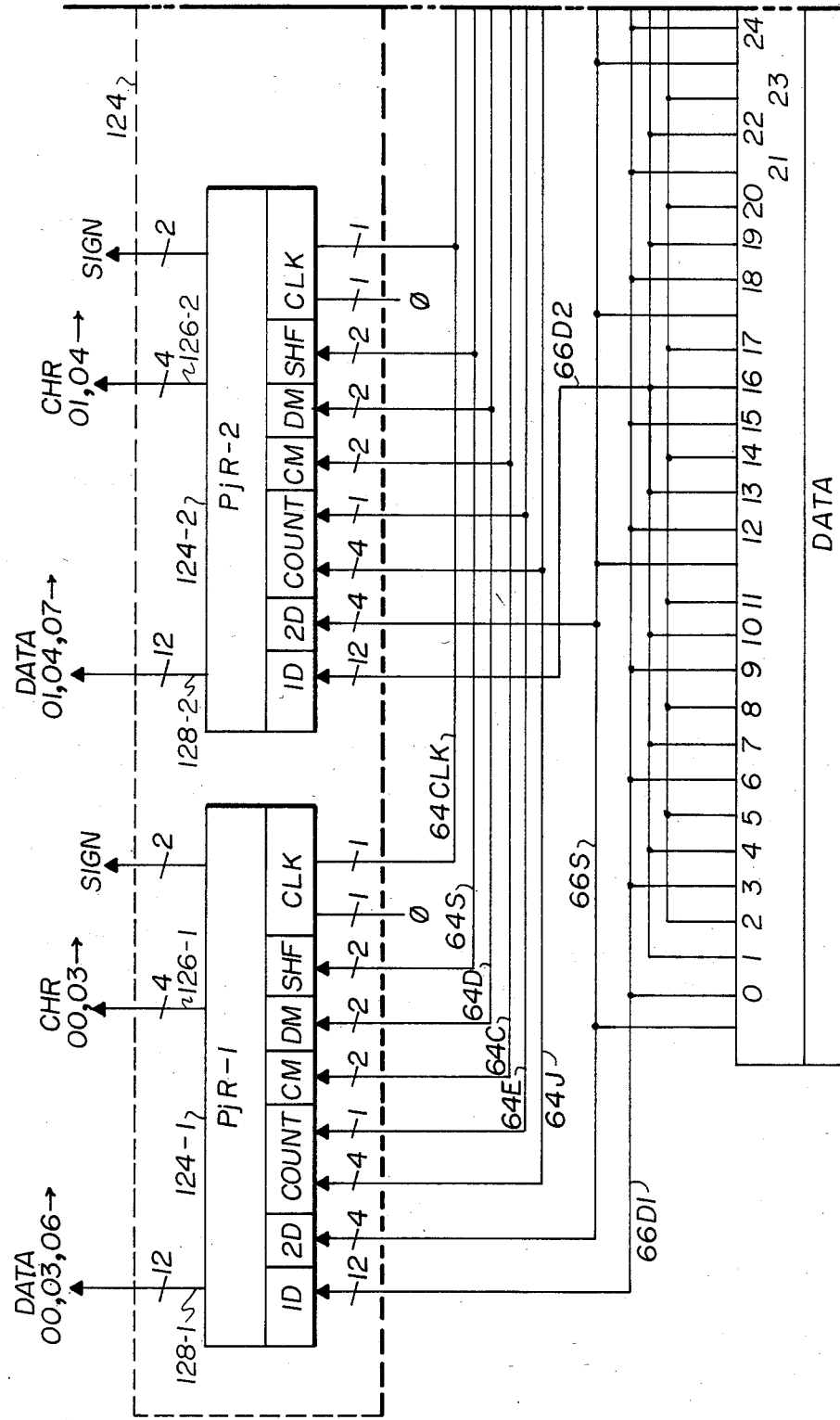
Figure 9B:
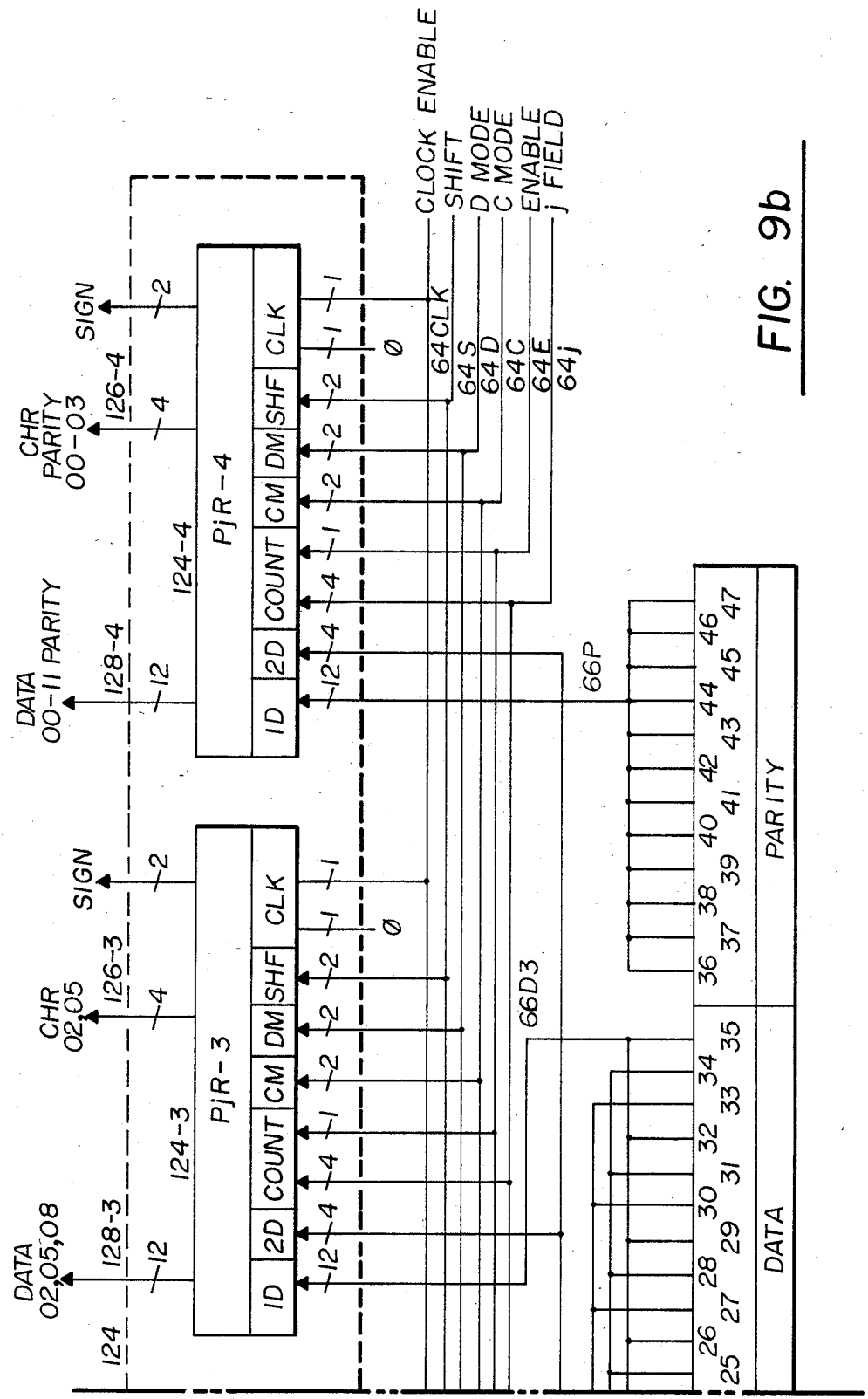

FIG. 9a and FIG. 9b, when arranged as shown in FIG. 9, are a logical block diagram of the Per j Read Network, and illustrates the interconnection of four identical LSI chips to accomplish the data reformatting when reading. The Per j Read Network is shown enclosed in dashed block 124 and is comprised of PjR circuits 124-1, 124-2, 124-3 and 124-4. The thirty-six data bits are received and are parititioned between the four LSI PjR circuits. PjR-1 receives bits 0, 3, 6, . . . 33 on line 66D1; PjR-2 receives bits 1, 4, 7, . . . , 34 on line 66D2; Pjr-3 receives bits 2, 5, 8, . . . 35 on line 66D03; and PjR-4 receives all twelve parity bits on line 66P. By interleaving the data bits in this manner, it is possible to use four identical LSI circuits, since no matter which field is selected for extraction, a portion of that field is handled on each LSI circuit. The sign bits 0, 12, 18 and 24 are applied on line 66S to all PjR circuits. The j-field is applied on line 64j to all PjR circuits. All control signals including the Enable on line 64E, the C Mode on line 64C, the D Mode on line 64D, the Shift Enables on line 64S, and the Clock on line 64 CLK are applied to all PjR cirucits. The output signals of the appropriately formatted data bits are provided on output lines 128-1, 128-2, 128-3, and 128-4 thereby comprising a total 48-bit output operand. The Characteristic bits are provided on lines 126-1, 126-2, 126-3 and 126-4 thereby comprising a 12-bit Characteristic with a 4-bit Characteristic parity. The Sign selected is provided from each of PjR circuits.

PjR—FUNCTIONS

The specific function performed by the Per j Read Network are described as follows:

Transfer a full data word and its associated parity bits without alteration, illustratively a 36-bit data word and a 12-bit parity field;

Extract a 6-bit, 9-bit, 12-bit, or 18-bit field from the incoming operand and right justify the extracted field, while filling the remaining portion of the output word with zero or sign bits, according to the instructions;

Extract the low order twelve bits (24–35) from the input data and place the extracted field in the twelve high order bit positions (0–11) of the output word while filling the remaining low order bits with zeros, the twelve bits extracted being selected after the input data has been formatted within the Network according to the specification of the j-field;

Extract the low order eighteen bits (18–35) from the input operand and place them in the high order eighteen bit positions (0–17) of the output operand while filling the remaining low order bit positions with zeros, this extraction taking place after formatting within the Network according to the selection of the j-field;

Extract the 9-bit or 12-bit characteristic from a floating-point operand and place it on the characteristic output lines, while transferring the mantissa portion of the input operand to the output lines with the postions formerly occupied by characteristic bits filled with sign bits; and Perform the preceding functions but complement the normal output.

It will be noted that double precision floating-point operands are treated in two passes through the Network under control of the Clock and Clock Enable signals.

PjR—CONTROL SIGNALS

The signals that control the operation of the Per j Read Network are the Count Enable (ENA), the Count of the j-field, the Control Mode (C Mode or CM), the Data Mode (D Mode or DM), the Shift Enable (SHF), and the Clock Enable (CLK), each of which signals and their functioning will be described below.

PjR—COUNT ENABLE

The COUNT ENABLE is active when a low signal is present for instructions that provide the read function and is operative to enable the transmission of the j-field to the PjR Network.

PjR—j-FIELD INTERPRETATION

The four count signals that comprise the j-field of the instruction when enabled by the COUNT ENABLE, select the designated fields from the input operand according to the following field designations:

| j-FIELD COUNT (OCTAL) | FIELD EXTRACTED |
|---|---|
| 0 | 00–35 |
| 1 | 18–35 ZERO FILL |
| 2 | 00–17 ZERO FILL |
| 3 | 18–35 SIGN FILL |
| 4 | 00–17 SIGN FILL IF C MODE=0 |
|   | 09–17 ZERO FILL IF C MODE=1 |
| 5 | 24–35 SIGN FILL IF C MODE=0 |
|   | 27–35 ZERO FILL IF C MODE=1 |
| 6 | 12–23 SIGN FILL IF C MODE=0 |
|   | 18–26 ZERO FILL IF C MODE=1 |
| 7 | 00–11 SIGN FILL IF C MODE=0 |
|   | 00–08 ZERO FILL IF C MODE=1 |
| 10 | 30–35 ZERO FILL |
| 11 | 24–29 ZERO FILL |
| 12 | 18–23 ZERO FILL |
| 13 | 12–17 ZERO FILL |

-continued

| j-FIELD COUNT (OCTAL) | FIELD EXTRACTED |
|---|---|
| 14 | 06–11 ZERO FILL |
| 15 | 00–05 ZERO FILL |
| 16 | 18–35 ZERO FILL |
| 17 | 18–35 SIGN FILL |

PjR—C MODE INTERPRETATION

The four possible combinations of C MODE signals denote the following:

| 2 | 1 | MODE |
|---|---|---|
| 0 | 0 | NORMAL |
| 0 | 1 | QUARTER WORD |
| 1 | 0 | SINGLE PRECISION FLOATING-POINT |
| 1 | 1 | DOUBLE PRECISION FLOATING-POINT |

PjR—D MODE INTERPRETATION

The four signal combinations that comprise the DATA MODE selections specify the following selections:

| 2 | 1 | MODE |
|---|---|---|
| 0 | 0 | NORMAL |
| 0 | 1 | UNCONDITIONAL COMPLEMENT |
| 1 | 0 | COMPLEMENT DATA IF SELECTED SIGN IS NEGATIVE* |
| 1 | 1 | COMPLEMENT DATA IF SELECTED SIGN IS POSITIVE* |

*The zeros added to fill out bit positions 18–35 or 24–35 as a result of a certain instruction are not complemented. The selected sign is the high order bit of the field selected by the j-field COUNT.

PjR—SHIFT ENABLE

Three of the four possible combinations of SHIFT ENABLE input signals are utilized and are interpreted as follows:

| 2 | 1 | SHIFT ENABLE FUNCTION |
|---|---|---|
| 0 | 0 | NORMAL OUTPUT |
| 0 | 1 | SHIFT LOWER 12 BITS TO UPPER 12 BITS (LXSI) |
| 1 | 0 | SHIFT LOWER 18 BITS TO UPPER 18 BITS (LXI) |
| 1 | 1 | NOT USED |

PjR—CLOCK ENABLE

The CLOCK ENABLE is a dual-function control that determines the current selected sign, or alternatively the captured sign is to be utilized. When CLOCK ENABLE is low, that is active, the sign output is the current selected sign, and is utilized in the single precision mode or when transferring the first word of a double precision operation. When CLOCK ENABLE is high, this is inactive, the sign output is the value latched during the first pass of a double precision operation. The floating-point mode designated by C Mode 2 is disabled when the CLOCK ENABLE is inactive.

PjR—TRUTH TABLES

Figure 10:
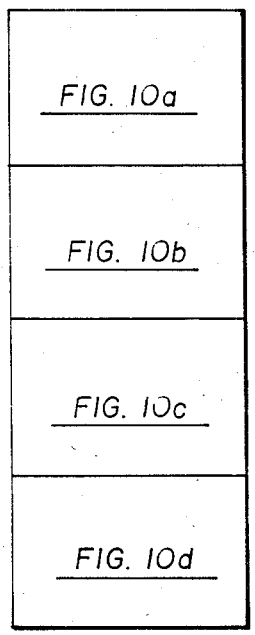
FIG. 10a through FIG. 10d, when arranged as in FIG. 10, is a Truth Table that illustrates the various data reformatting configurations for the combinations of the j-field count, the C Mode selections, the D Mode selections, the Shift selections, and the status of the Clock and Enable signals.

FIG. 10a through FIG. 10d, when arranged as in FIG. 10, is a Truth Table that illustrates the various data reformatting configurations for the combinations of the j-field count, the C Mode selections, the D Mode selections, the Shift selections, and the status of the Clock and Enable signals. The Truth Table when considered in conjunction with the foregoing functional description and together with the hardware description that will follow, illustrates the capabilities of the novel reformatting system. Reference should be made to FIG. 8 for identification of the input and output terminal designations.

FIG. 11 is the Per j Read floating-point mode Truth Table and illustrates the functioning of the Per j Read Network elements under control of C Mode bit 2 which indicates the floating point operations. Again, reference FIG. 8 for designation of input and output terminal identifications.

PjR SELECTION PATHS

Figure 12A:
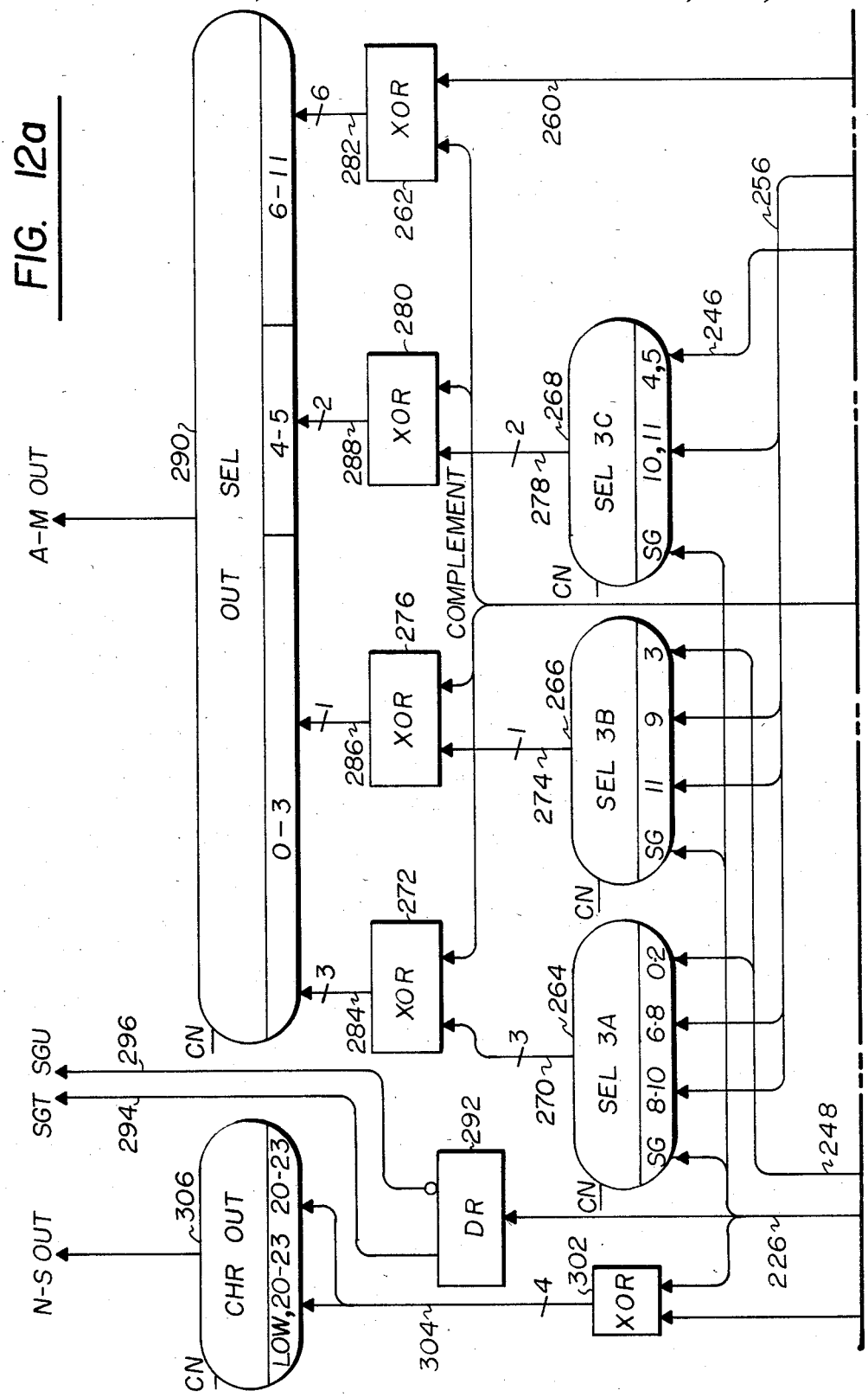
FIG. 12a and FIG. 12b, when arranged as shown in FIG. 12, is a logic diagram of the selection paths of the Per j Read circuit element illustrated in FIG. 8.
Figure 12B:
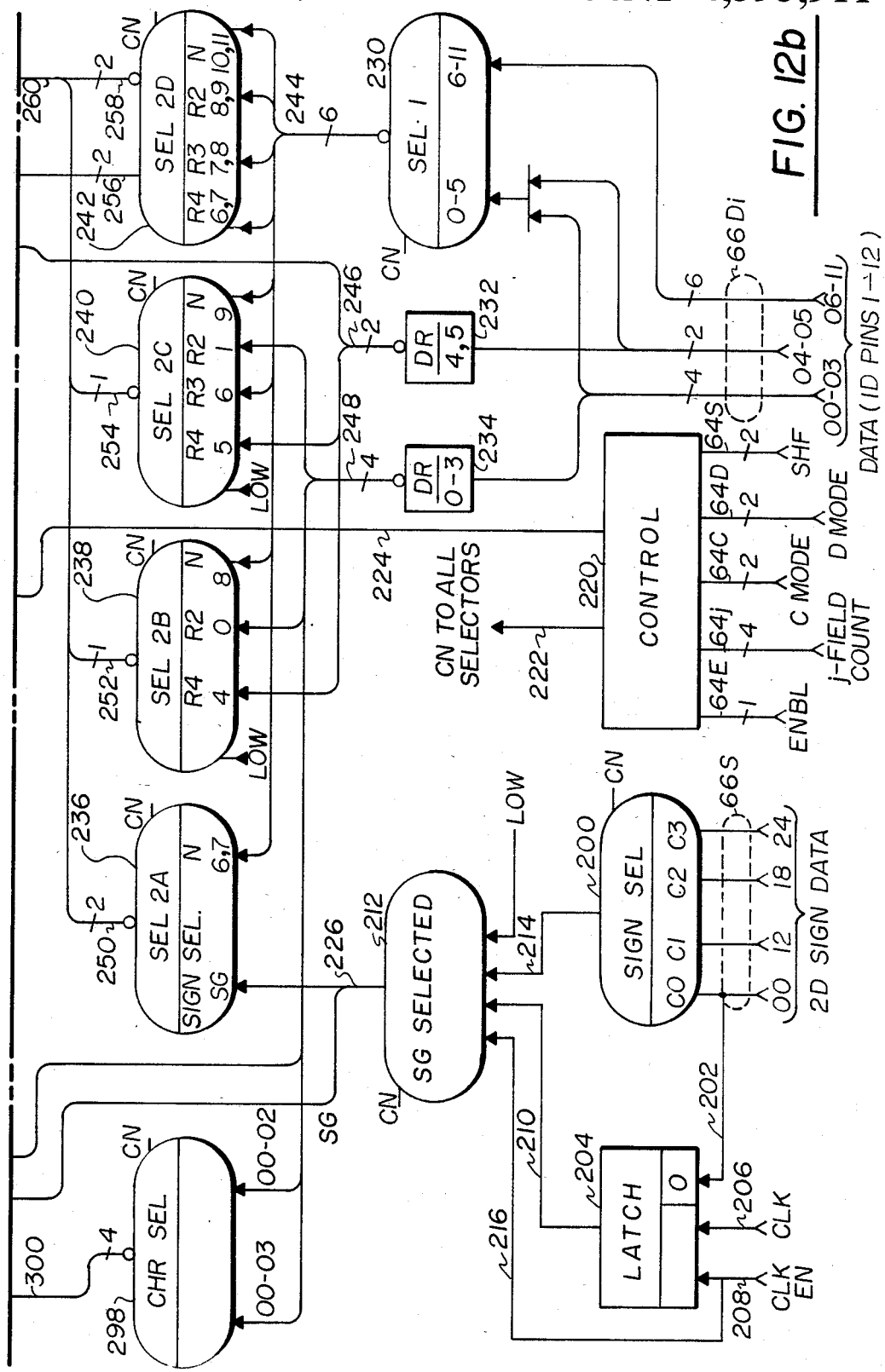

FIG. 12a and FIG. 12b, when arranged as illustrated in FIG. 12, is a logic diagram of the selection paths of the Per j Read element illustrated in FIG. 8. The specialized shift function for alignment with masking for zero or sign filling to the proper field size involves shifts of 0, 6, 9, 12, 18, 24, 27, or 30 bit positions. It will be recalled from a consideration of FIG. 9 that the data bits are interleaved such that every third bit is associated with a particular circuit configuration. All monitored sign bits are applied to each of the Per j Read elements. For this configuration, bit positions 00, 12, 18, and 24 are monitored. The sign determination is processed in parallel with the shifting of the data. Both the sign determination and the formatting are accomplished with multiplexer functions. The sign bits are applied on line 66s to the Sign Sel 200. The Sign bits will be designated C0 through C3 in further discussions. The 00 bit is applied on line 202 to Latch 204, where it is captured. The Latch is enabled by the Clock (CLK) signal on line 206 and the Clock Enable (CLK EN) on line 208. The output of the Latch is applied on line 210 to the SG Selected Circuit 212. The selected sign is applied on line 214, and the CLK EN is applied on line 216. The Latch functions to capture the highest ordered sign bit so that it can be utilized on the second pass in double precision floating-point operations.

The Control circuitry 220 receives the Enable (ENBL) signal on line 64E, the j-Field Count on line 64J, the C Mode signals on line 64C, the D Mode signal on line 64D, and the Shift (SHF) signals on line 64S, which signals collectively control the selection and functioning of these specialized shifting network. The Control circuitry provides selection control on line 222 as Control Signals (CN) to all Selectors. Additionally, the Control circuitry provides signals on line 224 for controlling the complementing of the resultant bits prior to output. With regard to the sign bit, then, the control signals to the Control circuitry 220 will determine the sign to be selected, and the selected sign will be designated SG and will be provided on line 226.

In general, two ranks of multiplexing accomplishes the field selection and right justification to bit 35. The 12 data bits are applied on line 66Di to the first rank of multiplexing selection. Selection is made by Sel 1 labeled 230, between input pins 0 through 5 and inputs pins 6 through 11. Pins 4 and 5 are applied to Drive (DR) circuit 232, and pins 0 through 3 are applied to DR 234. The circles with the enclosed numbers indicate the number of conductor paths in the designated lines. The arrowhead indicate the direction of data flow, and the small circles at the initiation end of a data flow line indicate that complement values are utilized.

The results of the selections made in the first rank are applied to the second rank of multiplexing selectors. The second rank of selectors is comprised of Sel 2A 236, Sel 2B 238, Sel 2C 240, and Sel 2D 242. The selected output bits from Sel 1 are provided on lines 244, the outputs from DR 232 on lines 246, and from DR 234 on lines 248. In the second rank of selectors, the selection will be made between designated bit groupings within the selector element. For example, in Sel 2A, the selection will be made on an output line 250 between a pair of SG bits or bits 6 and 7. The output from Sel 2B on line 252 will be between bits 4, 0, or 8, or a Low signal which for this embodiment indicates a zero value. Similarly, the output signal from Sel 2C on line 254 will be between bits 5, 6, 1 or 9 or the Low (0). The output signals from Sel 2D in the true state will be on lines 256 and in the complement state on lines 258. The selection is between bit pairs 6 and 7 or 7 and 8 or 8 and 9 or 10 and 11.

At this point it should be pointed out that the ID pin designations of 1 through 12 referenced in FIG. 8 are referenced as 00 through 11. The reason for this is the pin designation attempts to avoid confusion with the bit position designation in the block symbol. It was felt, however, that with regard to the bit position designation for the data words and for the sign bits that the pin designations referenced in FIG. 12 would be appropriate.

The bit positioning accomplished by the first and second ranks of multiplexing results in the output signals applied on lines 250, 252, 254, 256, and 258 being applied on line 260 to Exclusive-OR circuits 262.

In order to handle the special cases of field selection and right justification to bit positions 11 or 17 of the data word, a third rank of multiplexing selectors is utilized. This third rank includes Sel 3A 264, Sel 3B 266, and Sel 3C 268. The output from Sel 3A on line 270 will be a 3-bit selection of 3 SG bits received on lines 226, or bits 8-10 or 6-8 received on lines 256, or bits 0-2 received on lines 248. The 3-bit output is provided to XOR 272. The 1-bit selection made by Sel 3B is made between SG, or 11, or 9, or 3, and is provided on line 274 to XOR 276. Finally, the 2-bit selection made by Sel 3C will result in a 2-bit output on line 278 to XOR 280, and will be a selection between 2 SG bits or bits 10 and 11, or bits 4 and 5. The complement control signal applied on line 224 is applied to all XOR circuits 262, 272, 276, and 280. These XOR circuits operate to either pass the position bits through on lines 282, 284, 286, and 288, or to pass the complement values to the Out Sel circuits 290.

At the same time as the data bits are being selected, positioned, and either transferred or complemented, with appropriate sign or 0 filling, the selected sign SG is provided through DR 292 in the true state on line 294 and in the complement state on line 296.

Simultaneously, the characteristic is being selected and passed through or complemented. The CHR Sel circuit 298 selects between bits 0-3 and 0-2 and provides the output signals on line 300 to XOR 302. Under control of SG, the selected CHR bits are either passed or complemented on line 304 and provided to the CHR Out circuit 306.

In summary, then, the Latch 204 captures bit 00 when the enable is low and enables the Latch 2 SG Selected 212 when the enable is high. The selected sign is used in magnitude and sign fill operations. The CHR Sel 298 selects the appropriate characteristic, whether upper 9-bits or upper 12-bits, and passes through XOR 302 for a positive sign or complemented by XOR 302 if the sign is negative. The Selectors adjust the bits as previously described with the resultant configurations either handled directly or complemented dependent upon the Control 220.

As previously described, three Per j Read circuits of the type described are utilized to implement a 36-bit data path. A fourth circuit arrangement identifical in form is used to accomplish parity predictions of the output. The source data bits are associated with parity bits on the basis of a 3-bit parity system previously described. Since parity on an odd number of bits, all modes of sign fill, zero fill, complementing, or magnitude operations modify the parity bits pass through the circuit to match the alterations of data. In this manner proper parity is preserved to the 3-bit data group relationship.

LOGIC DIAGRAM AND SIGNAL CONVENTIONS

In a consideration of the detail logic, circuit conventions will be followed. A logical "1" will be the equivalent of a High signal, and a logical "0" will be the equivalent of a Low signal. The basic logic symbols are conventional, and represent circuits that will accomplish the logical functions represented. Certain of the logical functions will be depicted in block logic diagram symbols that will define higher ordered or combinations of logic functions. The basic logical operations comprising AND, OR or Inversion, and the like will be first described. In the detail logic drawings, the triangular shaped symbol represent an emitter-follower, which are utilized for providing additional power drive without inversion of the input signals. The symbols having straight bottom and rounded top, sometimes referred to as the "bullet" symbol, represent a logic AND function, and may show straight line input terminating the input column or dot connected within the symbol. The straight line input or the dot connection represents a High AND, and results in a High output signal when all input signals are High. In the detail logic, the open circles adjacent the input terminals indicate that the circuit respond to the Low signals. Accordingly, two input lines terminating in open circles adjacent the input indicates a Low AND function whereby the logic result is Low only when both input signals are Low. The open circle at the output of the symbol indicates inversion of the resultant signal. For example if a High AND function is satisfied, the straight line output will be a high signal and the signal at the circle will be Low. If the conditions are not satisfied, the reverse condition will prevail.

In the logic block diagram symbology, an open half-arrow head is equivalent to an open circle, and represents that the logic block is responsive to a Low signal. Similarly, a filled half-arrow head is equivalent to a straight line input, and represents that the logic block is responsive to High signals. The same convention applies at the output, where the open half-arrow head indicates a Low output signal will result when prescribed input conditions are satisfied. Similarly, the closed or filled half-arrow head at the output is indicative that a High output signal will result when the input conditions are satisfied. In the logic block diagram symbology, which will be described for specific combination below, it must be recognized that several functions may be accomplished within the logic block. The logic block symbol can represent circuitry that provides both the resultant output and its complement in the same manner as that described above.

The symbols having a curve at the input and the curve pointed output, after referred to as the "shield" symbol, represent circuits that perform the logical OR function. The straight line input to the curved input portion to the symbol indicates that the symbol performs the OR function on High signals, resulting in a High output signal when any or all of the input signals are High. The open circle at the output portion of the symbol indicates the inverse of the condition that satisfies the logical function. For example, if the High OR circuit receives a High input signal, the open circle output will provide a Low signal. When the OR symbol has open circle input lines, the logical function is that of providing OR function of Low signals, and operations that are similar to that just described. In the same manner, the logic block diagram symbols utilizing half-arrow heads is the same as that just described above.

Other specific types of circuits such as Exclusive-OR, gates Exclusive-OR, Multiplexers, and Latches, and the like will be described in more detail below, and as encountered in the logic diagrams.

The particular embodiment is designed for implementation in large scale integration (LSI), and the symbology is that utilized for Emitter Coupled Logic (ECL). It is of course understood that the choice of logic implementation and the logic family need not be so limited, and that other logic families could be utilized in the implementation of the invention.

The logical operation of Latch circuits, such as D Latches, is such that an input signal applied on the D input terminal, when appropriately enabled by a clock signal or other enabling signal, will cause the Latch circuit to be switched to the state indicated by the input signal. Characteristically, the Latch circuit provides both true and complement otuput signals indicative of the state of the input signal. Latch circuits are well known and are available commercially and a detailed description of the electrical operation of the Latch circuit is not necessary.

The control signals CN developed by Control 220 and provided to Selectors on lines 222, will be determined by the j-field, which determines the Count (CNT), the Enable (ENBL), the C Mode (CM), the D Mode (DM), the Shift (SHF), and the Quarter Word (QW). The actual operation of the Selectors will be described in more detail below. As previously indicated in general, the Selectors function to select for output between two or more sets of inputs depending upon the CN signals associated with each of the Selectors. While there will be further detailed description of the selection logic circuits below, the conditions for selection of each CN are set forth in FIG. 12c and FIG. 12d. FIG. 12c defines the input selections to Control 220 that will result in the designated selections for each of the Selectors. The selection conditions should be considered as logic equations. The CNT designations are to the octal j-field selections. For example in the SEL 1, the 0 selection will be made when CNT does not equal a j-field of 2 or 4, or 7 or 13–15, or when the CNT EN is not present. As is standard for logic equaltions, the + represents the OR function, while a space or . between elements indicate the logical AND function. The bar over any signal indicates the inverse or complement of the designated signal. Brackets indicate signal groupings. It is not deemed necessary to specifically trace through each of the Selector CN selection combinations since they are all set forth in detail in FIG. 12c.

FIG. 12d defines the CN signals utilized for the Characteristic Select (CHRS SEL), the Sign Select (SIGN SEL), the SG Select (SG SEL), whether or not to Complement (CMPLM), the Characteristic Output Select (CHRS OUT SEL), and the Output Select (OUT SEL). Again, these functions are controlled by the combination of input signals defined.

EXCLUSIVE-OR

Figure 13:
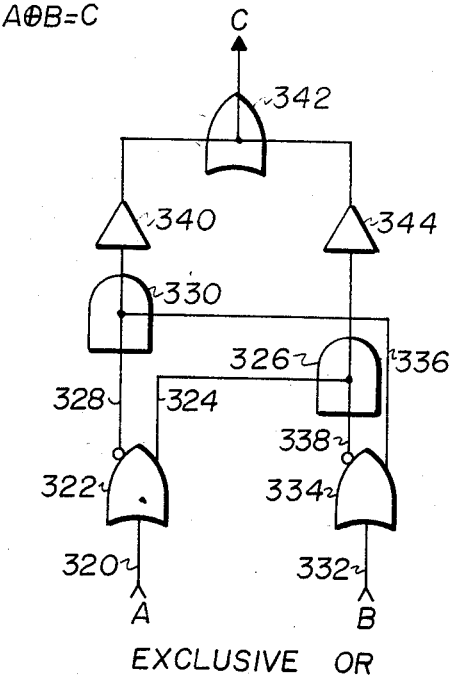
FIG. 13 is a logic block diagram of an Exclusive-OR function.

FIG. 13 is a logic block diagram of an Exclusive-OR function. A circuit of this type can be utilized in the XOR functions previously described and to be described. The function is such that the output C will be a 1 when either input A or input B is 1. Input A is applied on line 320 to OR 322, the true output of which is applied on line 324 to AND 326 and the complement of which is applied on line 328 to AND 330. Similarly, the B input is applied on line 332 to OR 334. Its true output is applied on line 336 to AND 330, and the complement is applied on line 338 to AND 326. The output from AND 330 passes through emitter follower 340 to OR 342, and the output from AND 326 passes through emitter follower 344 to OR 342. In operation, then, when A is 1, a 1 will be applied on line 324 to AND 326. If input B is 0, the complement signal will be applied as a 1 on line 338 to AND 326 which will result in a 1 passing through emitter follower 334 and through OR 342 to the output terminal. If input A is 1 and input B is 1, OR 334 will provide a 0 to AND 326, and OR 322 will provide a 0 on line 328 to AND 330 resulting in 0's being applied through emitter followers 340 and 344 to OR 342.

Figure 13A:
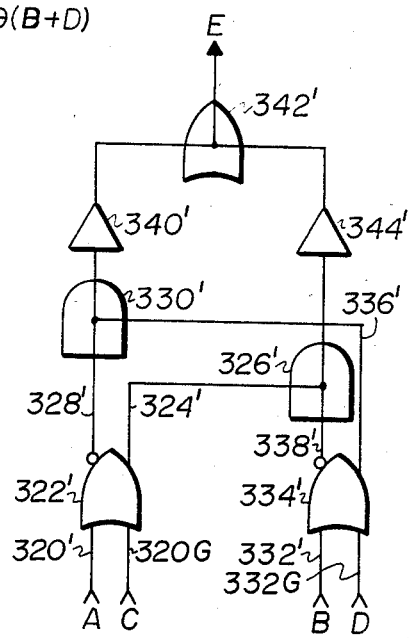
FIG. 13a is a logic block diagram of a gated Exclusive-OR circuit utilized for complement selection.

FIG. 13a is a logic block diagram of a gated Exclusive-OR circuit utilized for complement selection. Components and lines bear the same reference numerals with 'a', as used for the same components and lines described in FIG. 13. The C input to line 320G is used to gate OR 322' along with data input A. Similarly, the D input to line 332G is used to gate OR 334', along with data input B. The operation of the balance of the circuitry is as previously described.

MACRO CELLS AND LOGIC SYMBOLS

The implementation of a preferred embodiment is accomplished with LSI, the design of which utilizes macro logic cells for identified combinatorial functions. Rather than depict the implementation with discrete AND, OR and Inversion functions, and combinations thereof, macro cells have been developed. The logic block diagram symbols will be described in conjunction with the appropriate associated logic diagram.

Figure 13B:
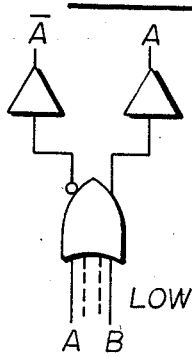
FIG. 13c through FIG. 13uu illustrates the combinatorial logic for macro cells employed in the implementation, together with the logic block diagram symbols representative of each macro cell.
Figure 13C:
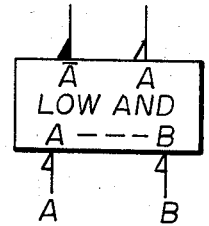
Figure 13D:
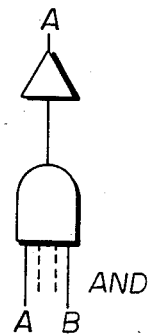
Figure 13E:
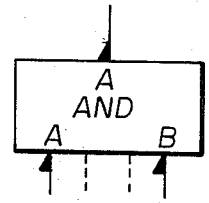
Figure 13F:
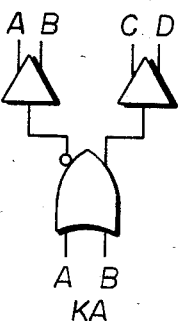
Figure 13G:
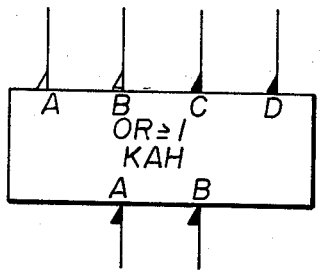
Figure 13H:
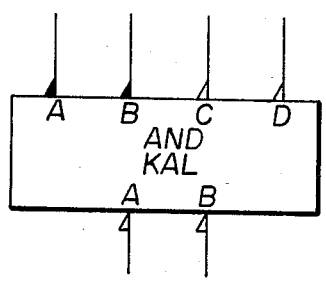
Figure 13M:
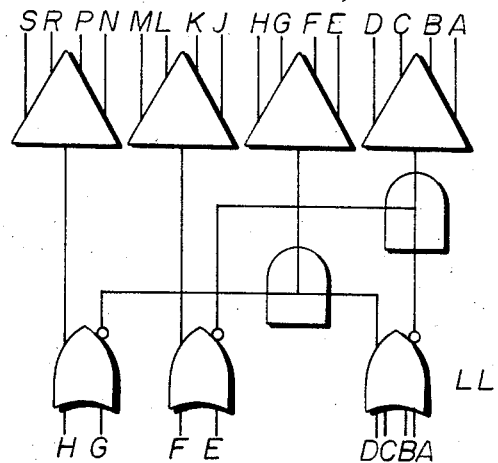
Figure 13I:
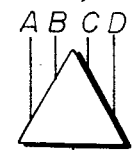
Figure 13J:
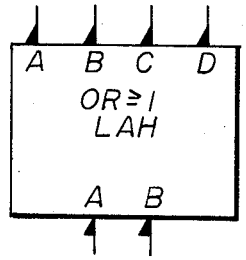
Figure 13K:
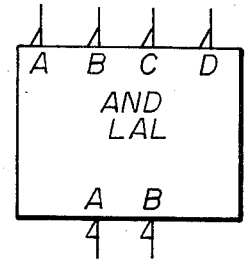
Figure 13N:
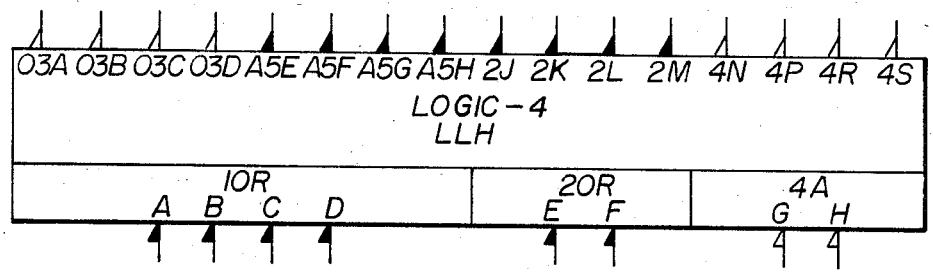
Figure 13O:
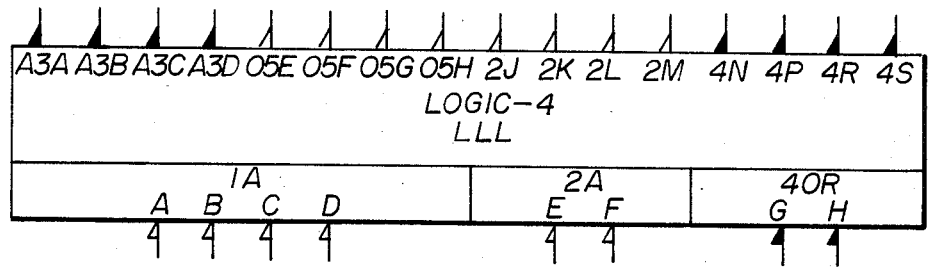
Figure 13A:
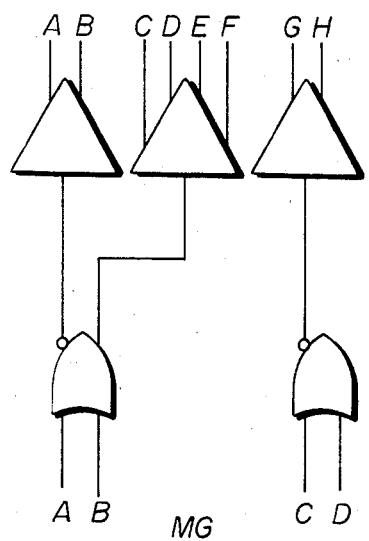
Figure 13D:
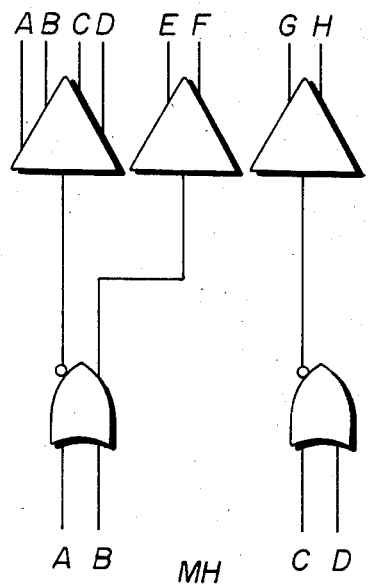
Figure 13B:
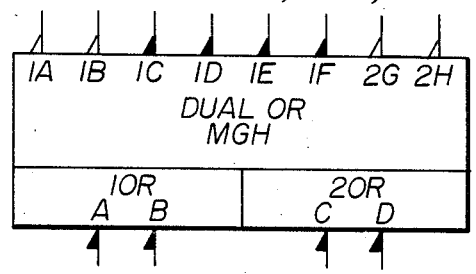
Figure 13C:
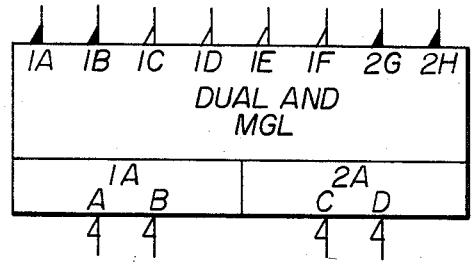
Figure 13E:
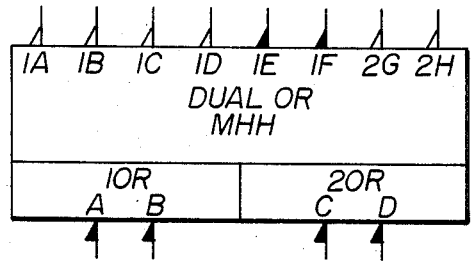
Figure 13F:
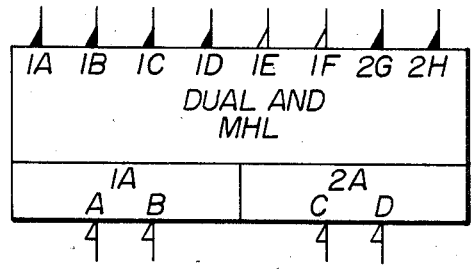
Figure 13J:
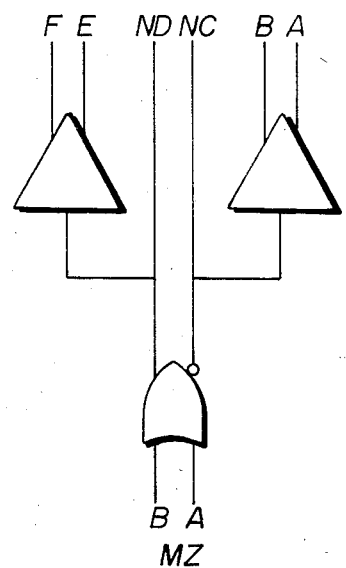
Figure 13H:
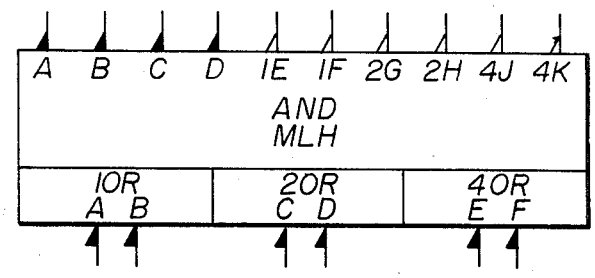
Figure 13I:
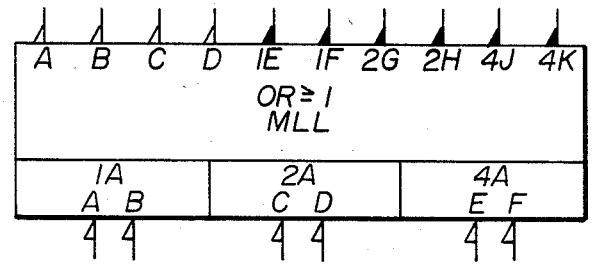
Figure 13K:
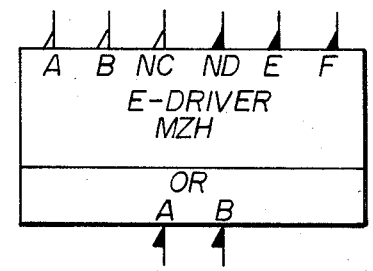
Figure 13L:
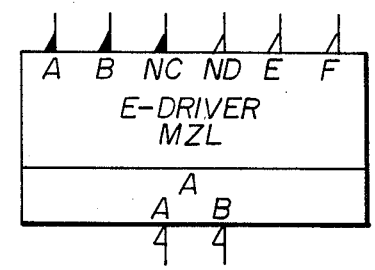
Figure 13G:
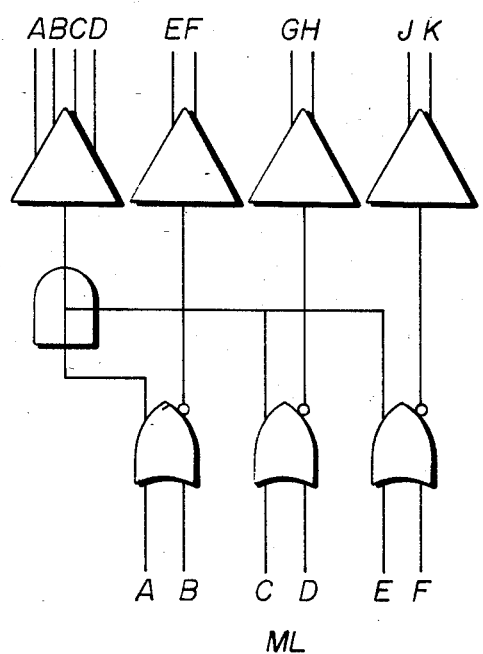
Figure 13S:
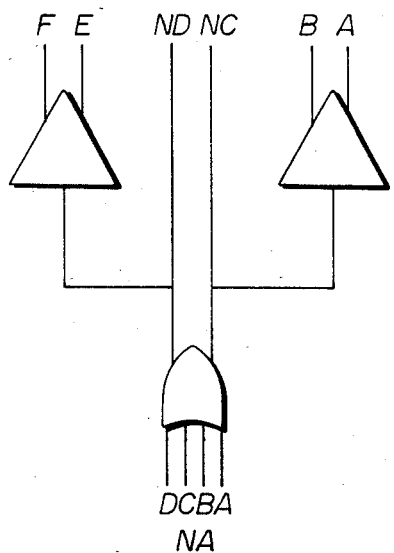
Figure 13T:
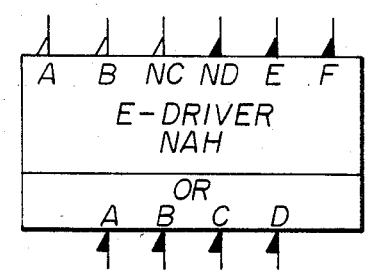
Figure 13U:
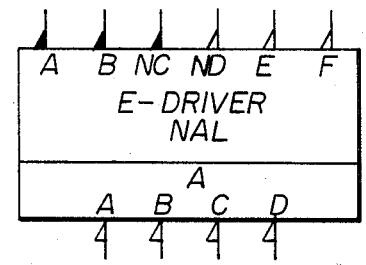

FIG. 13b through FIG. 13uu illustrate the combinatorial logic for macro cells employed, together with the logic block diagram symbols representative thereof. The conventions described above are employed. The functions will be described, it being deemed unnecessary to trace circuit operation in detail.

FIG. 13b is a Low AND circuit capable of responding to two or more input signals and for providing the true and complement results of the Low AND function. As illustrated, a Low AND is equivalent to an OR function.

FIG. 13c is the logic block diagram symbol for the Low AND circuit of FIG. 13b. For the conventions employed, the Low AND circuit of FIG. 13b is identical to the OR circuit. The OR circuit would respond to High signals, hence the logic block diagram of FIG. 13c would have the half-arrow head at the input filled in and the output terminals A and $\overline{A}$ would be reversed.

FIG. 13d is the logic circuit for the AND function and responds to two or more input signals. Its logic block diagram symbol is illustrated in FIG. 13e.

FIG. 13f is the logic circuit for the KA macro circuit, and it functions to provide dual true complement output signals. It performs either AND or OR logic, with designated inversion, depending on whether High or Low input signals are applied. FIG. 13g is the logic block diagram symbol for the KA macro circuit responding to High signals, therefore the designation KAH. It functions as an OR circuit. FIG. 13h is the logic block diagram symbol for the KA macro circuit responding to Low signals, hence the designation KAL. It functions logically as a Low AND circuit.

FIG. 13i is the logic diagram symbol of the LA macro circuit, which functions to provide the OR function of input signals and to provide multiple output drive lines. FIG. 13j is the logic diagram symbol for the LA macro when responsive to High signals. It performs the OR function and is designated LAH. FIG. 13k is the logic block diagram symbol for the LA macro. When used responsive to Low signals, it functions as a Low AND circuit, and has the designation LAL.

FIG. 13l is the logic diagram for the KB macro circuit and provides logic function. The output signals E and F will be determined by inputs A and B, and will be Low if either A or B or both are High. The D and C outputs are determined by the C, D, E, and F input signals. The output C and D will be High when either input C or D or both are High and both E and F are low. The A and B outputs are determined by all of the inputs, and will be High when either or both A and B inputs are High and both C or D inputs are Low and either or both E or F inputs are High. FIG. 13m is the logic block diagram symbol for the KB macro circuit which is primarily responsive to High signal, and is designated KHB. FIG. 13n is the logic block diagram symbol for the KB macro that is primarily responsive to Low signals, and is designated KBL.

Figure 13P:
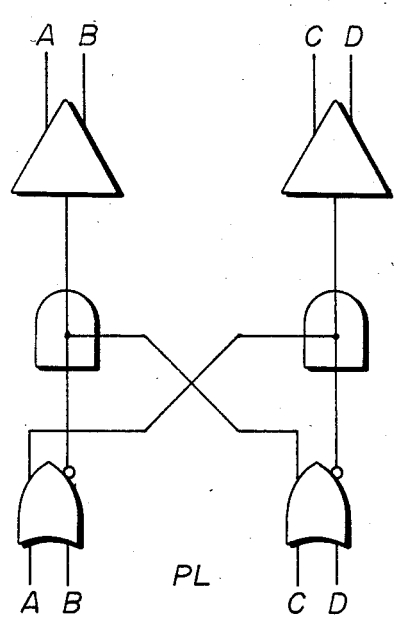
Figure 13Q:
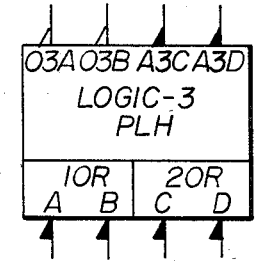

FIG. 13o is the logic diagram for the LB macro circuit, which is capable of providing multiple output signals from the complement output terminal. When responding to High signals, the logical function is essentially NOR, and when responding to Low signals is essentially a NAND function. FIG. 13p is the logic block diagram symbol for the LB macro illustrating the configuration when High signals are applied, and is labeled LBH. FIG. 13q is the logic block diagram symbol for the LB macro and illustrates the input and output relationship when responsive to Low signals, and is designated LBL.

Figure 13R:
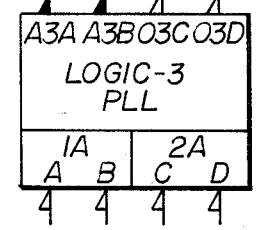

FIG. 13r is the logic block diagram of a combinatorial array designated LF. It provides for two sets of input signals, with a first set A and B and a second set C and D. Six output signals are derived. Output signals A and B are determined from an evaluation of input signals A or B and C or D. Output signals C and D are determined from the complement of input signals A or B. Finally, output signals E and F are determined by the state of of the complement of the input signals C or D, and will be Low if either or both C or D inputs are High. FIG. 13s is the logic block diagram symbol of the LF macro and illustrates the input and output signal relationship when High signals are applied, and is designated LFH. FIG. 13t is the logic block diagram symbol for the LF macro and illustrates the output signal relationship when responsive to Low input signals and it is designated LFL.

FIG. 13u is the logic diagram of the LR macro and illustrates combinatorial logic that is responsive to two sets of input signals for providing two complementary sets of multiple output signals. FIG. 13v is the logic block diagram symbol for the LR macro, and illustrates the output signal configuration when the A and B input terminals are responsive to High signals and the C and D input terminals are responsive to Low signals. For this logical configuration, the designation LRH is provided. FIG. 13w is the logical block diagram symbol for the LR macro and illustrates the output configuration when input terminals A and B are responsive to Low signals and input terminals C and D are responsive to High signals. This configuration is referred to as an AND circuit and bears the designation LRL.

FIG. 13x is the logic diagram for the LW macro. It functions to respond to High signals on the A and B input lines to perform the OR function, together with a response to Low signals on C and D input terminals to provide the Low AND function. Alternatively when responsive to Low signals on the A and B input terminals it functions as a Low AND, while responding to High signal on input terminals C and D to provide the OR function. FIG. 13y is the logical block diagram for the LW macro carrying the designation AND with the macro identified as LWH. FIG. 13z is the logic block diagram for the LW macro functioning as an OR, and bears the designation LWL.

FIG. 13aa is the logic block diagram of the MG macro which functions as either a dual OR, or a dual AND. FIG. 13bb is the logic block diagram symbol of the MC macro and indicates the input and output representation when responsive to High signals. As illustrated, it functions as a dual OR, and is designated MGH. FIG. 13cc is the logic block diagram symbol for the MC macro when responsive to Low signals. This configuration is a dual AND and is designated MGL.

FIG. 13dd is the MH macro and is a dual circuit with the A and B input signals independent of operation to the C and D input signals. FIG. 13ee is the logic block diagram symbol for the MH macro, is a dual OR when responsive to High signals, and is designated MHH. FIG. 13ff is the logic block diagram symbol for the MH macro and is a dual AND when responsive to Low signals. It bears the designation MHL.

FIG. 13gg is the logic block diagram of the ML macro, which provides eight output signals in response to the combination of six input signals. FIG. 13hh is the logic block diagram of the ML macro and functions as a dual level AND/OR in response to High signals. It bears the designation MLH. FIG. 13ii is the logic block diagram symbol of the ML macro and illustrates the input and output configurations when Low input signals are utilized. It bears the designation MLL.

FIG. 13jj is the logic block diagram of the MZ macro, and which provides a driver function. FIG. 13kk is the logic block diagram of the MZ macro when responsive to High signals, and is designated MZH. FIG. 13ll is the logic block diagram symbol for the MZ macro when responsive to Low signals. It is designated MZL.

FIG. 13mm is the logic diagram for the LL macro circuit and provides a selector logic function. Essentially the four input signals applied to input terminals A, B, C and D will be selected depending upon the combination of signals applied to inputs E, F, G and H. FIG. 13nn is the logic block diagram symbol for the LL macro circuit from the High condition and is designated LLH. FIG. 13oo is the logic block diagram symbol for the LL macro circuit for the Low condition and is designated LLL.

FIG. 13pp is the logic block diagram of a cross-coupled macro designated PL. FIG. 13qq is the logic block diagram symbol of the PL macro when responsive to High signals, and is designated PLH. FIG. 13rr is the logic block diagram symbol of the PL macro when responsive to Low signals, and is designated PLL.

FIG. 13ss is the logic block diagram of a driver macro NA. FIG. 13tt is the NAH logic block diagram symbol of the NA macro responsive to High signals, and FIG. 13uu is the NAL logic block diagram symbol.

FIG. 14 is an illustrative logic diagram of a multiplexing selector. The configuration shown is basically a 2-of-8 selector. The selection lines are labeled S0 through S3, and the input signals are labeled I0 through I7. A configuration of this type could be utilized for the Sel 2D 242 in FIG. 12b. The arrangement is such that the selection lines are maintained at the 1 level except for the pair of input signals to be selected. For example, when a 0 is applied to line S0 and 1's are applied to lines S1 through S3, only OR 350 and OR 352 will be conditioned such that the state of the input signals I0 and I4 respectively, will be translated. The 1 signal on line S1 will force OR 354 and OR 356 to provide 1 output signals on the normal line irrespective of the I1 and I5 input signals. Similarly, when S2 is 1, it will force OR 358 and 360 to put out 1 signals irrespective of the input signals I2 and I6. The same holds true for the situation when S3 is 1, in which case OR 362 and OR 364 are over-ridden to provide 1 output signals irrespective of the state of I3 and I7. For that configuration, it can be seen that when I0, is 0, OR 350 will provide a zero on line 366 to AND circuit 368. Since the input on line 366 is 0, AND circuits 368, 370, and 372 will all pass the zero signal through emitter follower 374 to the D output. If I4 is a 1, the output from OR 352 on line 376 to AND 378 in conjunction with the 1 provided from OR 356 will cause the 1 to propagate therethrough. Similarly the 1 will propagate through AND circuits 380 and 382 through emitter follower 384 to the D2 output. Therefore, the selection of I0 and I4 will pass out to the D1 and D2 output terminals. The complement signal provided by OR 350 for this example will be a 1 on line 386, which signal will pass through emitter follower 388 to OR 390 resulting in a 1 output signal on line D1. This indicates the complement of the value of selected signal I0. The disabled OR circuits 354, 358 and 362 will each provide a 0 to its respective associated emitter follower 392, 394 and 396, thereby allowing the selected input I0 to control the output on line D1. For the 1 applied to OR 352, a 0 signal will be provided on line 398 to emitter follower 400, which in turn will be provided to OR 402. The OR circuits 356, 360 and 364 will provide 0 signals to respectively associated emitter followers 404, 406 and 408. For this configuration it can be seen that OR 402 has all 0 signals applied to it thereby resulting in a 0 output signal to ouput line D2. Tracing the logic through for all other combinations will illustrate that the select line that is driven to 0 while holding the other select line at the 1 level and will result in the selection of the designated input bits. For a configuration where only a 1 or 4 selection is necessary, the circuit can be split. For those configurations where 3-bits must be selected, for example 3A label 264 in FIG. 12a, another segment of logic identical to the two illustrated would be utilized and subject to the extension of the same control lines.

Figures 15, 15D:
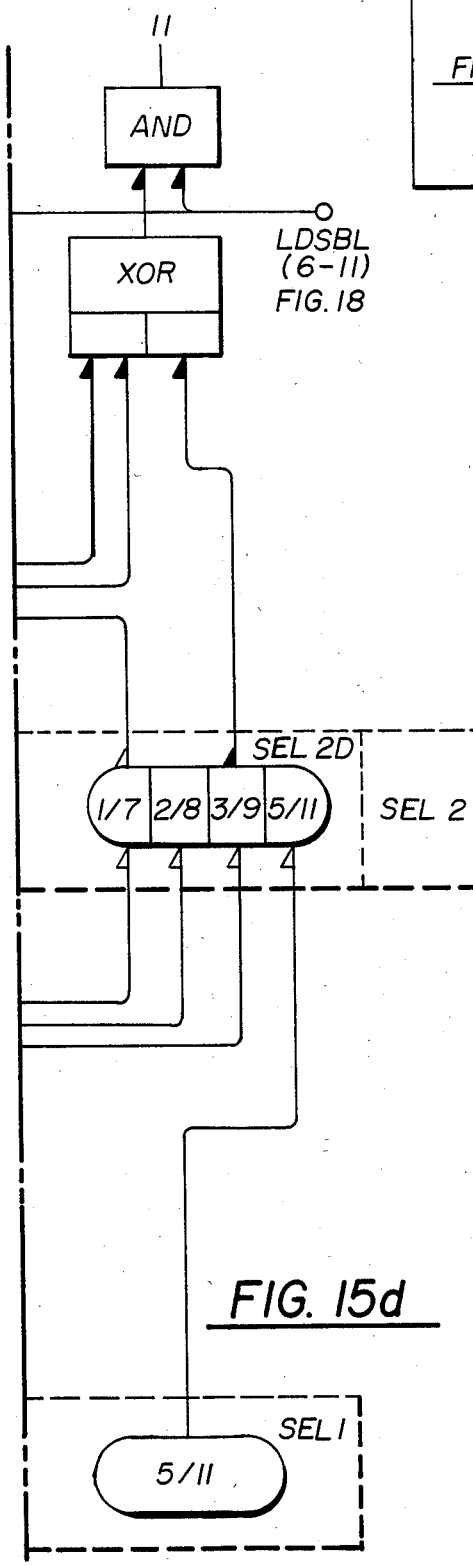
FIG. 15a and FIG. 15b, when arranged as shown in FIG. 15 is a logic diagram of the Per j Read select paths.
Figure 15A:
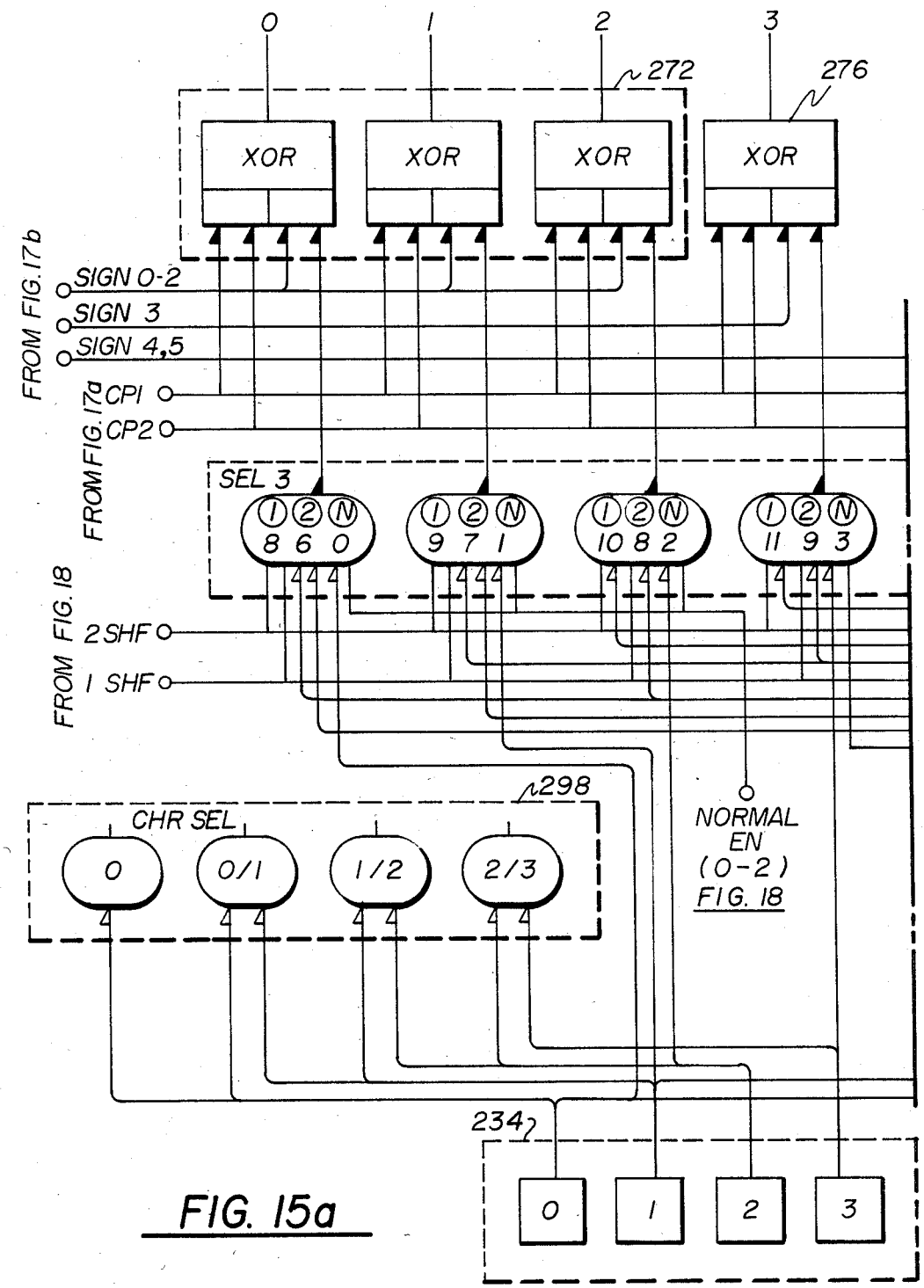
Figure 15B:
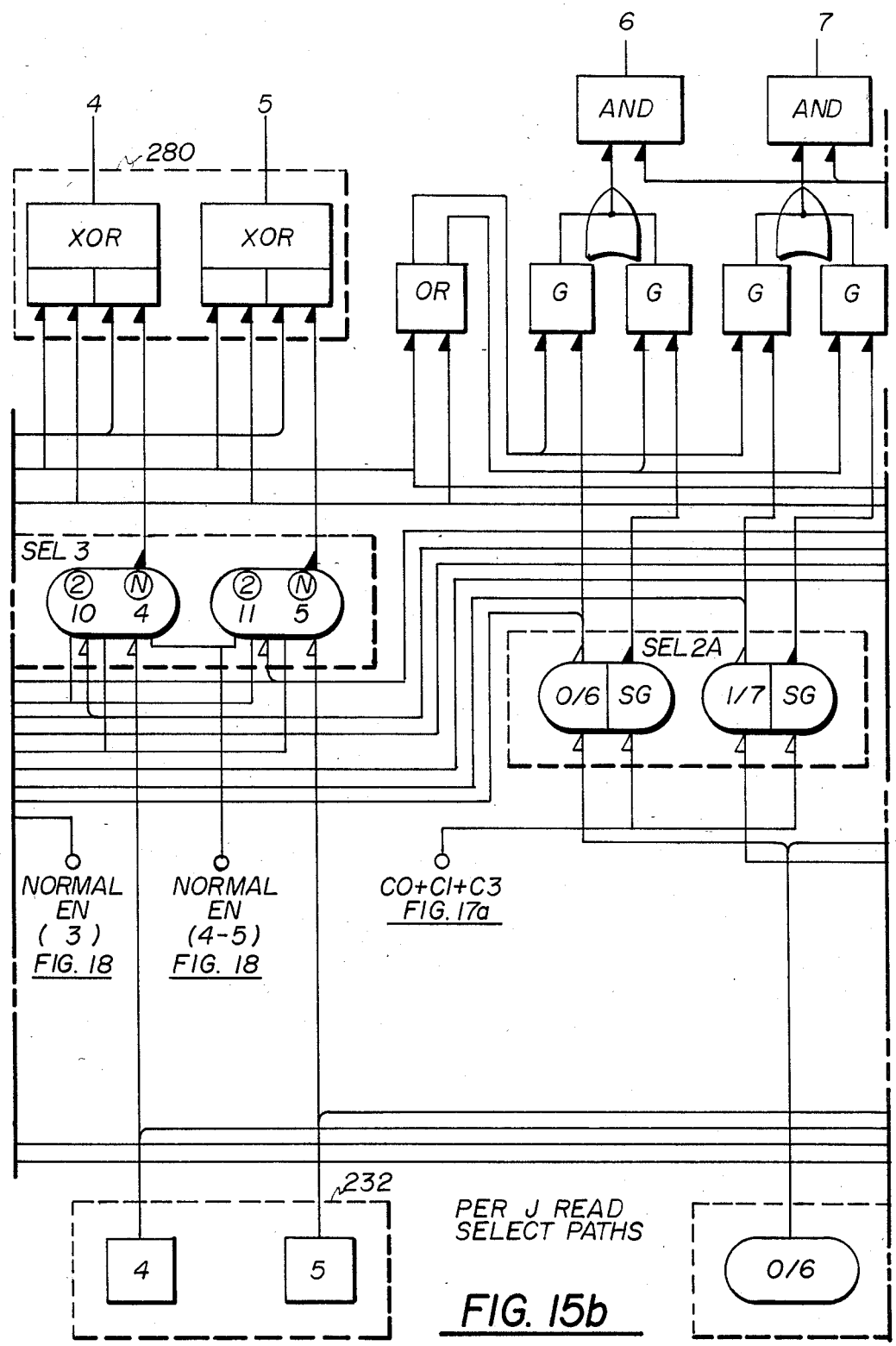
Figure 15C:
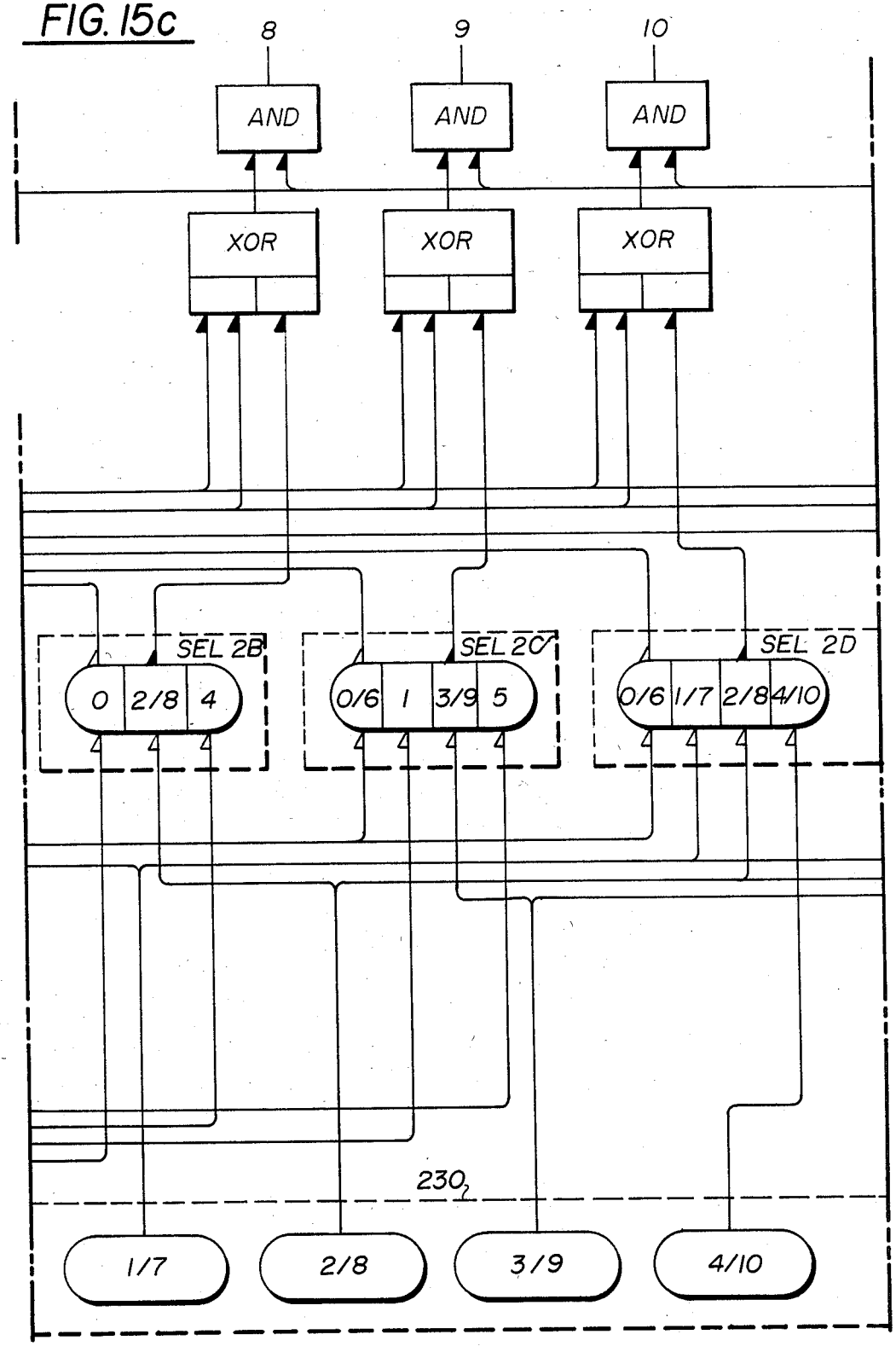

FIG. 15a and FIG. 15b, when arranged as shown in FIG. 15, is a logic diagram of the select paths. This diagram illustrates in more detail the selection paths described in FIG. 12a and FIG. 12b. To the extent possible elements that are similarly shown bear the same reference numerals. In the logic digrams, the closed arrowhead indicates a high signal and a logical 1, while the open arrowhead indicates a low signal or a logical 0. Elements that are shown separately within a function previously described are shown enclosed within dashed blocks bearing the same reference numerals. In the detail operation, the complementing is under control of signals CP1 and CP2, Complement Control circuitry described and shown in FIG. 17a and FIG. 17b. The selection signals for SEL 1, and SEL 2 will be described and illustrated in detail in FIG. 16a, FIG. 16b, FIG. 16c and FIG. 16d. The Shift Control for SEL 3 is illustrated and described in detail with reference to FIG. 18.

PjR—SELECTOR CONTROL

Figure 16A:
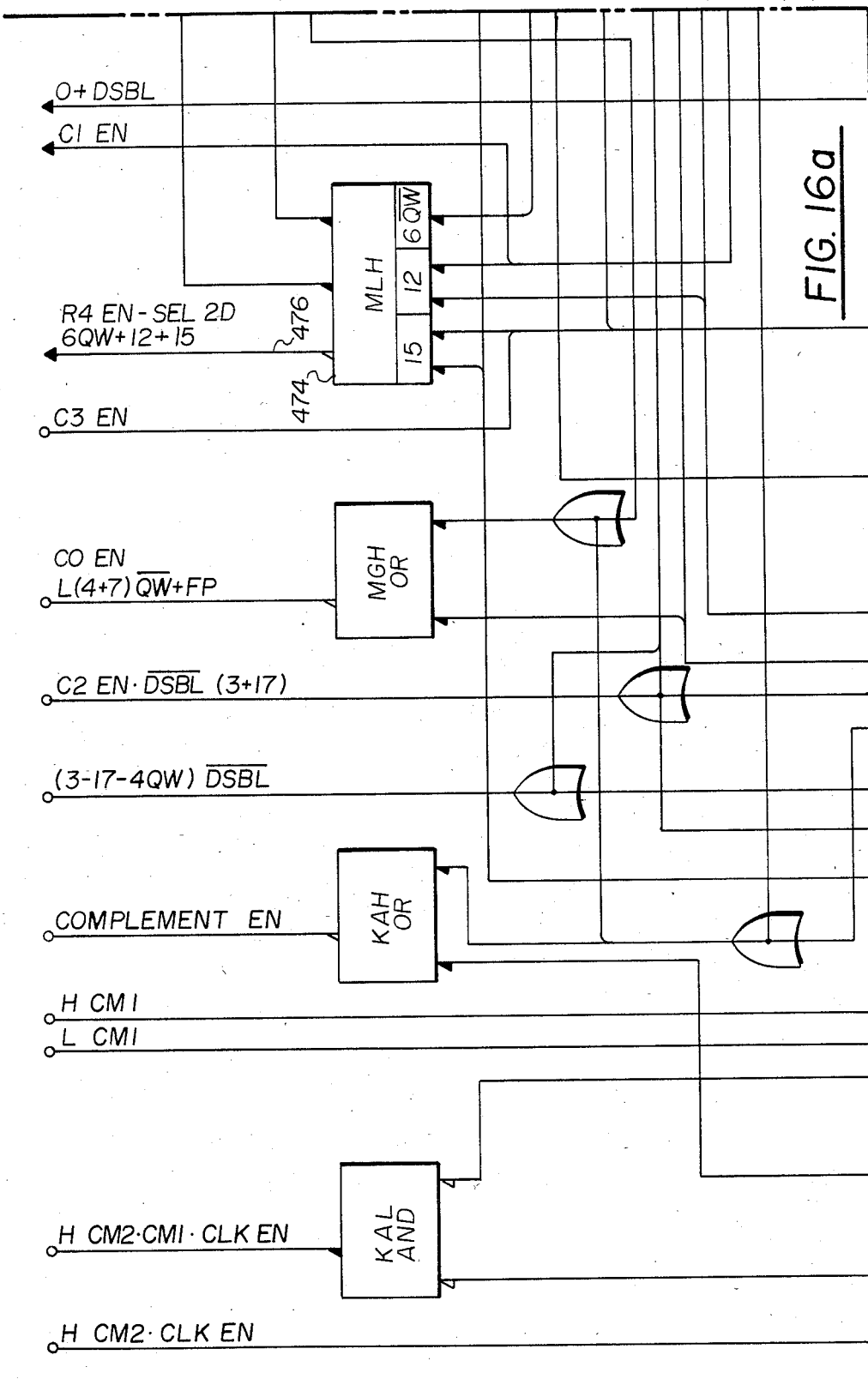
Figure 16B:
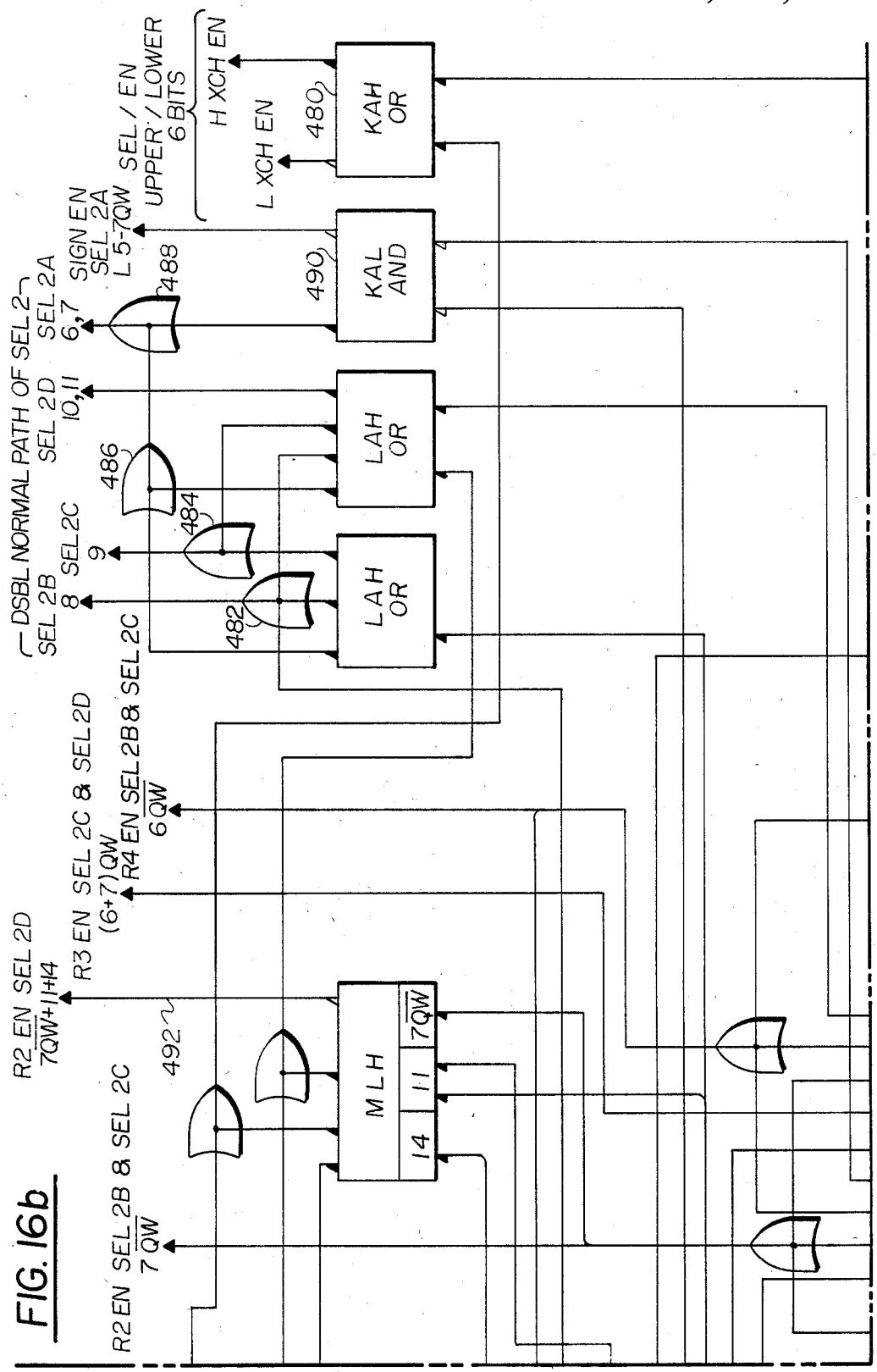
Figure 16C:
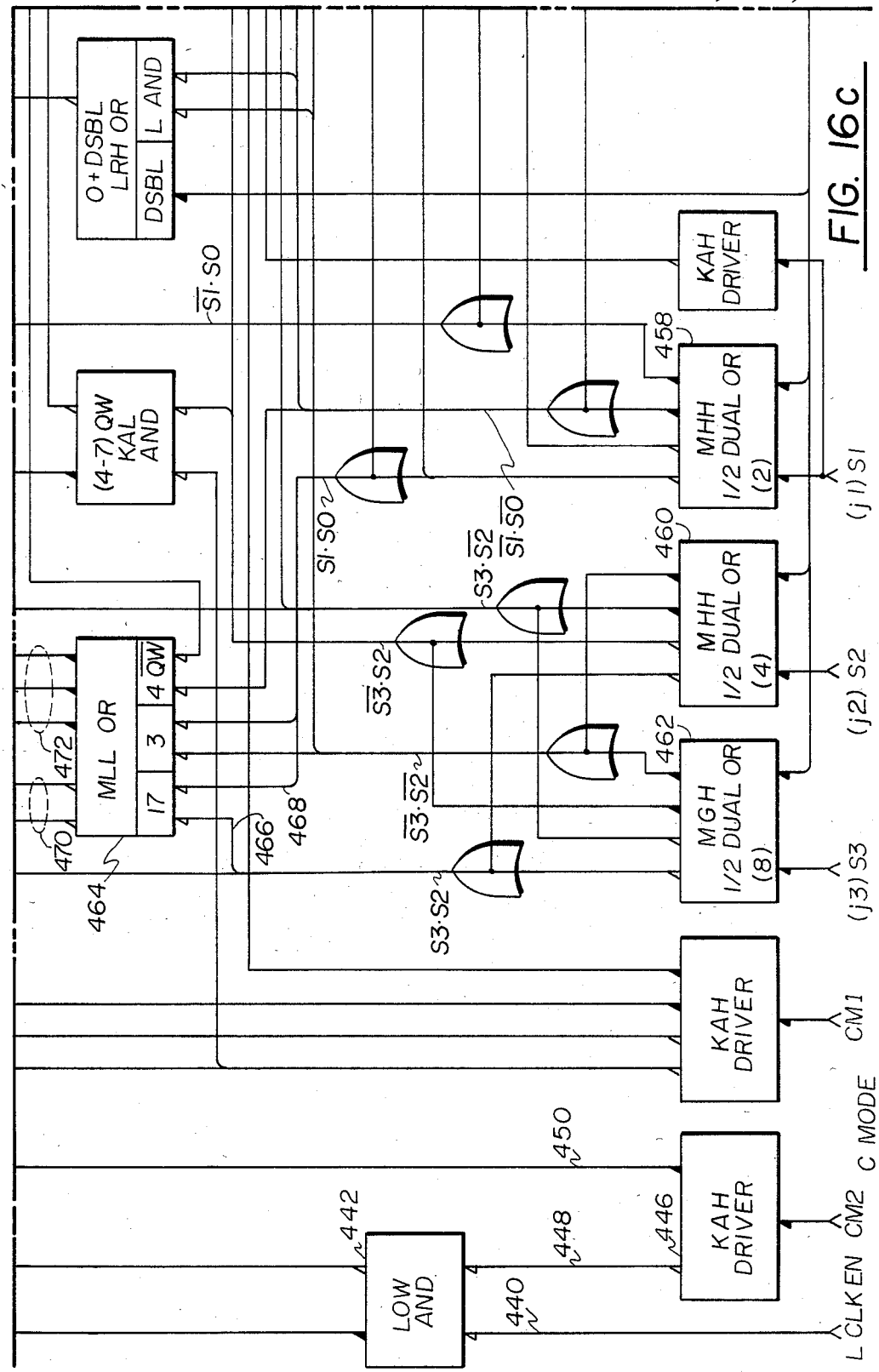

FIG. 16a through FIG. 16d, when arranged as shown in FIG. 16, is a logical diagram of the Per j Read Selector Control. This portion of the Control circuitry 220 operates to respond to the j-field, designated as signals S0 through S3, the C Mode signals (CM), the Clock Enable (CLK EN), and the Disable (DSBL). (See FIG. 13c.) The CLK EN is applied on line 440 to low AND 442. The 2-bit of the C Mode signals applied on line 444 to Driver DR 446. Drivers of this type provide both the true and complement output signals from that designated at the input. For example, a 1 occurring on line 444 will result in a Low or 0 signal on line 448 and the High, or 1 value, on line 450. The arrowhead convention is that previously described. The DSBL signal (ENBL) is applied on line 452 to DR 454, which operates to control the functioning of OR circuits 456, 458, 460, and 462, thereby overriding the j-field bits when present. It will be noted that OR circuits 456, 458, 460 and 462 provide both the true and complement output signals designated by the arrowhead status. The translation of the j-field bit combinations are labeled at the output of the wired OR function. The MLL circuit 464 logically provided the OR function for three AND input circuits, and provides both the true and the complement output signals. For example, if the left-most AND circuit receives a Low signal on line 466 and a Low signal on line 468 the Low AND condition will be satisfied, and the OR portion of the circuit will provide Low output signals on lines 470 and High output signals on lines 472. Similarly, pairs of Low signals to either of the other input pairs, will result in the same output conditions. Circuit 464 can be designated a Low AND-OR circuit. The MLH circuit 474 is a 3-AND input to the OR portion of the circuit. The AND input circuits are High ANDs resulting in a Low signal on line 476 when any of the three input AND circuits are satisfied by High signals. The control signals CN required to perform the Selector Control and to control the sign filling and complementing function are labeled at the output. Each of the macro elements includes the macro designation, and where appropriate, indicates the signal combinations being determined. The various combinations of input signals through the Selector Circuitry can be traced by those skilled in the art, and it is not deemed necessary to describe in detail each circuit interconnection and all of the multitude of combinations that exist.

The combinatorial logic results in the generation of selection Enables to be directed to the Selectors SEL 1 and SEL 2 illustrated in FIG. 12a and FIG. 12b, and shown in more detail in FIGS. 15a and 15b. The selection of the upper 6-bits or lower 6-bits made by SEL1 is controlled by the output signals from OR 480. The output signals from wired OR circuits 482, 484, 486, 488 determine whether or not the Normal path of SEL 2 will be utilized. High signals resulting from these wired OR circuits will Disable the Normal path. The SIGN EN for SEL 2A is derived from Low AND circuit 490. The Right Shift Enables for the individual Selectors within SEL 2 are identified along with the signal combinations necessary to satisfy the indicated Right Shift Enables. The numerical indication relates to the octal value of the j-field (CNT) and it is understood that the Quarter Word (QW) indications is externally generated and is coextensive with the C Mode bit 1. For purposes of illustrations, the R2EN SEL 2D signal provided on line 492 will occur when the condition of a j-field of 7 and QW is not present, or a j-field of 11, or a j-field of 14 is present. These conditions define the Right Shift of 2 for the SEL 2D. The other indications for the right Shift Enables are similarily denoted. In addition to the Shift Enable, the Selector Control circuitry functions to generate control signals for use with the Sign Fill and Complement Control circuitry illustrated in FIG. 17a and FIG. 17b, and with the Shift Control illustrated in FIG. 18. As previously described, the signal combinations of the combinatorial logic elements leading to the output lines are indicated by the output terminals.

The Selector Control results in the selection of the field of data signals to be extracted from the input operand, and indicates the degree of shifting necessary to accomplish the right justification. As previously, SEL 3 is operative to further shift the justified field of data bits to a designated shifted position.

The Selector control circuitry also functions to provide the appropriate Enable signals for the Sign Fill selection.

Figure 17A:
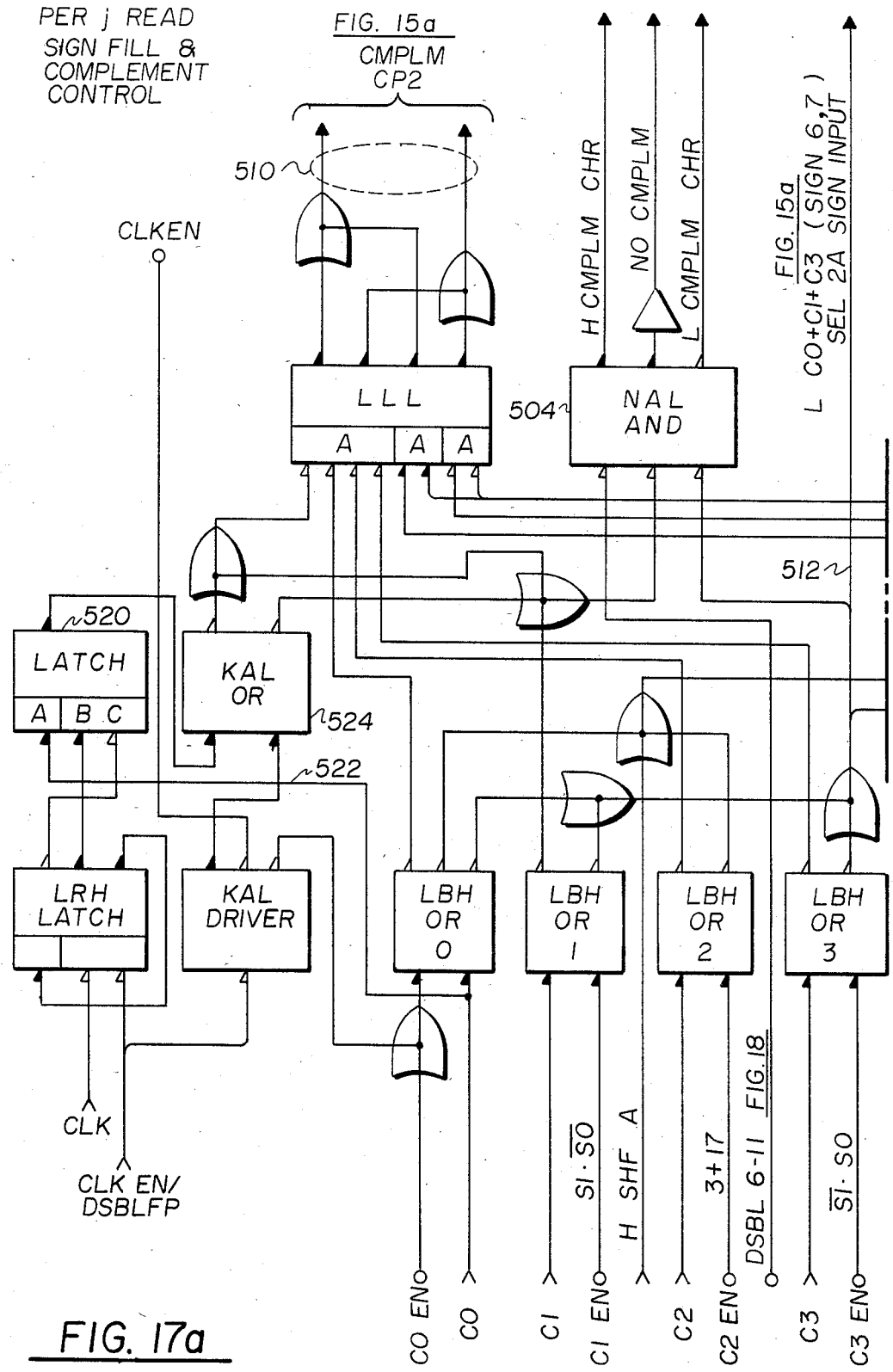
FIG. 17a and FIG. 17b, when arranged as shown in FIG. 17, is a logic diagram of the Sign Fill and Complement Control circuitry for Per j Read circuit.
Figure 17B:
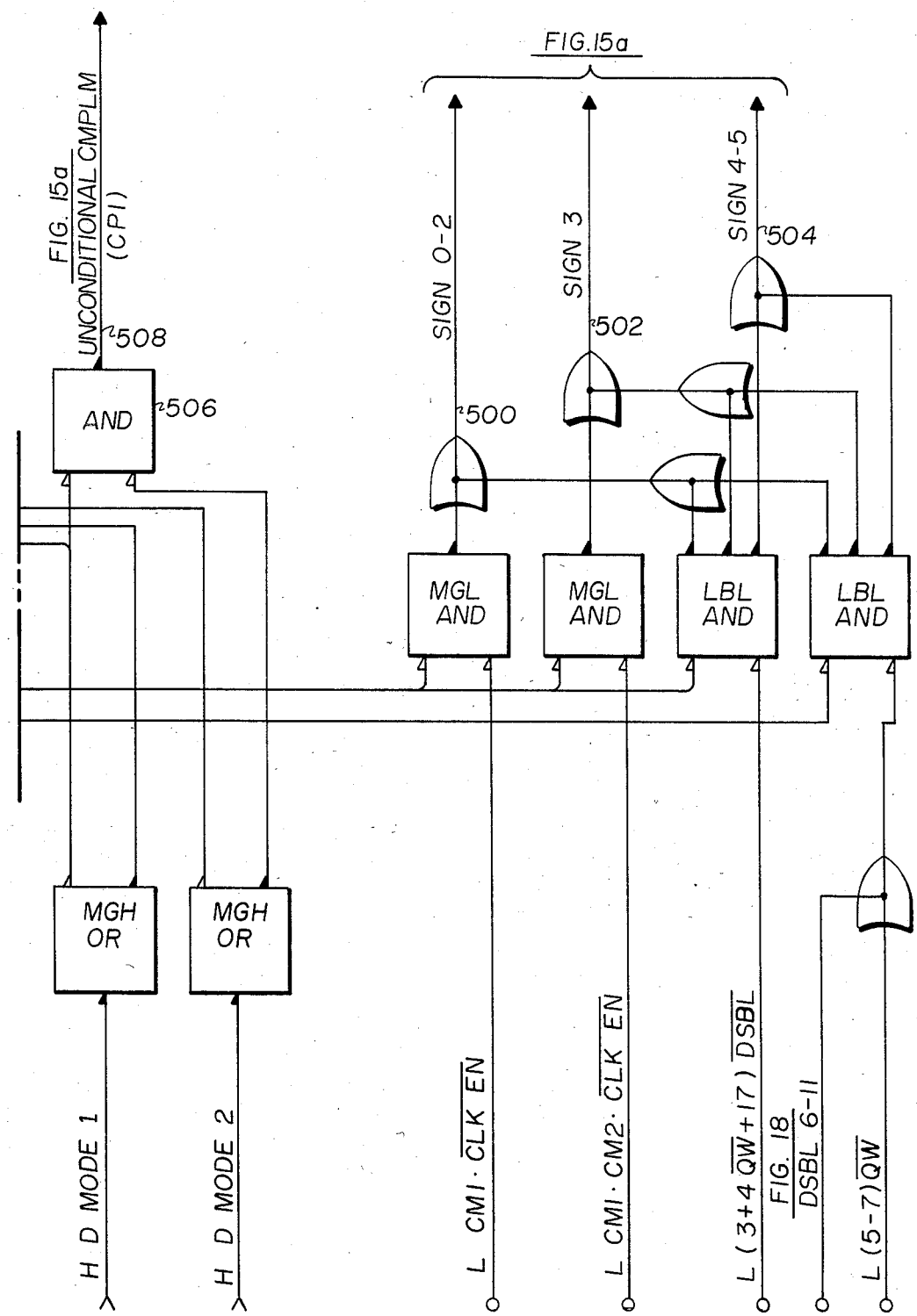

FIG. 17a and FIG. 17b, when arranged as shown in FIG. 17 is a logic diagram of the Sign Fill and Complement Control circuitry. The Sign signals are applied to input terminals C0, C1, C2 and C3. The sign Enable signals, which are developed on FIG. 16a, are provided for selecting the appropriate Sign for the Filling function. The Sign signals are utilized in conjunction with the D Mode signals, the Clock, the Clock Enable, together with the indicated control signals, the output of which are defined on FIG. 16a, to generate the Sign Filling selections provided as output signals on line 500, 502 and 504. These signals are utilizied in FIG. 15a.

The Unconditional Complement (CMPLM) identified as CP1 is derived from circuit 506 on line 508 and is utilized as a control signal on FIG. 15a. The conditional Complementing, indicated by signals CP2 provided on line 510 result from an evaluation of the status of the D Mode signals and the Sign selected.

The output on line 512 is the selection of the SIGN inputs for SEL 2A.

The floating-point operands, when in the Double Precision mode, require two passes through the reformat network. As previously indicated, the Sign of the Double Precision operand is the 0-bit of the first word. In order that the Complement be properly handled, it is necessary to capture the operand Sign (C0) for use on the second pass. Accordingly, Latch 520 is set by the signal applied from C0 on line 522. This Sign signal is available through OR circuit 524 for use on the second pass in the absence of the Clock Enables.

Figure 18:
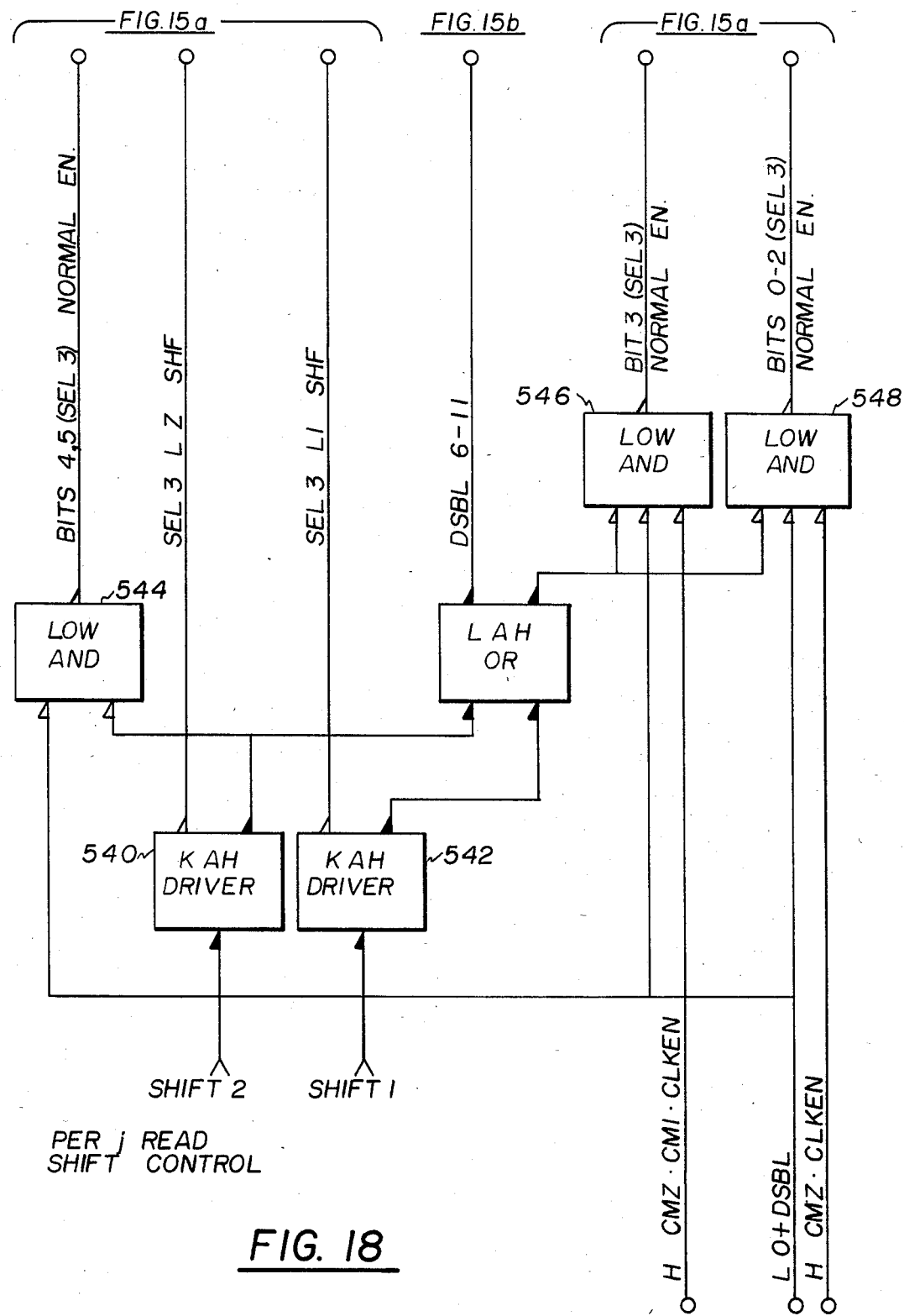
FIG. 18 is a logic block diagram of the Shift Control for the Per j Read circuit.

FIG. 18 is a logic block diagram of the Shift Control. The Shift (SHF) signals are received and are used to control Driver circuits 540 and 542 for providing the L1 or L2 SHF control signals for SEL 3. Low AND circuits 544, 546 and 548 provide the Normal Enables for SEL 3, dependent upon the state of the Shift selection signals and the control signals generated and defined on FIG. 16a.

PjR—SUMMARY

The operation of the preferred embodiment for the Per j Read circuits has indicated several data formatting operations and options. These options have been described generally and in detail. The operation is much that programmably selected ones of a plurality of fields of data signals are extracted under program control and justified to predetermined positions. In the embodiment described right-justification is employed. The selection of fields of data signals is responsive to the j-field (count) from the instruction word, the C Mode signals and the control signals.

Figure 19B:
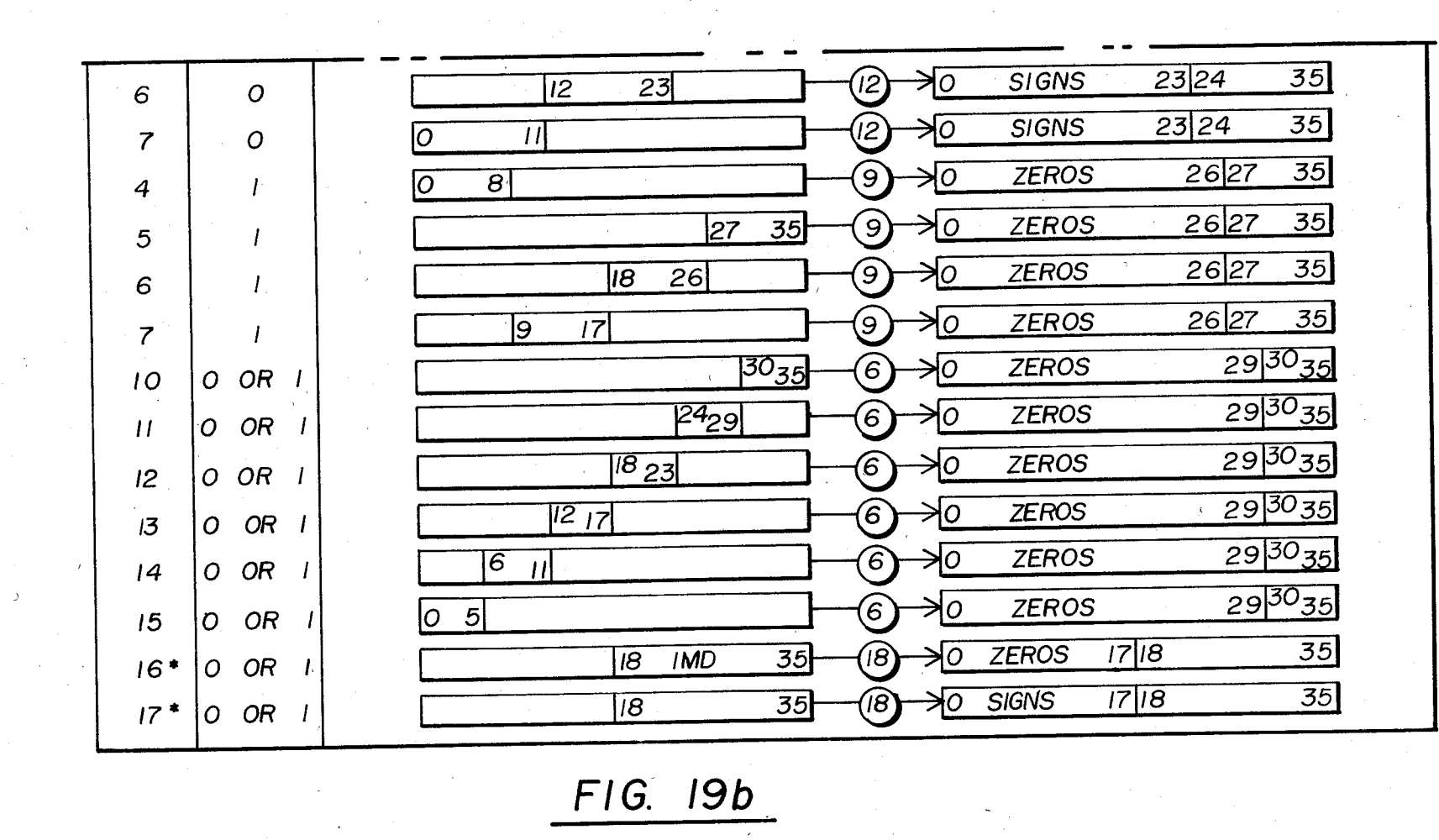
Figure 19:
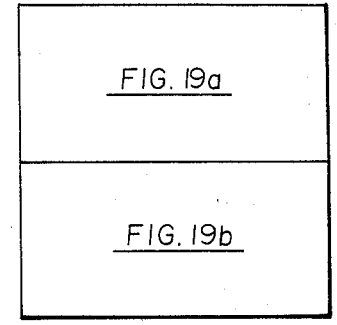
FIG. 19 illustrates the plurality of Read fields of data signals that are selectable and reformatted by the indicated j-field count and control signals for Per j Read circuit.

FIG. 19 illustrates the plurality of read fields of data signals that are selectable and reformatted by the indicated j-field count and Quarter Word/C Mode selection. The Storage Location column identifies the various fields of data signals. The Arithmetic Register column illustrates the justification of the associated selected fields of data signals.

Figure 20D:
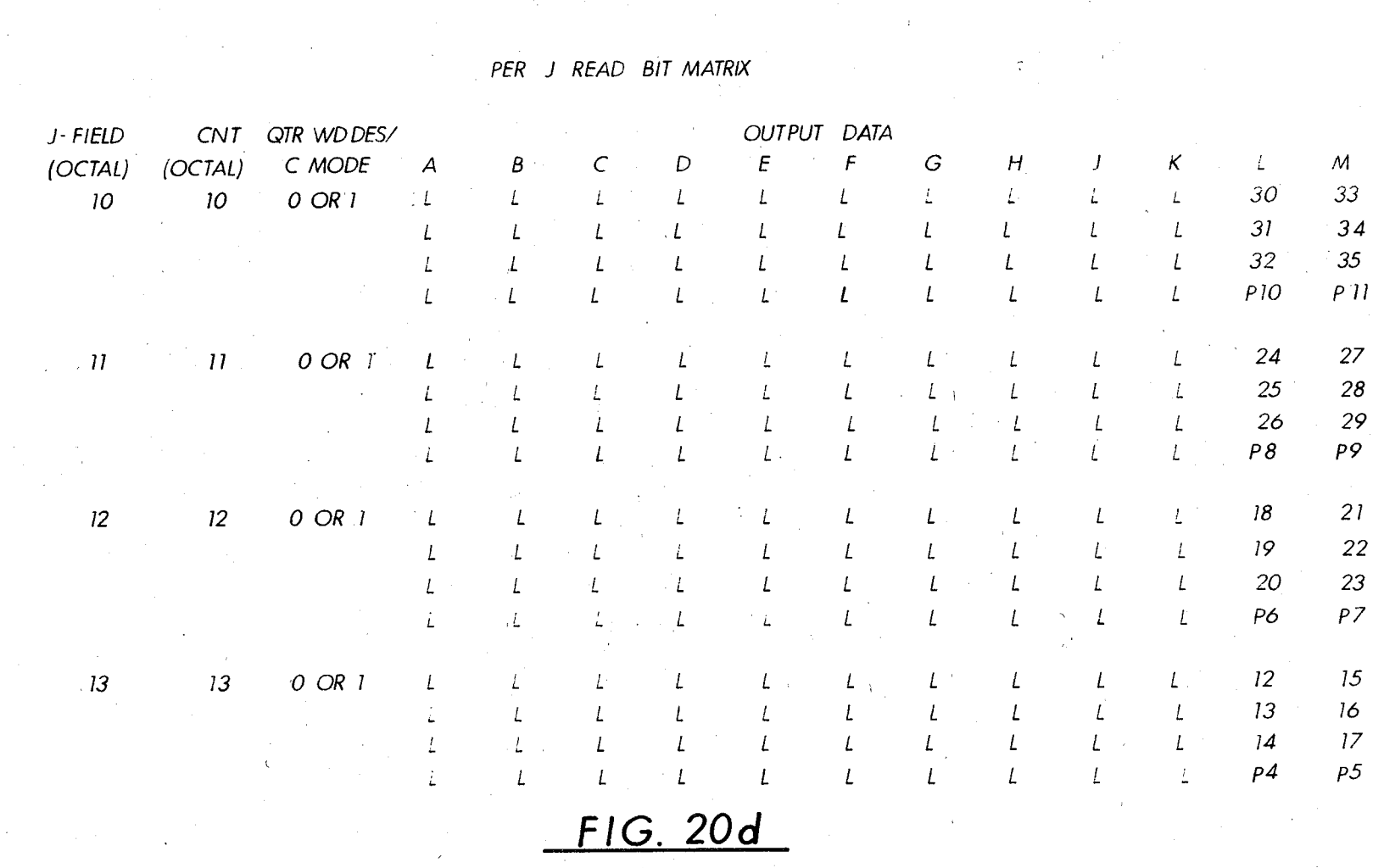

The interleaving of data signals (bits), as applied to the Per j Read Network, has been described. The interleaving of bits and the partitioning of the Per j Read Network is such that the Parity bits for data bit groupings is handled by an identical Per j Read LSI chip. Fig. 9a and FIG. 9b illustrate the entire Per j Read Network comprised for four identical LSI chips. Due to the large number of reformatting options that can be specified by the j-Field and C Mode signals, with the selection of zero or sign fill, it would be unduly complex to describe the bit configurations for each such selection. To illustrate the field extraction, justification and sign or zero fill options, a matrix has been developed for each of the read options, a matrix has been developed for each of the read option selections. FIG. 20a through FIG. 20e, when arranged as shown in FIG. 20, is the Per j Read Bit Matrix illustrating the bit output configuration for each of the four LSI chips for the j-field and C Mode selections. The field selection, justification and zero or sign fill is for operands that are not in floating-point format. A consideration of the maxtrix illustrates that the correct 3-bit parity (P0 through P11) is maintained after justification for the selected bits.

FIG. 21 is a matrix representation of the bit output configuration for the Per j Read Network in the floating-point mode for the C Mode selections. The Output Data is interleaved and represents the two forms of mantissa that can be reformatted. The bit configuration for each of the LSI chips is shown. C Mode selection of 2 results in the A, B , and C Ouput Data lines being Low, and selects the Characteristics to be expressed in three bits (P, R, S) for each chip, with N being Low. As in field selection reformatting, the parity signals are adjusted in bit groupings and are maintained as the characteristics and mantissas are separated. A C Mode selection of 3 results in a 4 bit per chip characteristic, that is 12 bits total, and Output Data lines A, B, C and D being filled Low for each chip.

It will of course be recalled from above, that the decisions relating to complement, noncomplement, magnitude, and further positioning, all occur after the fields of data signals have been selected and right justified with zero or sign fill.

SYSTEM MODULUS

The foregoing description has been with regard to a system modulus of three. The data word is comprised of a number of data signals (bits) that is an integer multiple of the modulus. LSI chips are partitioned to allow three identical chips with the input data being interleaved on 3-bit intervals. When so arranged, the LSI chip for reformatting parity is identical to the chips for reformatting data. These factors have been described in detail with request to the Per j Read Network. The same modulus conditions will be described in detail below for the Per j Write Network.

Figure 22:
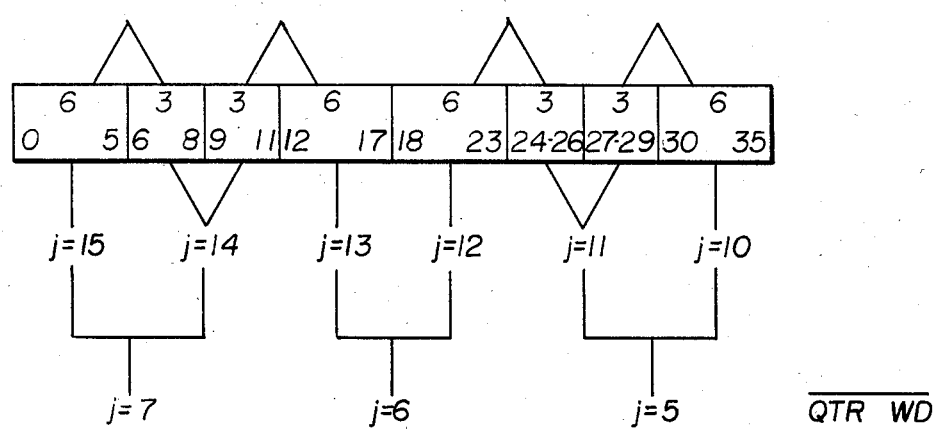
FIG. 22 illustrates the selectable fields of data signals to be selected for a system modulus of three.

FIG. 22 illustrates the selectable fields of data signals to be selected for a modulus three data format system.

While a system modulus of three has been described and is advantageous for the data words and data fields to be selected, it is clear that the same inventive concepts apply equally to systems that would have a greater or smaller system modulus, that is modulus n, where n is a positive integer greater than 1.

The number of LSI chips should match the selected system modulus, provided all circuitry is not on a single chip, and the data bit interleave should match the selected system modulus. Preferably, parity is on data bit groupings matching the system modulus so that an identical LSI chip can be used for parity adjustment for the various field selections.

PjW—GENERAL DESCRIPTION

The PjW is a special purpose integrated circuit utilized in an interleave of three configuration to perform several functions involving floating-point instructions, data field extraction, and constant generation, and data field insertion. As a system PjW operates to extract a right-justified field from the data at its input and inter it in a specified field in its output data. In this regard its circuit performs the inverse function of the Per j Read described above. PjW also functions to extract the characteristic from a floating-point number and place it on a specified output line, this function being utilized when floating-point instructions are being unpacked. The unpacking relates to the separation of the characteristic from the mantissa portions of the floating point operand. PjW also functions to extract the low-order 9 or 12 bits from the incoming data and place the extracted bits on the characteristic output lines. This extraction and manipulation is utilized when floating-point operands are being repacked. Finally, PjW functions to generate special constants that might be specified by instructions requiring the storing of specified constant values.

The control signals for the various functions are derived from the instruction word from the f-field, the a-field and the j-field.

PjW—FUNCTIONAL DESCRIPTION

The various functions are determined by the control signals provided from the Function Code Control 40, which identify the type of instruction being performed and provides appropriate control signals. These control signals are generated in response to the f-field, the a- field and the j-field for the instruction. In this way, all of the shifting, extraction, sign filling, zero filling, and floating-point unpacking and packing, and constant generation, separately provided in prior art systems are accomplished at faster rates by the PjW Network.

FIG. 23 is a block diagram symbol for the Per j Write chip for handling a 12-bit portion of the input operand. It illustrates inputs including a 12-bit input data field selected from the input operand, selectively identified as 1D. The system functions on an interleave of three, as will be described in more detail below and relates to the system modulus previously described. Selected sign bits are applied to the 2D field. Data bits 24 and 27 are applied to the 3D field. The count 1 (CNT) receives a Low Enable (EN) and the three higher order bit of the j-field. In Per j Write, the lowest order bit of the j-field is not used. The C Mode is indicative of the Control Mode and is applied to the CM inputs. The D Mode is indicative of the Data Mode and is applied to DM inputs. The Count 2 field is utilized to receive Constants indicated by the A value specified by the instruction. The Group selection signals are applied to the GP input terminals and identify the position of each PjW chip in the system. The Fill will determine whether there is a zero fill or a sign fill, and are applied the F input terminals. Twelve data output signals are provided on output terminals A through M, and the characteristic output is provided on output terminals N, P, R, and S.

Figure 24A:
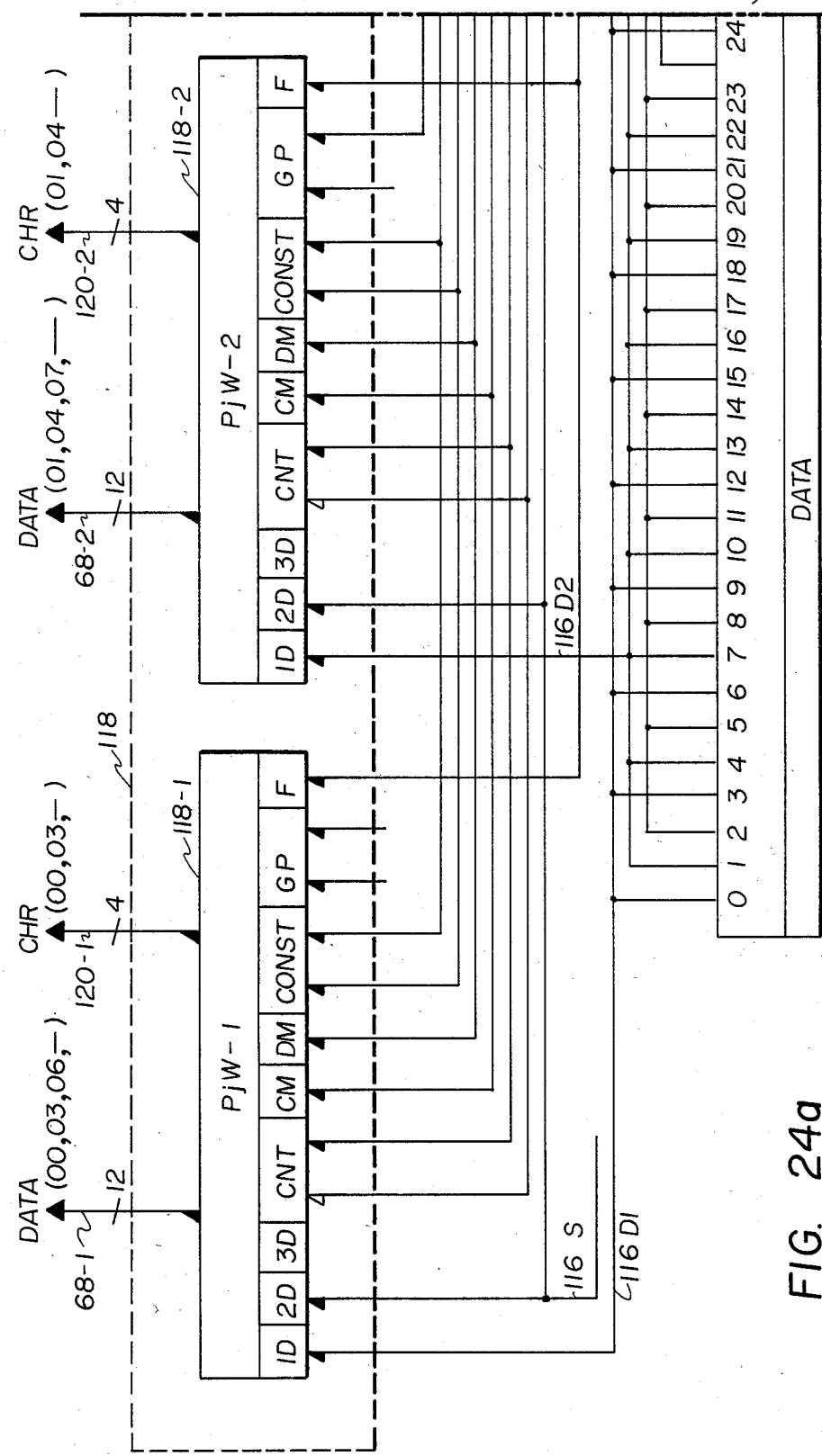
FIG. 24a and FIG. 24b, when arranged as shown in FIG. 24, is a logical block diagram of the Per j Write Network illustrating the interconnection of four identical LSI chips to accomplish the data formatting for writing or floating-point packing and unpacking.
Figure 24B:
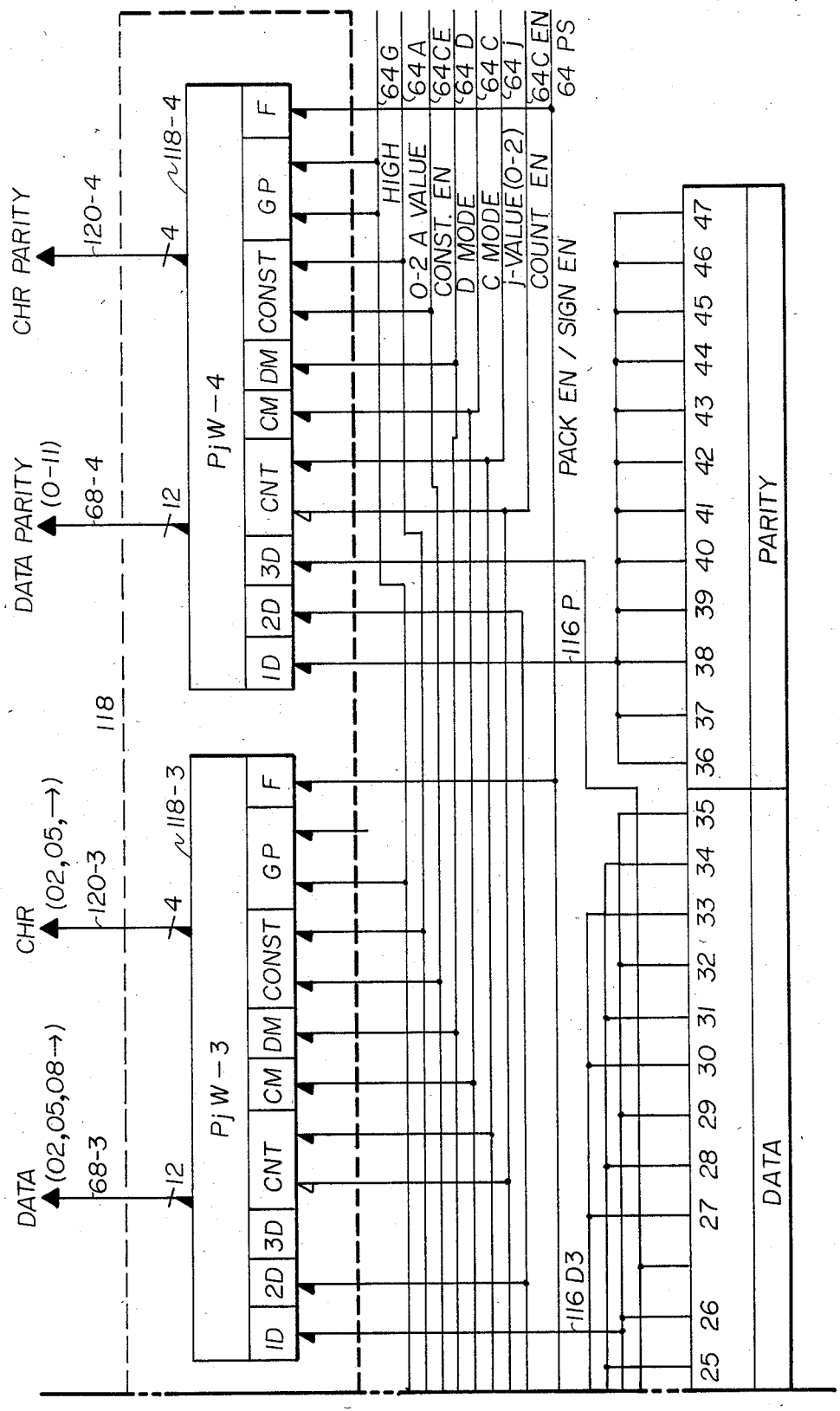

FIG. 24a and FIG. 24b, when arranged as shown in FIG. 24, are a logical block diagram of the Per j Write Network, and illustrates the interconnection of four identical LSI chips to accomplish the data formatting, for writing or floating-point unpacking. The Per j Write is shown enclosed in dashed block 118, and is comprised of PjW circuits 118-1, 118-2, 118-3, and 118-4. The thirty-six data bits are received and are partitioned between the four LSI PjW circuits in a manner similar to that described above with regard to PjR. PjW-1 receives bits 0, 3, 6, ... 33 on line 116 D1; PjW-2 receives bits 1, 4, 7 ..., 34 on line 116 D2; PjW-3 receives bits 2, 5, 8, ..., 35 on line 116 D3; and PjW-4 receives all twelve parity bits on line 116 P. By interleaving the data bits in this manner, it is possible to use four identical LSI circuits, since no matter which field is selected for extraction or combination, a portion of that field is handled on each LSI circuit. The sign bits 2D1 and 2D2 are applied on line 116S to all PjW circuits. The input control signals include the higher ordered three bits of the j-Field on line 64j, the Count Enable on line 64C EN; the C Mode on line 64C; the D Mode on link 64D, the Constant Enable on line 64 CE; the constant A value on line 64A; the Group Count on line 64G; and Pack Enable/Sign Enable on line 64PS. The data output signals appropriately formatted are provided on line 68-1, 68-2 and 68-3 with associated parity bits on line 68-4. The Characteristic output signals are provided on lines 120-1, 120-2, 120-3 and 120-4, thereby comprising a 12-bit Characteristic with a 4-bit characteristic parity.

PjW—FUNCTIONS

The specific functions performed by the Per j Write Network are described as follows:

Transfer a full data word and its associated parity bits without alteration, for this embodiment comprising a full 36-bit data word and its associated 12-bit parity field, or if specified by the instruction, the complement thereof;

Extract the low order 6-bit, 9-bit, 12-bit or 18-bit field from the incoming operand, and insert the selected field in a specified field in the output word, or complement the selected field prior to insertion, as determined by the instruction word;

Insert an internally specified constant in a specified field of the output word, as determined by the instruction word;

Extract the low order 8-bits or 11-bits from the incoming operand and place the selected bits, right justified, on the twelve characteristic output lines, for use in single precision or double precision pack instructions, it being understood that the characteristic is never complemented in this mode of operation;

Extract the 9-bits or 12-bits of the characteristic from the incoming floating-point operand, and place it, right justified, on the characteristic output lines and zero fill unused high order bits of the right justified characteristic, and sign fill the high order bits of the original operand for the positions from which the characteristic is extracted, and complement the entire characteristic if the sign of the input operand is negative;

Generate one of the following constants as specified by the a-Field of the instruction—binary0's, binary 1's = 1, −1, FIELDATA spaces (05 octal,) FIELDATA 0's (60 octal), and ASCII spaces (40 octal), ASCII 0's (60 octal), it being understood that the Group fields must be connected as shown in FIG. 24a and FIG. 24b to generate the specified constant.

PjW—CONTROL SIGNALS

The signals that control the operation of the Per j Write Network are illustrated in FIG. 23, each of which signals and their functional relationship will be described below.

PjW—COUNT ENABLE

The COUNT ENABLE (CNT EN) is active when a low signal is present for instructions that provide the write function, and is operative to enable the transmission of the j-Field to the PjW Network.

PjW—j—FIELD INTERPRETATION

The count signals that comprise the j-Field of the instruction, when enabled by the COUNT ENABLE, select the designated right justified field of data bits for insertion in the specified output field according to the following field designation:

| j-FIELD COUNT (OCTAL) | FIELD INSERTION ARITHMETIC STORAGE |
|---|---|
| 0 | 00–35 |
| 1 | 18–35 TO 18–35 |
| 2 | 18–35 TO 0–17 |
| 3 | 18–35 TO 18–35 |
| 4 | 18–35 TO 0–17, CMODE = 0 |
|   | 27–35 TO 9–17, QW |
| 5 | 24–35 TO 24–35, CMODE = 0 |
|   | 27–35 TO 27–35, QW |
| 6 | 24–35 TO 12–23, CMODE = 0 |
|   | 27–35 TO 18–26, QW |
| 7 | 24–35 TO 0–11, CMODE = 0 |
|   | 27–35 TO 0–8, QW |
| 10 | 30–35 TO 30–35 |
| 11 | 30–35 TO 24–29 |
| 12 | 30–35 TO 18–23 |
| 13 | 30–35 TO 12–17 |

-continued

| j-FIELD COUNT (OCTAL) | FIELD INSERTION ARITHMETIC STORAGE |
|---|---|
| 14 | 30–35 TO 6–11 |
| 15 | 30–35 TO 0–5 |
| 16 | No Transfer |
| 17 | No Transfer |

PjW—C MODE INTERPRETATION

The four possible combinations of C MODE signals denote the following:

| 2 | 1 | MODE |
|---|---|---|
| 0 | 0 | NORMAL |
| 0 | 1 | QUARTER WORD |
| 1 | 0 | SINGLE PRECISION FLOATING-POINT |
| 1 | 1 | DOUBLE PRECISION FLOATING-POINT |

PjW—D MODE INTERPRETATION

The four signal combinations that comprise the DATA MODE selections specify the following selections:

| 2 | 1 | MODE |
|---|---|---|
| 0 | 0 | NORMAL |
| 0 | 1 | UCONDITIONAL COMPLEMENT |
| 1 | 0 | MAGNITUDE |
| 1 | 1 | MAGNITUDE |

PjW—CONSTANT ENABLE

The CONSTANT ENABLE is active when a High signal is present, and provides for processing the constant as specified by the a-Field.

PjW—GROUP

The GROUP field specifies the position of the particular Per j Write chip in the array as defined in FIG. 24a and FIG. 24b, the physical position identification being necessary for determination of selected constants.

PjW—FILL

The FILL selection determines the selection between one of two possible sign bits for sign filling, or alternatively selects zero filling. The following possible FILL combinations are utilized and interpreted as follows:

| 2 | 1 | FILL FUNCTION |
|---|---|---|
| 0 | 0 | 2D1 SIGN FILL |
| 0 | 1 | 2D2 SIGN FILL, FLOATING-POINT DISABLE |
| 1 | 0 | ZERO FILL, FLOATING-POINT PACK |
| 1 | 1 | ZERO FILL, FLOATING-POINT PACK |

PjW—TRUTH TABLES

FIG. 25 is a Truth Table that illustrates the various data reformatting configuration for the combinations of the j-Field count, the C Mode selections, the D Mode selections, and the CNT EN. The Truth Table, when considered in conjunction with the foregoing functional description and together with the hardware description that will follow, illustrates the capabilities of the reformatting system utilized for writing a selected field of data bits into a programmably selected positioned storage field. Reference made to FIG. 23 for identification of the input and output terminal designations for each PjW circuit.

FIG. 26 is a Truth Table that illustrates the various constants that will be generated for each of the PjW circuits, as designated by the G Mode (GROUP) selections, in conjunction with the Constant signals applied to the Count 2 lines when enabled by the Constant Enable (COUNT 2 EN).

FIG. 27 is the Truth Table illustrating the functioning of the Per j Write Network functioning in the floating-point mode. Again, reference to FIG. 23 for designation of input and output terminal identification and identification of control signals specified in the Truth Table.

FIG. 28 is a logic diagram of the data selection paths of the Per j Write element illustrated in FIG. 23. The circuit provides a specialized field selection and alignment function with regard to handling data signals it selects a right justified field and positions it for insertion in the designated data fields for storage for further manipulation. The circuit functions with respect to a selected data field of one-sixth, one-fourth, one-third, one-half or full data word. The size of the selected data fields will be positioned as determined by the j-field Count for insertion in the destination address. It will be recalled from a consideration of FIG. 24 that the data bits received are interleaved such that every third bit is associated with the particular circuit configuration. It will be recalled also from above that the data bit interleaves relates to the modulus of the reformat system, and would be adjusted for a modulus different than three.

Each of the PjW circuits includes a Selector Control 600 which receives the COUNT EN on line 6-2, the C Mode signals on line 604, and the COUNT on line 606. The COUNT (CNT) is derived from the j-field, and for this embodiment, utilizes only the three higher order positions of the j-field. The Selector Control 600 issues control signals CNW to all Selectors on line 608. These CNT signals will be described in more detail with regard to the detailed logic circuit diagrams.

The Complement Control 610 receives the D Mode signals on line 612 and the output of the Sign Selector 614 on line 616. The Complement Control issues signals on line 618 for controlling the condition of complementing the data output signals. This is accomplished by controlling the functioning of XOR 620 for the A through D output lines and the XOR 622 for controlling the E through M output lines. The Complement Control performs a function similar to that described with regard to PjR through interpretation of the D Mode signals.

The Sign Selector 614 receives a forced Low signal on lines 624, the 2D1 signals on line 626, and the 2D2 signal on line 628. These signal inputs describe the possible sign selections that will prevail. The actual selection of the sign is under the decode of the Fill (f) field, with the F1 signal being provided on line 630 and the F2 signal being provided on line 632 for controlling the operation of the sign Selector. It will be recalled from a consideration of FIG. 23, that the F field serves double duty, with F1 determining the sign fill in the situation when F2 is Low. When F2 is High or active, it designates a Floating-Point Pack selection with a Low fill. In addition to the control of the Complement Control 610, the Sign Selector provides a signal on line 616a to the Characteristic Path selection to be described with reference to FIG. 29, and on line 616b to the SEL 3, labeled 640.

The data signals are received on line 642 and are applied to SEL 1, labeled 644, which basically makes the selection of the upper half or the lower half of the data bits. The selected half of the data bits is provided on line 646 in the manner illustrated to SEL 2, labeled 648. The functioning of SEL 1, and SEL 2, are under the control of the Selector Control 600 and results in selected data bit positions being provided on line 650 to XOR 622, and on line 652 to SEL 3, labeled 640, for ultimate selection and output on line 654.

The Constant Generator 660 receives a CONSTANT EN on line 662 in conjunction with the Group (GP signals on line 664. As a result of the translation of the a-field of the instruction, a Constant is provided on lines 666. It will be recalled from a consideration of FIG. 23 that the GP signals will result in different treatment of the Constant depending upon the position of the PjW circuit in the matrix. The selected constant configuration will be provided on line 668 as an output to SEL 1, and will progress through the selection circuits in a manner similar to that of the description for the data signals.

SEL 1 also provides output signals on line 670 for use in the Characteristic selection, as will be described in conjunction with FIG. 29.

PjW-CHARACTERISTIC PATH SELECTION

Figure 29:
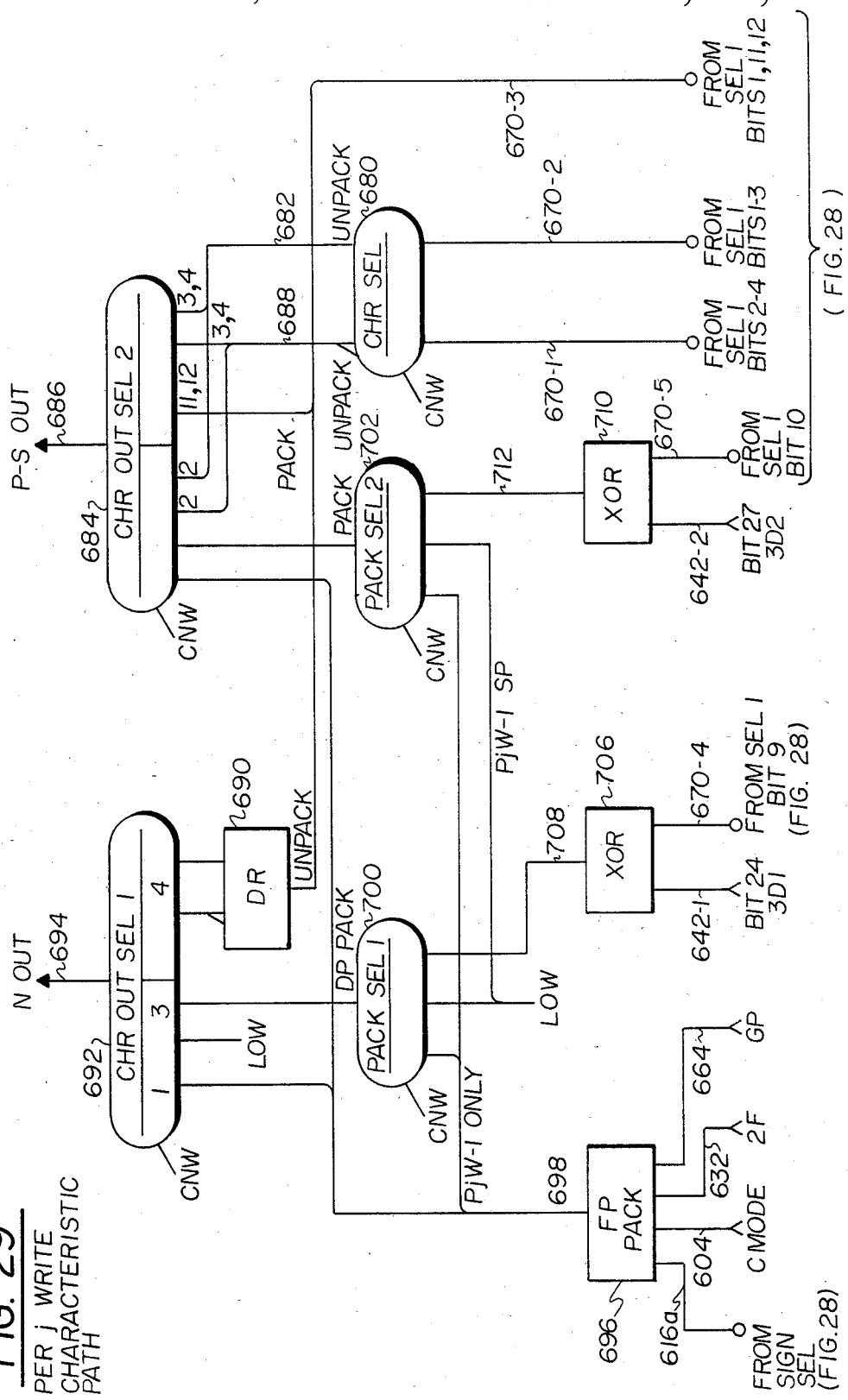
FIG. 29 is a logic diagram of the selection paths for the Per j Write circuit illustrated in FIG. 23 for the selection of characteristics and controlling the packing and unpacking of floating-point operands.
Figure 31C:
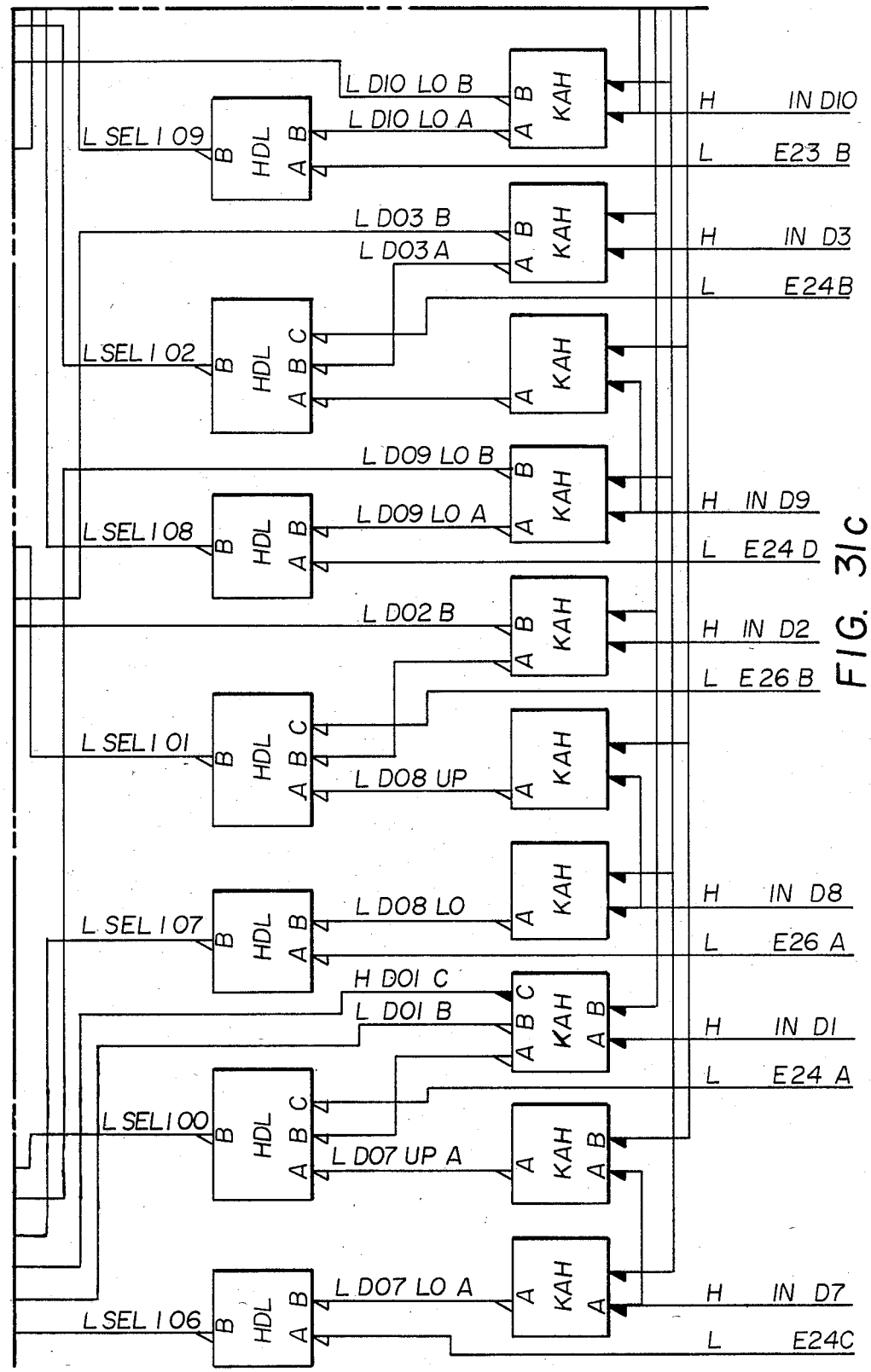

FIG. 29 is a logic diagram of the selection path for the Per j Write element illustrated in FIG. 23 for the selection of characteristics and controlling the packing of floating-point operands. It will be recalled from above that the system is capable of operating in two formats of floating-point systems. The single precision floating-point format has a characteristic that utilizes nine bits, thus resulting in three bits per PjW circuit. Alternatively, the double precision floating-point characteristic is comprised of twelve bits and utilized four bits per PjW circuit. It is of course essential when selecting a characteristic for packing, that is positioning the characteristic for recombination with the mantissa, that the characteristic be given the appropriate treatment and positioned to accommodate the selection between single precision and double precision.

The Characteristic Selector (CHR SEL) labeled 680, receives bits 1-4 from SEL 1 on lines 670-1 and 670-2. These signals are utilized for selecting the Characteristic and the CHR SEL 680 provides signals on line 682 to the CHR OUT SEL 2 684, for providing the P, R, and S output signals on line 686. Signals are also provided on line 688 for forming the selected Characteristic. Bits 1, 11, and 12 are received on line 670-3 by CHR OUT SEL 2, and by Driver 690. These bit positions are utilized by CHR OUT SEL 2 during the Pack operation, and by CHR OUT SEL 1, labeled 692, during the Unpack operation. The N output signal is provided on line 694.

The Floating-Point Pack (FB PACK) circuitry 696 will function during the packing operation under control of the GP signals received on line 664, the 2F signal received on line 632, and the C Mode signal received on line 604, in combination with the selected sign received on line 616a. The output signals on line 698 will be utilized to control PACK SEL 1, labeled 700, and PACK SEL 2, labeled 702. This control will be for PjW-1 only, and will establish the sign in the appropriate high order bit position of the characteristic for single precision packing and double precision packing. The output from FP PACK 696 is also provided to CHR OUT SEL 1 and CHR OUT SEL 2.

The 3D1 signal, which is coupled to bit 24, is applied on line 642-1 to XOR 706, which also receives bit 9 from SEL 1 on line 670-4. The output of XOR 706 is provided on line 708 to PACK SPACE SEL 1. The 3D2 input terminal is coupled to bit 27 and is applied on line 642-2 to XOR 710. Bit 10 from SEL 1 is provided on line 670-5 to XOR 710, which provides its output signal on line 712 to PACK SEL 2. The function of XOR circuit 706 and 710 is to adjust parity in PjW-4 between the disignated pairs of bits for use in the floating-point packing selections.

FIG. 30 defines the input selection conditions to selector control circuits on the PjW chip that resultsd in the designated selections for each of the Selectors. As previously indicated in general, the Selectors function to select for output between two or more sets of inputs depending upon the DNW signals associated with each of the selectors. While there will be further detail description of the selection logic circuits below, FIG. 30 describes the general conditional requirements for each of the Selectors in each PjW circuit element.

PjW-DETAIL LOGIC CIRCUIT

The logic circuit diagram of FIGS. 31 through 38, when taken together, will be described in full, and will define the circuit configuration for the embodiment of the PjW circuit element. It is understood that the logic circuit diagram to be described relate to a PjW circuit element of the type described in FIG. 23. Various ones of the figures will require interconnection. The basic convention is that input terminal designations will be the inverted V at the line origin with the specified input terminal identified by the associated line. Internal interconnections within the LSI chip circuit, such as encountered in feedback and interrelated functions, will be associated with letter and numberical line designators. The flow is generally from the bottom of the figures toward the top with regard to input flowing to output. The macro elements are those previously described. In addition to the line origin and destinations indicators, the levels of signals for activation will be designated L for Low and H for High signals. Where appropriate, word definition of the effective signals will be included.

FIGS. 31a through 31d, when arranged as shown in FIG. 31, is a logic circuit diagram of SEL 1 and a part of SEL 2, as illustrated in FIG. 28. The data input signals are identified as IN D followed by a numerical indicating the ID position (See FIG. 23). The circuitry illustrated in FIGS. 31c and 31d, essentially is SEL 1, labeled 644 in FIG. 28. FIG. 31a and FIG. 31b is essentially a part of the SEL 2 circuitry, labeled 648 in FIG. 28. The designation N indicates the Normal transfer; L2 indicates the left shift of 2 for the designated bits; L3 indicates a left shift of 3 for the indicated bits; and L4 indicates a left shift of 4 for the indicated bits.

Figure 32A:
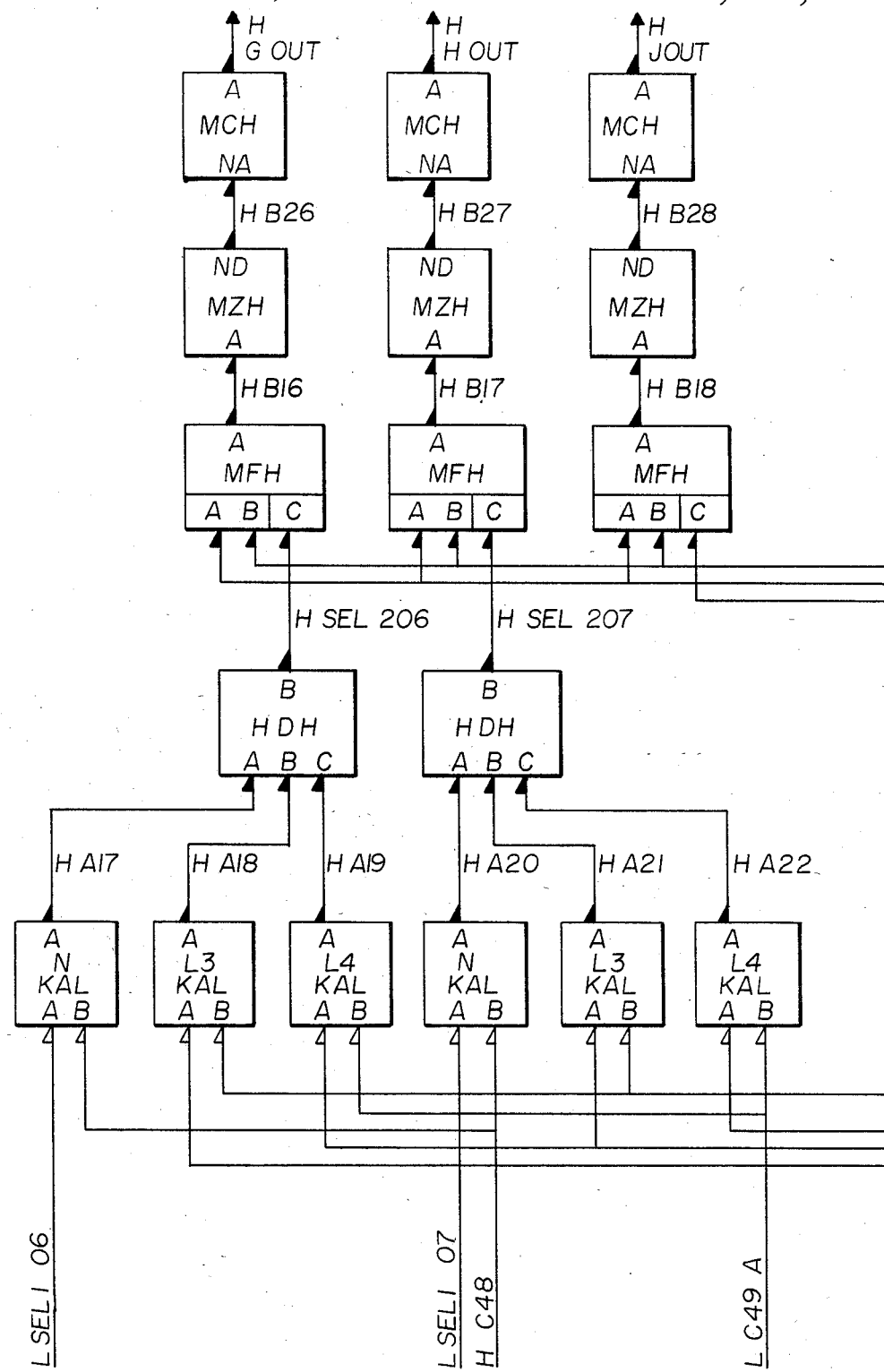
Figure 33A:
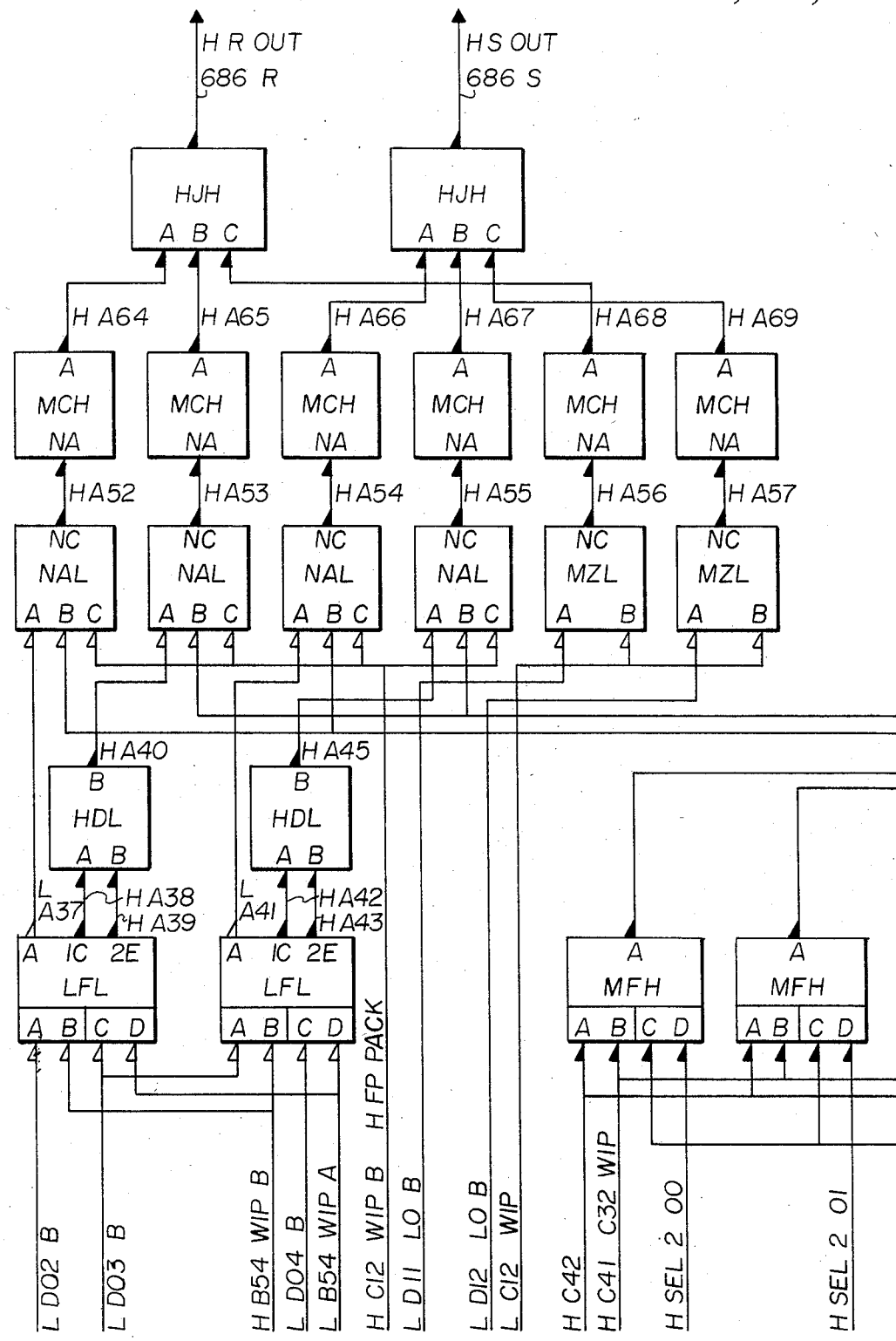
Figure 33B:
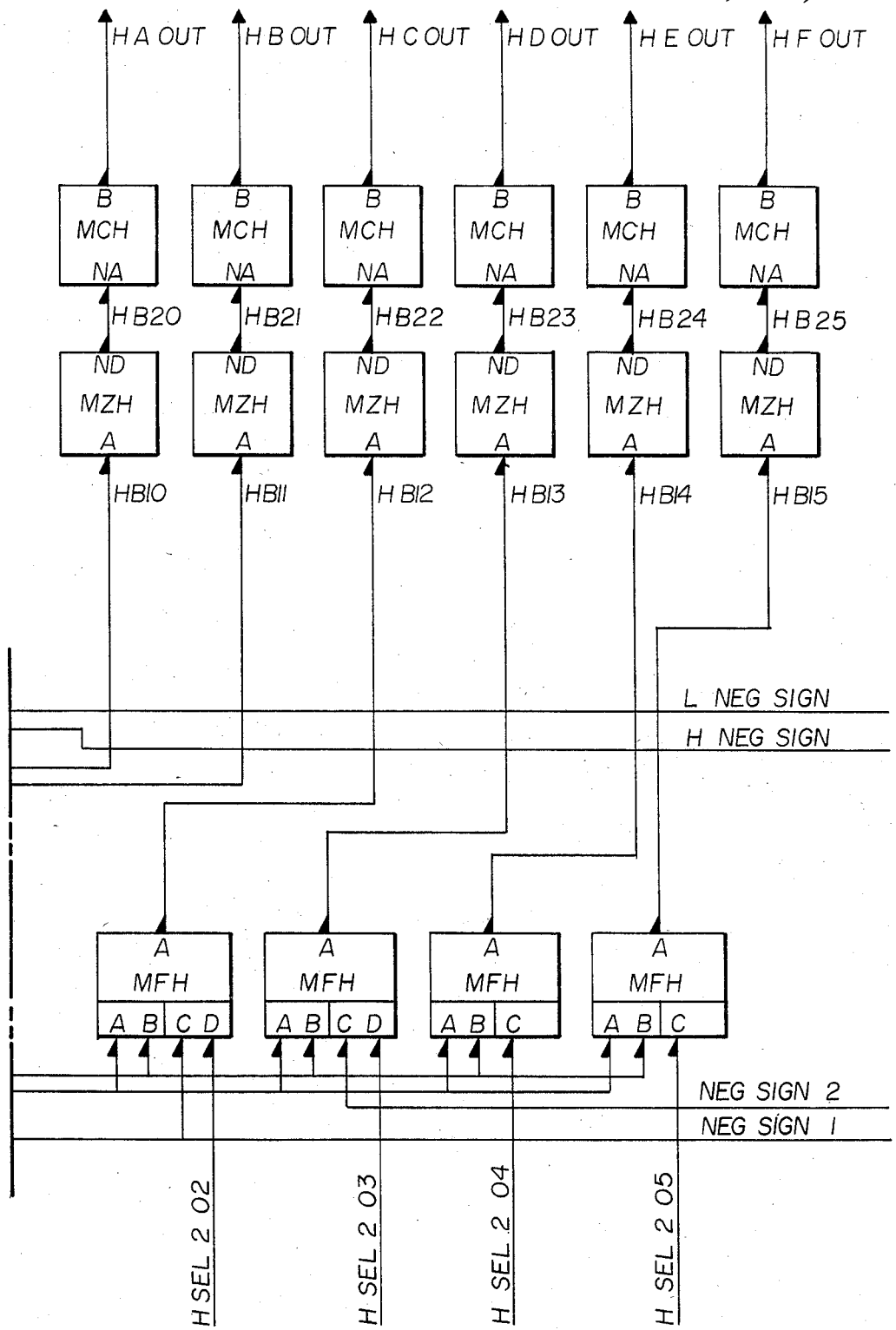

FIG. 32a through FIG. 32c, when arranged as shown in FIG. 32, is a logic circuit diagram of a portion of the SEL 2 circuitry and illustrates the output selection for data terminals G through M. The lower portion of the circuitry shown in FIG. 32b and FIG. 32c illustrates the combination of SEL 1 input signals and the control signals to generate output signals SEL 2 06 through SEL 2 09.

FIGS. 33a through 33d, when arranged as shown in FIG. 33, is a logic circuit diagram of the SEL 3 circuitry and illustrates the selection for output terminals R, S, and A through F. In addition to the control signals indicated, the FP PACK signal is applied. (See FIG. 33c.) FIG. 33d is the SEL 3 circuitry and responds to output from SEL 2, position 00 through 05, as well as the sign signals. The determination of the sign signals will be described below.

FIG. 34a and FIG. 34b, when arranged as shown in FIG. 34, is a logic circuit diagram of a Sign Selector responding to the F1 and F2 selector parameters and the sign bits applied on terminals 2D2 and 2D1. Additionally, the C Mode signals CM1 and CM2 are applied. The NEG SIGN 1 and the NEG SIGN 2 signals are utilized to drive the SEL 3 circuitry. (See FIG. 33d.

FIG. 35a and FIG. 35b, when arranged as shown in FIG. 35, is a logic circuit diagram of combinatorial logic circuits and illustrates the N and P output determination circuitry. In addition to the control signals indicated, the 3D1 and 3D2 signals are applied as inputs.

FIG. 36a and FIG. 36b, when arranged as shown in FIG. 36, is a logic block diagram of the Complement Control 610. The D Mode signals are applied, with DM 1 being applied on 612-1 and DM 2 being applied on 612-2. The parallel output signals provided from macro LBL, labeled 610-1 is an example of the same output signal being applied on four lines in parallel to the next subsequent circuit. The macro HKH, labeled 610-2, is a wired OR, with the arrangement being utilized to achieve an increase in circuit speed of operation. Arrangements of this type are designated WIP. As a result of the combinatorial logic shown, the COMP 2 output is provided on line 618-1 and the UNCONDITIONAL COMP is provided on line 618-2.

FIG. 37a and FIG. 37b, when arranged as shown in FIG. 37, is a logic block diagram of the circuitry that translates the j-field Count (CNT) and the floating-point packing operation. The CNT EN is received on line i602 and the j-field signals representing the CNT are received on lines 606-1, 606-2, and 606-3. The Count combinations are translated and result in the control signals illustrated, and defined at the output in FIG. 37a. The FP PACK represented by F2, is received and results in the determination based upon the F2 indicator that the floating-point operation is to occur.

FIG. 38a through FIG. 38d, when arranged as shown in FIG. 38, is a logic block diagram of the Constant Generator 660. The Group select signals are received as inputs with 1GP received on line 664-1 and 2GP received on line 664-2. During the constant generation mode of operation, a H EN CONST signal is received on line 662. This Enable causes the Constant signals that are derived from the translation of the a-field and received on lines 666-1, 666-2, and 666-3 to be entered into the system for positioning to the data field defined by the j-field. The resultant output signals are applied to SEL 1, as previously described, and thereafter translate through the PjW circuitry in the same manner as received data signals.

The operation of the preferred embodiment of the Per j Write circuit has indicated several data formatting operations and options. These options have been described generally and in detail, and the logic circuit for each PjW circuit has been illustrated and described. The operation is such that programmably selected right justified fields are extracted and positioned for insertion in data fields specified by the j-field Count. Additionally, packing and unpacking of floating-point operands is accommodated. Finally, provision is made for entering controlled constants in specified data fields.

FIG. 39 illustrates the plurality of arithmetic register fields of data signals that are right justified and reformatted by the indicated j-field Count and the described control signals. The column entitled Storage Location specifies the destination data fields for the selected right justified fields, according to the j-field and the Quarter Word selection. Again, it will be recalled that the Quarter Word designation is indicated in the C Mode 1 position.

The interleaving of the data signals (bits), as applied to the Per j Write Network, has been described. The interleaving of bits and the partitioning of the PjW circuit is such that the Parity bits for data bit groupings is handled by and identical PjW LSI chip. FIG. 24A and FIG. 24B illustrates the entire Per j Write Network comprised of four identical LSI chips.

Due to the large number of reformatting options that can be specified by the j-field, the C Mode signals, the Group selection, the D Mode signals, and the Fill selections, it would be unduly complex to describe the bit configurations for each such selection. To illustrate the extraction of the right justified fields, the positioning to the designated storage field, and the Parity relationships, a Matrix has been developed for each of the write options. FIG. 40a and FIG. 40b, when arranged as shown in FIG. 40, is the Per j Write Matrix illustrating the bit output configuration for each of the four LSI chips for the j-field, and the C Mode selections. As previously described, the Matrix illustrates 3-bit parity maintained after justification for the selected bit field. The reformatting system converts operands from a first set of data formats to a programmably selected one of a second set of data formats, and can convert operands from a third set of data formats to a programmably selected one of a fourth set of data formats. In this regard, data fields are selected, right justified, and shifted to selectable data field positions. Alternatively, right justified data fields are positioned for insertion in selected data field positions in a destination operand. The reformatting system provides for the handling of single precision and double precision floating-point operands both by packing and unpacking the characteristics with associated mantissas. Selected data field complementing, both unconditionally and subject to signed condition, is provided for. The entire data reformatting system is designed and inplemented with the goal of optimizing the reformatting speed of operation, through the utilization of large scale integration fabrication techniques.

The description of the preferred embodiment illustrates that the various stated objectives of the invention have been met and satisfied.

It is understood that the invention has been described with reference to the drawings and to specific embodiment configurations. It is understood that the description is illustrative, and that various changes and modifications may be recognized by those skilled in the art without departing from the scope and spirit of the invention. Accordingly, what is intended to be protected by Letters Patent is to be determined by the following claims.

What is claimed is :

1. In a data processing system having a memory for storing and reading data words having parity bits associated therewith, an arithmetic unit for processing the data words in programmably selected formats, and a control section for causing execution of program instructions, some of which specify reformatting of the data words, and for providing control signals indicative of programmably selected data formats, a programmable data reformat system comprising:

control signal receiving means for receiving program control signals for specifying one of a plurality of data reformatting operations programmably specified by operative instructions, wherein said control signal receiving means includes instruction receiving means for receiving instruction field signals for designating the field of data signals to be extracted for reformatting, control mode receiving means for receiving control mode signals for selecting between predetermined reformatting of predetermined fields of said data signals and one of two possible floating point formats, data mode receiving means for receiving data mode signals for selecting between normal data output, unconditional complement output, and complement output dependent upon predetermined signal conditions, shift enable receiving means for receiving shift enable signals for selecting predetermined unique positioning of predetermined fields of said data signals, and clock signal means for enabling selection of the sign of said reformatted ones of data signals, and for controlling manipulation of said data signals in double precision floating-point operations;

data signal receiving means for receiving data signals to be programmably reformatted in a manner specified by said control signals;

parity signal receiving means for receiving parity signals associated with said data signals;

reformat means coupled to said control signal receiving means and to said data signal receiving means for reformatting selected ones of said data signals in said one of a plurality of data reformatting operations programmably predetermined in response to received ones of said control signals; and parity means coupled to said parity signal receiving means and said control signal receiving means for adjusting parity during reformatting and providing output parity signals indicative of the parity of the reformatted ones of said data signals.

2. A programmable data reformat system as in claim 1 wherein said reformat means includes:

field selection means for selecting said predetermined fields of said data signals in response to said control signals;

justifying means for positioning said predetermined fields of said data signals to predetermined positions.

3. A programmable data reformat system as in claim 2 and further including:

sign receiving and selection means for receiving sign signals indicative of the signs of predetermined groupings of said data signals and for selecting among said sign signals in response to said control signals.

4. A programmable data reformat system as in claim 3 wherein said reformat means further includes:

constant generator means for generating selected ones of a plurality of constants in response to ones of said instruction field signals.

5. A programmable data reformat system as in claim 3 wherein said reformat means further includes:

zero fill means for combining a predetermined number of zeros with said reformatted ones of said data signals in response to ones of said instruction field signals;

sign fill means for combining said sign signals with said reformatted ones of said data signals in response to other ones of said instruction field signals.

6. A programmable data reformat system as in claim 5 wherein said control signal receiving means further includes:

floating-point receiving means for receiving floating-point selection signals for selecting reformatting of said data signals as floating-point operands.

7. A programmable data reformat system as in claim 6 wherein said reformat means further includes:

combining means for combining floating-point characteristic signals with floating-point mantissa signals.

8. A programmable data reformat as in claim 6 wherein said reformat means further includes:

characteristic selection means for selecting and separating characteristic signals from said data signals;

mantissa selection means for selecting and separating mantissa signals from said data signals; and mantissa sign fill means for filling and combining the sign of said characteristic signals with said mantissa signals.

9. A programmable data reformat system as in claim 8 and further including:

complement means responsive to predetermined ones of said data mode signals for complementing said predetermined ones of said data signals.

10. A programmable data reformat system as in claim 1, wherein said format means includes:

first network means for selectively reformatting said selected ones of said data signals in one of a first group of said plurality of predetermined selected forms in preparation for manipulation according to the operative instruction in response to said control signals; and second network means for selectively reformatting said selected ones of said data signals in one of a second group of said plurality of predetermined selected forms in response to said control signals applied thereto in preparation for manipulation according to the operative instruction.

11. A programmable data reformat system as in claim 10 wherein said first network means includes:

field selection means for selecting said predetermined fields of said data signals in response to said control signals; and justifying means for right justifying said predetermined fields of data signals.

12. A programmable data reformat sytstem as in claim 10 wherein said second network means includes:

selection means for selecting right justified ones of said predetermined fields of said data signals; and field positioning means for positioning the selected ones of said right justified ones of said predetermined fields of said data signals for insertion in the field position specified by said control signals.

13. A programmable data reformat system as in claim 10 wherein said first network means and said second network means each include:

a plurality of cascaded selector means for selecting ones of said data signals for positioning;

sign selection means for determining the sign; and control means coupled to said control signal receiving means and to said sign selection means for controlling operation of said plurality of cascaded selector means.

14. A programmable data reformat system as in claim 1 wherein said format means includes:

n selector network means, where n is the modulus of the field selection system, and where said predetermined fields of said data signals are integer multiples of n, each of said selector network means including data input means for receiving interleaved ones of said data signals, and each including sign input means for receiving sign signals associated with predetermined groupings of said data signal and each arranged for selecting and positioning ones of said data signals in response to said control signals; and wherein said parity means includes parity selector network means identical to each of said n selector network means for receiving parity signals, each determined from an associated groupings of n of said data signals, and for positioning associated ones of said parity signals for use with the selected and positioned one of said groupings of n of said data signals.

15. A programmable data reformat system as in claim 14, where n is an integer and the number of said data signals is an integer multiple of n and evenly divisible by said predetermined fields.

16. A data reformat circuit for use in a programmable data reformat system, said reformat circuit comprising:

signal receiving means for receiving a predetermined grouping of signals to be reformatted;

control means including control signal receiving means for receiving programmed control signals specifying a programmably specified one of a plurality of data reformatting operations, said control means for providing internal control signals;

first selector means responsively coupled to said signal receiving means and to said control means for making a first level of selection among said received signals;

sign selector means for receiving sign indicating signals, said sign selector means responsively coupled to said control means and for providing selected sign signals;

second selector means responsively coupled to said first selector means, to said control means, and to said sign selector means for making a second selection among said selected sign signals and said signals; and third selector means responsively coupled to said second selector means and to said control means and to said sign selector means for shifting selected ones of said signals;

output selector means coupled to said second selector means and said third selector means and said control means for providing reformatted output signals; and complementing means coupled to said second selector means, said third selector means, and said control means for selectively complementing selected signals provided to said output selector means.

17. A reformat circuit as in claim 16 and further including:

characteristic selector means responsively coupled to said sign selector means and to said first selector means and to said control means for selecting characteristic signals; and characteristic output selector means responsively coupled to said control means and to said characteristic selector means for providing selected characteristic output signals.

18. A reformat circuit as in claim 17 and further including:

characteristic complementing means responsively coupled to said characteristic selector means and to said control means for selectively complementing characteristic signals applied to said characteristic output selector means.

19. A reformat circuit as in claim 17 and further including:

floating-point packing means responsively coupled to said sign selector means and to said control means for providing floating-point packing control signals;

floating-point pack selector means responsively coupled to said first selector means and said floating-point packing means for selecting a characteristic for single precision or double precision operands.

20. A reformat circuit as in claim 16 and further including:

constant generator means for receiving constant selection control signals and for providing constant signals to said first selector means in response thereto.

21. A method of operating a reformat circuit for programmably reformatting data signals to one of a plurality of data formats comprising the steps of:

receiving data signals indicative of a data word in one of a predetermined plurality of formats;

receiving sign signals indicative of the signs of predetermined groupings of said data signals;

selecting a sign for use in reformatting;

receiving instruction field signals indicative of the predetermined field to be extracted from said data word and determining whether the balance of the bit positions in the resultant reformatted data word will be zero or sign filled;

selecting the specified data field from said data word and zero or sign filling the resultant data word with the selected sign in response to said instruction field signals;

receiving control mode signals for selecting formats of normal word, predetermined fraction word, or single or double precision floating-point for the reformatted data word;

receiving data mode signals for selecting formats of normal word, complement, or conditional complement based upon the selected sign;

providing shift enable signals for selecting formats of normal word, or predetermined fractional words positioned to predetermined positions in said reformatted data words;

receiving clock signals for use in determining the signs of said reformatted data word in response to selected one of the received sign signals;

forming said reformatted data word from said predetermined field, said data mode signals, said shift enable signals, and said clock signals; and providing parity signals for said reformatted data word, or field thereof.

22. The method of claim 21 and further including the step of:

receiving said received data signals in predetermined interleaved groupings.

23. The method of programmably reformatting data signals to one of a plurality of data formats as in claim 22 wherein said step of forming said reformatted data words includes the steps of alternatively:

transferring said data signals without alteration along with associated parity signals;

extracting a one-sixth, one-quarter, one-third, or one-half word data field from said data word and right justifying the extracted data field, while filling the remaining portion of the output word with zero or sign bits according to the form of the reformatting specified;

extracting the low order one-third data word field from the said data word and placing the extracted data field in the high order bit positions of the output word while filling the remaining low order bit positions with zeros after the extraction and positioning as specified;

extracting the low order one-half data word field from said data word and placing the extracted data field in the high order one-half position of the output operand while filling the remaining low order bit positions with zeros after the extraction and positioning specified;

extracting the single precision floating-point or the double precision floating-point characteristic from a floating-point data word and placing the extracted characteristic on characteristic output lines, while transferring the mantissa portion of the data word to the output lines with the bit positions formally occupied by the extracted characteristic bits filled with sign bits; and performing all of the specified functions and complementing the normal output.

24. In a data processing system having a memory for storing and reading data words, an arithmetic unit for processing the data words in programmably selected formats, and a control section for causing execution of program instructions, some of which specify reformatting of the data words, and for providing control signals indicative of programmably selected data formats, a programmable data reformat system comprising:

n reformat circuit means for programmably reformatting data words, where n is the modulus of the reformat system, and where predetermined fields of said data signals are integer multiples of n, each of said n reformat circuit means having data input means for receiving different interleaved groupings of the data signals, where said interleaved groupings include every nth bit of said data word, and each of said n reformat circuit means includes a plurality of selector means for repositioning data bits;

control means for controlling selection of said plurality of selector means, where said control means includes instruction receiving means for receiving instruction signals for designating the programmably selected reformat operation, control mode receiving means for receiving control mode signals for use in controlling the reformat operations, data mode receiving means for receiving data mode signals for controlling complementing, and sign receiving means for receiving sign signals associated with said data signals; and an additional reformat circuit for receiving parity bits associated with groupings of said data signals for positioning associated ones of said parity signals for use with the selected and positioned ones of said groupings of said data signals.

25. A data reformatting system as in claim 24 wherein said control means in each of said n reformat circuit means and said additional reformat circuit means includes constant enable receiving means for receiving enable signals for generation of constant values, and constant receiving means for receiving constant signals indicative of constant selections to be generated, group signal receiving means for specifying the position of each of said reformat circuit means and said additional reformat circuit means during generation of said constants, and fill signal receiving means for receiving signals indicative of the selected sign fill and alternatively for selection of floating-point packing operations.

* * * * *